(12) United States Patent
Dougherty et al.

(10) Patent No.: US 11,820,923 B2
(45) Date of Patent: *Nov. 21, 2023

(54) CONTROLLED CURE FOR COMPOSITIONS COMPRISING ACETOACETYLATED RESINS

(71) Applicant: Eastman Chemical Company, Kingsport, TN (US)

(72) Inventors: Shawn Marie Dougherty, Kingsport, TN (US); Terri Roxanne Carvagno, Church Hill, TN (US); Monika Karin Wiedmann Boggs, Blountville, TN (US)

(73) Assignee: Eastman Chemical Company, Kingsport, TN (US)

( * ) Notice: Subject to any disclaimer, the term of this patent is extended or adjusted under 35 U.S.C. 154(b) by 539 days.

This patent is subject to a terminal disclaimer.

(21) Appl. No.: 16/705,345

(22) Filed: Dec. 6, 2019

(65) Prior Publication Data
US 2020/0181324 A1  Jun. 11, 2020

Related U.S. Application Data

(60) Provisional application No. 62/916,503, filed on Oct. 17, 2019, provisional application No. 62/900,939, (Continued)

(51) Int. Cl.
| | | |
|---|---|---|
| C09J 167/02 | (2006.01) | |
| C09J 171/00 | (2006.01) | |
| C08G 63/87 | (2006.01) | |
| C08G 63/91 | (2006.01) | |
| C09D 167/02 | (2006.01) | |
| C09D 7/20 | (2018.01) | |
| C08G 12/00 | (2006.01) | |
| C09D 161/20 | (2006.01) | |
| C09J 5/00 | (2006.01) | |
| C09J 161/20 | (2006.01) | |
| C09D 7/65 | (2018.01) | |

(Continued)

(52) U.S. Cl.
CPC ............ *C09J 167/02* (2013.01); *C08G 12/00* (2013.01); *C08G 63/005* (2013.01); *C08G 63/87* (2013.01); *C08G 63/916* (2013.01); *C08J 3/24* (2013.01); *C08J 5/18* (2013.01); *C08J 7/043* (2020.01); *C08L 67/03* (2013.01); *C09D 7/20* (2018.01); *C09D 7/65* (2018.01); *C09D 161/20* (2013.01); *C09D 167/00* (2013.01); *C09D 167/02* (2013.01); *C09D 175/08* (2013.01); *C09J 5/00* (2013.01); *C09J 11/08* (2013.01); *C09J 161/20* (2013.01); *C09J 167/03* (2013.01); *C09J 171/00* (2013.01); *C08J 2323/06* (2013.01); *C08J 2323/12* (2013.01); *C08J 2367/02* (2013.01); *C08K 3/013* (2018.01); *C08K 5/005* (2013.01); *C08K 5/0016* (2013.01); *C08K 5/0025* (2013.01); *C08K 5/0066* (2013.01); *C08K 5/07* (2013.01); *C08K 5/18* (2013.01); *C08K 5/3462* (2013.01); *C09J 2461/00* (2013.01); *C09J 2467/00* (2013.01)

(58) Field of Classification Search
CPC ........ C08L 61/34; C08G 12/00; C09D 161/20
See application file for complete search history.

(56) References Cited

U.S. PATENT DOCUMENTS

| | | |
|---|---|---|
| 4,071,578 A | 1/1978 | Lasher |
| 4,708,821 A | 11/1987 | Shimokawa et al. |

(Continued)

FOREIGN PATENT DOCUMENTS

| | | |
|---|---|---|
| DE | 196 20 351 A1 | 11/1997 |
| EP | 0 161 697 A1 | 11/1985 |

(Continued)

OTHER PUBLICATIONS

Notification of Transmittal of the International Search Report and the Written Opinion of the International Searching Authority dated Mar. 20, 2020 for International Application No. PCT/US2019/064872.

(Continued)

*Primary Examiner* — Wenwen Cai
(74) *Attorney, Agent, or Firm* — Judith C. Rawls

(57) ABSTRACT

This invention relates to a curable composition comprising:
I. Component (I) comprising a resin having at least one functional group selected from the group consisting of β-ketoester and malonate functional groups;
II. Component (II) comprising at least one curing agent having at least one aldehyde functional group;
III. Component (III) comprising at least one amine, salts thereof, or combinations thereof; and, optionally
IV. Component (IV) comprising at least one reactivity delayer; wherein said curing agent is at least one dialdehyde selected from the group consisting of 1,3-cyclohexanedicarboxaldehyde; 1,4-cyclohexanedicarboxaldehyde; mixtures of 1,3-cyclohexanedicarboxaldehyde and 1,4-cyclohexanedicarboxaldehyde; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde; o-phthalaldehyde; terephthalaldehyde; isophthalaldehyde; cyclopentane-1,3-dicarbaldehyde; cyclopenta-3,5-diene-1,3-dicarbaldehyde; glutaraldehyde; benzenedipropanal; any isomers thereof; and any mixtures thereof.

10 Claims, No Drawings

Related U.S. Application Data filed on Sep. 16, 2019, provisional application No. 62/777,865, filed on Dec. 11, 2018, provisional application No. 62/777,880, filed on Dec. 11, 2018, provisional application No. 62/777,871, filed on Dec. 11, 2018, provisional application No. 62/777,876, filed on Dec. 11, 2018.

(51) Int. Cl.

| | | |
|---|---|---|
| C09J 11/08 | (2006.01) | |
| C08L 67/03 | (2006.01) | |
| C09J 167/03 | (2006.01) | |
| C08J 3/24 | (2006.01) | |
| C08J 7/043 | (2020.01) | |
| C08J 5/18 | (2006.01) | |
| C09D 167/00 | (2006.01) | |
| C09D 175/08 | (2006.01) | |
| C08G 63/00 | (2006.01) | |
| C08K 3/013 | (2018.01) | |
| C08K 5/00 | (2006.01) | |
| C08K 5/07 | (2006.01) | |
| C08K 5/3462 | (2006.01) | |
| C08K 5/18 | (2006.01) | |

(56) References Cited

U.S. PATENT DOCUMENTS

| | | | |
|---|---|---|---|
| 5,288,802 A | 2/1994 | Walters et al. | |
| 5,288,804 A | 2/1994 | Kim et al. | |
| 5,426,148 A | 6/1995 | Tucker | |
| 5,453,464 A | 9/1995 | Witzeman et al. | |
| 5,462,992 A | 10/1995 | Wilt et al. | |
| 5,693,705 A | 12/1997 | Kubo et al. | |
| 5,714,563 A | 2/1998 | DePompei et al. | |
| 6,057,001 A | 5/2000 | Schoonderwoerd et al. | |
| 6,117,492 A | 9/2000 | Goldstein et al. | |
| 6,177,514 B1 | 1/2001 | Pathak et al. | |
| 6,203,607 B1 | 3/2001 | Schoonderwoerd et al. | |
| 6,521,716 B1 | 2/2003 | Leake | |
| 6,683,132 B1 | 1/2004 | Schick et al. | |
| 8,653,174 B2 | 2/2014 | Anderson et al. | |
| 8,664,333 B2 | 3/2014 | Shibutani et al. | |
| 8,962,725 B2 | 2/2015 | Brinkhuis et al. | |
| 9,181,452 B2 | 11/2015 | Brinkhuis et al. | |
| 9,181,453 B2 | 11/2015 | Brinkhuis et al. | |
| 9,260,626 B2 | 2/2016 | Brinkhuis et al. | |
| 9,284,423 B2 | 3/2016 | Brinkhuis et al. | |
| 9,534,081 B2 | 1/2017 | Brinkhuis et al. | |
| 9,587,138 B2 | 3/2017 | Brinkhuis et al. | |
| 9,599,602 B2 | 3/2017 | Kevil et al. | |
| 10,563,040 B2 | 2/2020 | Kuo et al. | |
| 11,261,359 B2 | 3/2022 | Boggs et al. | |
| 11,459,493 B2 | 10/2022 | Carvagno et al. | |
| 2002/0040093 A1 | 4/2002 | Hobel et al. | |
| 2002/0161162 A1 | 10/2002 | Kumar et al. | |
| 2003/0060655 A1 | 3/2003 | Hayashi et al. | |
| 2003/0195304 A1 | 10/2003 | Kuo et al. | |
| 2003/0195305 A1 | 10/2003 | Kuo et al. | |
| 2005/0081994 A1 | 4/2005 | Beckley et al. | |
| 2007/0048337 A1 | 3/2007 | Arthur | |
| 2008/0135060 A1 | 6/2008 | Kuo et al. | |
| 2009/0253865 A1 | 10/2009 | Shibutani et al. | |
| 2010/0204401 A1 | 8/2010 | Marsh et al. | |
| 2011/0015343 A1 | 1/2011 | Jones et al. | |
| 2012/0220676 A1 | 8/2012 | Moens | |
| 2013/0036939 A1 | 2/2013 | Webster et al. | |
| 2013/0233739 A1 | 9/2013 | Zhao et al. | |
| 2015/0024195 A1* | 1/2015 | Bammel | C09D 133/04 428/341 |
| 2016/0068707 A1 | 3/2016 | Drijfhout | |
| 2016/0115345 A1 | 4/2016 | Kuo et al. | |
| 2016/0115347 A1 | 4/2016 | Kuo et al. | |
| 2016/0137877 A1 | 5/2016 | Kuo et al. | |
| 2016/0297994 A1 | 10/2016 | Kuo et al. | |
| 2017/0275492 A1 | 9/2017 | Zhou et al. | |
| 2018/0251656 A1 | 9/2018 | Geodegebuure et al. | |
| 2020/0140693 A1 | 5/2020 | Gessner et al. | |
| 2020/0181311 A1 | 6/2020 | Carvagno et al. | |
| 2020/0181312 A1 | 6/2020 | Dougherty et al. | |
| 2020/0181324 A1 | 6/2020 | Dougherty et al. | |
| 2020/0181395 A1 | 6/2020 | Dougherty et al. | |
| 2020/0181465 A1 | 6/2020 | Kuo et al. | |

FOREIGN PATENT DOCUMENTS

| | | |
|---|---|---|
| EP | 0 687 716 A1 | 12/1995 |
| EP | 1 435 383 A1 | 7/2004 |
| GB | 1 154 725 A | 6/1969 |
| JP | S56 5847 A | 1/1981 |
| JP | 3284984 A | 12/1991 |
| JP | H07331133 A | 12/1995 |
| JP | H11310723 A | 11/1999 |
| JP | 3386577 A | 3/2003 |
| WO | WO 96/41833 A1 | 12/1996 |
| WO | WO 2017/186899 A1 | 11/2017 |
| WO | WO 2018/002538 A1 | 1/2018 |

OTHER PUBLICATIONS

Notification of Transmittal of the International Search Report and the Written Opinion of the International Searching Authority dated Mar. 20, 2020 for International Application No. PCT/US2019/064878.

Notification of Transmittal of the International Search Report and the Written Opinion of the International Searching Authority dated Mar. 20, 2020 for International Application No. PCT/US2019/064883.

Notification of Transmittal of the International Search Report and the Written Opinion of the International Searching Authority dated Mar. 20, 2020 for International Application No. PCT/US2019/064893.

Co-pending U.S. Appl. No. 15/621,323, filed Jun. 13, 2017; Kuo et al.

Office Action dated Feb. 25, 2019 received in co-pending U.S. Appl. No. 15/621,323.

Office Action dated Jul. 15, 2019 received in co-pending U.S. Appl. No. 15/621,323.

Notice of Allowance dated Oct. 24, 2019 received in co-pending U.S. Appl. No. 15/621,232.

Co-pending U.S. Appl. No. 16/705,331, filed Dec. 6, 2019; Kuo et al.

Co-pending U.S. Appl. No. 16/705,338, filed Dec. 6, 2019; Carvagno et al.

Co-pending U.S. Appl. No. 16/705,351, filed Dec. 6, 2019; Dougherty et al.

Co-pending U.S. Appl. No. 16/705,365, filed Dec. 6, 2019; Boggs et al.

Co-pending U.S. Appl. No. 16/705,377, filed Dec. 6, 2019; Dougherty et al.

Co-pending U.S. Appl. No. 16/705,394, filed Dec. 6, 2019; Collins et al.

Co-pending U.S. Appl. No. 16/705,324, filed Dec. 6, 2019; Kuo et al.

ASTM D1003; Standard Test Method for Haze and Luminous Transmittance of Transparent Plastics.

ASTM D2578; Standard Test Method for Wetting Tension of Polyethylene and Polypropylene Films.

ASTM D3236; Standard Test Method for Apparent Viscosity of Hot Melt Adhesives and Coating Materials.

ASTM D3985; Standard Test Method for Oxygen Gas Transmission Rate Through Plastic Film and Sheeting Using a Coulometric Sensor.

ASTM D4366; Standard Test Method for Hardness of Organic Coatings by Pendulum Damping Tests.

(56) References Cited

OTHER PUBLICATIONS

ASTM D4752-10; Standard Practice for Measuring MEK Resistance of Ethyl Silicate (Inorganic) Zinc-Rich Primers by Solvent Rub.
ASTM D5402; Standard Practice for Assessing the Solvent Resistance of Organic Coatings Using Solvent Rubs.
ASTM D6493-11; Standard Test Methods for Softening Point of Hydrocarbon Resins and Rosin Based Resins by Automated Ring-and-Ball Apparatus.
ASTM D7253-16; Standard Test Method for Polyurethane Raw Materials: Determination of Acidity as Acid Number for Polyether Polyols.
ASTM D974; Standard Test Method for Acid and Base Number by Color-Indicator Titration.
ASTM E222-17; Standard Test Methods for Hydroxyl Groups Using Acetic Anhydride Acetylation.
ASTM F1249; Standard Test Method for Water Vapor Transmission Rate Through Plastic Film and Sheeting Using a Modulated Infrared Sensor.
ASTM F2622; Standard Test Method for Oxygen Gas Transmission Rate Through Plastic Film and Sheeting Using Various Sensors.
ASTM G155; Standard Practice for Operating Xenon Arc Light Apparatus for Exposure of Non-Metallic Materials.
Blank et al.; "Delayed (Latent) Catalysis in Coatings;" www.researchgate.net/publication/228420884.
Brinkhuis et al.; "Taming the Michael Addition reaction;" European Coatings Journal; 05; 2015; pp. 34-40.
Dow Coating Materials; "Advances in 2K ISO-Free[1] Urethane Coating Technology;" May 19, 2015; pp. 1-30.
Invitation to Pay Additional Fees dated Aug. 23, 2018 received in International Application No. PCT/US2018/036237.
Noomen; "Applications of Michael addition chemistry in coatings technology"; Progress in Organic Coatings; 32; (1997); pp. 137-142.
Notification of Transmittal of the International Search Report and the Written Opinion of the International Searching Authority dated Aug. 24, 2018 for International Application No. PCT/US2018/036244.
Notification of Transmittal of the International Search Report and the Written Opinion of the International Searching Authority dated Nov. 6, 2018 for International Application No. PCT/US2018/036237.
Notification of Transmittal of the International Search Report and the Written Opinion of the International Searching Authority dated Feb. 24, 2020 for International Application No. PCT/US2018/060816.
Notification of Transmittal of the International Search Report and the Written Opinion of the International Searching Authority dated Feb. 25, 2020 for International Application No. PCT/US19/64868.
Notification of Transmittal of the International Search Report and the Written Opinion of the International Searching Authority dated Apr. 7, 2020 for International Application No. PCT/US19/64870.
Wicks et al.; "Chapter 13—Polyester Resins"; Organic Coatings Science and Technology; 2nd ed.; pp. 246-257; Wiley, New York, 1999.
Witzeman et al.; "Comparison of Methods for the Preparation of Acetoacetylated Coating Resins"; Journal of Coatings Technology; vol. 62; No. 789; pp. 101-112 (1990).
Yamamoto et al.; "Iridium-Catalyzed Oxidative Methyl Esterification of Primary Alcohols and Diols with Methanol;" Journal of Organic Chemistry; vol. 76; No. 8; Apr. 15, 2011; pp. 2937-2941.
Co-pending U.S. Appl. No. 17/309,118, filed Apr. 27, 2021; Kuo et al.
Office Action dated Mar. 29, 2022 received in co-pending U.S. Appl. No. 16/705,331; Now U.S. Publication No. 2020-0181465; Kuo et al.
Co-pending U.S. Appl. No. 17/309,121, filed Apr. 27, 2021; Kuo et al.
Office Action dated Mar. 17, 2022 received in co-pending U.S. Appl. No. 16/705,338.
Non-Final Office Communication dated Jun. 9, 2021 received in U.S. Appl. No. 16/705,365.
Notice of Allowance and Fee(s) Due dated Oct. 22, 2021 received in U.S. Appl. No. 16/705,365.
Office Action dated Mar. 17, 2022 received in co-pending U.S. Appl. No. 16/705,377.
Office Communication dated Jun. 14, 2021 received in U.S. Appl. No. 16/705,324.
Office Communication dated Jan. 7, 2022 received in U.S. Appl. No. 16/705,324.
USPTO Office Action dated May 11, 2022 received in co-pending U.S. Appl. No. 16/705,324.
Office Action dated Apr. 1, 2022 received in co-pending U.S. Appl. No. 16/705,345.
Office Action dated Feb. 22, 2022 received in co-pending U.S. Appl. No. 16/705,351.
Notification of Transmittal of the International Search Report and the Written Opinion of the International Searching Authority dated Jun. 2, 2020 for International Application No. PCT/US2019/064876.
Photogenerated Base in Polymer Curing & Imaging: Radiation-induce Crosslinking via a Knoevenagel Reaction authored by Urankar et al. and published in Polymer Preprints (1994) 35, 933-934.
USPTO Office Action dated Jun. 9, 2022 received in co-pending U.S. Appl. No. 16/705,394.
Notice of Allowance dated Aug. 3, 2022 received in co-pending U.S. Appl. No. 16/705,331.
Notice of Allowance dated Aug. 23, 2022 received in co-pending U.S. Appl. No. 16/704,338.
USPTO Office Action dated Oct. 20, 2022 received in co-pending U.S. Appl. No. 16/705,324.
USPTO Office Action dated Feb. 15, 2023 received in U.S. co-pending U.S. Appl. No. 16/705,394.

\* cited by examiner

CONTROLLED CURE FOR COMPOSITIONS COMPRISING ACETOACETYLATED RESINS

CROSS-REFERENCE TO RELATED APPLICATIONS

This application claims the benefit of U.S. Provisional Application Nos. 62/777,876, 62/777,865, 62/777,871, 62/777,880 all filed Dec. 11, 2018; 62/900,939 filed Sep. 16, 2019; and 62/916,503 filed Oct. 17, 2019 under 35 U.S.C. § 119(e)(1); the entire contents of the provisional applications are hereby incorporated by reference.

FIELD OF THE INVENTION

The present invention relates to resins having β-ketoester groups, compounds having aldehyde functionality, and amines or their salts, wherein the timing of crosslinking and/or curing is controlled through certain combinations and/or under certain conditions.

BACKGROUND OF THE INVENTION

Reactive compositions based on isocyanate crosslinkers are widely used for coating and adhesive applications. Such systems are curable at room temperature or low temperatures (e.g. <80° C.) and are capable of providing the desirable properties for a variety of applications. However, there have been increasing concerns associated with the production and the use of isocyanate compounds and formulations based on isocyanates.

Compositions based on isocyanate crosslinkers frequently require reaction with moisture to form the crosslinked composition. If a solvent-based system is used due to application equipment or other reasons, it is desirable that trace moisture in the solvent will not initiate curing or crosslinking of the curable composition and thus will not reduce the pot life of the curable composition.

Commercially, it is desirable that the system does not: generate by-products during curing that can be detrimental to film formation or quality, have volatility, cause defects, have adhesion failure, and/or have unpleasant odor. In addition, there is a need in commerce for a system that has combination of two or more of the following properties: isocyanate free, curable at low temperatures, good thermal and/or UV stability, and good adhesion to substrates typically bonded or coated with isocyanate-containing systems. It is also desirable to have a curable system that is applied and cured below about 100° C. while providing suitable adhesion at service temperatures up to 130° C.

Additionally, there is a need in the art for a curable composition that has the desired level of adhesion to the substrate to which it is applied and that also adheres to many different substrates. Further, there is a need in the art for curable compositions having high reactivity that would only undergo cure or be activated when desired.

SUMMARY OF THE INVENTION

In view of the above commercial shortcomings in the art, the present disclosure addresses the need for properties in curable compositions including one or more of the following properties: (1) cures and is isocyanate free, (2) curable at low temperatures (e.g. <100° C.), (3) suitable adhesion at service temperatures up to 130° C., (4) good adhesion to substrates typically bonded or coated with isocyanate-containing systems, (5) no Volatile Components, e.g., Volatile Organic Components (VOCs), or has low Volatile Components, e.g., VOCs, released before, during, and/or after curing, (6) does not generate by-products during curing that can be detrimental to film formation or quality, (7) reduces defects, (8) has more pleasant odor, less odor, or is odorless, (9) can contain low or no moisture, (10) can be used with moisture-impermeable substrates such as artificial leather, (11) under certain conditions, can be a crosslinking system, (12) can provide more controlled curing, (13) good thermal stability and/or UV stability, (14) good chemical resistance, (15) good mechanical properties, for example, tensile strength, elongation at break, impact strength, and/or Young's modulus, (16) good aging resistance or stability, (17) can provide improved green strength, (18) can provide a usable working life for many applications and/or (19) can provide longer pot life [in some instances, the pot life can be extended by controlling the reaction of the components (controlled cure)].

The low temperature cure of some of these reactive compositions can provide fast green bond strength and fast final cure at low temperatures.

A controlled cure system would leverage the benefits of the low temperature cure of the curable compositions comprising aldehydes and certain amines while providing application flexibility.

The compositions of this invention can provide desirable properties for a variety of applications. In certain embodiments, the compositions of this invention are suitable for applications in the adhesives area, for example, automotive adhesives, structural adhesives, wood adhesives, furniture adhesives, and laminating adhesives, and applications in the coatings area, for example, automotive, industrial maintenance, marine craft, field-applied coatings, and furniture.

For the ease of reference but not intending to be limiting in any way, certain aspects of the disclosure are numbered consecutively, as follows:

In aspect 1 of the invention, there is provided curable compositions comprising:
I. first component, Component (I), comprising a resin having at least one functional group selected from the group consisting of β-ketoester and malonate functional groups;
II. a second component, Component (II), comprising at least one curing agent having at least one aldehyde functional group, or isomers thereof, wherein said Component (II) is optionally latent;
III. a third component, Component (III), comprising at least one amine, salts thereof, or combinations thereof;
wherein before addition of Component (III), the reactivity of the composition is delayed by at least one of the following:
(III)(a) at least one of said Components (I), (II), and (III), or any reaction product thereof, or any combination thereof is a solid; or at least one of Components (II) or (III) or any combination thereof is insoluble in the resin under pot life conditions; or
(III)(b) at least one said amine is first reacted with at least one aldehyde, ketone, acetal or ketal, or mixtures thereof, optionally, to form a solid; or
(III)(c) at least one said amine is first reacted with a portion of Component (II), wherein the reaction product thereof is optionally reacted or combined subsequently with additional amounts of either or both of Components (II) and (III), and, prior to reaction of Components (I)-(III), is optionally combined with at least one reactivity delayer; or (III)(d) at least one said amine is first reacted with all of Component (II) wherein the reaction product is a combination of Components (II) and (III) and no additional amounts of Component (II) or Component (III) are reacted with said composition; or combinations of reaction products as described in (III)(d); and optionally, IV. Component (IV) comprising at least one reactivity delayer which is combined with Component (II), or Component (III), or a combination thereof.

In aspect 2 of the invention, there are provided compositions of any of aspect 1 wherein Component (I) comprises a resin having at least two functional groups selected from the group consisting of β-ketoester and malonate functional groups; Component (II) comprises at least one curing agent having at least two aldehyde functional groups, wherein said Component (II) is optionally latent.

In aspect 3 of the invention, there are provided compositions of aspects 1 or 2 wherein Component (I) is at least one amorphous or semi-crystalline polyester or at least one polyether; and Component (III) comprises at least one primary amine and/or at least one secondary amine, salts thereof, or combinations thereof.

In aspect 4 of the invention, there is provided the curable composition of any of aspects 1-3 wherein Component (III)(b) is a reaction product or a combination of two or more reaction products of at least one said amine with at least one aldehyde, ketone, acetal, ketal or combinations thereof.

In aspect 5 of the invention, there is provided the curable composition of any of aspects 1-4 wherein at least one said reactivity delayer comprises at least one of the following: waxes; paraffins; rosins; rosin ester resins; tackifier resin; polyester resin; polyol resins; or acrylics, said acrylics having a number average molecular weight of from about 2,000 to 15,000 and a Tg of from 40° C. to 130° C.

In aspect 6 of the invention, there is provided the curable composition of any one of aspects 1-5 wherein at least one reactivity delayer is selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, terpene resins, terpene phenolic resins, terpene styrene resins, rosin acid resins, esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof.

In aspect 7 of the invention, there is provided the curable composition of any one of aspects 1-6 wherein said reactivity delayer is selected from C5 hydrocarbon resins, aromatic hydrocarbon resins, pure monomer hydrocarbon resins, alkane hydrocarbons, aliphatic-aromatic hydrocarbon resins, fully or partially hydrogenated C9 resins, rosin ester resins, polyester resins, polyol resins, and/or combinations thereof.

In aspect 8 of the invention, there is provided the curable composition of any one of aspects 1-7 wherein said reactivity delayer is selected from aromatic hydrocarbon resins, pure monomer hydrocarbon resins, aliphatic-aromatic hydrocarbon resins, or combinations thereof.

In aspect 9 of the invention, there is provided the curable composition of any one of aspects 1-8 wherein said at least one reactivity delayer is combined with said amine at a ratio of between 25:1 to 0.5:1 parts by weight.

In aspect 10 of the invention, there is provided the curable composition of any one of aspects 1-9 wherein said at least one reactivity delayer is combined with said amine at a ratio of between 10:1 to 0.5:1 parts by weight.

In aspect 11 of the invention, there is provided the curable composition of any one of aspects 1-10 wherein Component (II) is present in the amount of 0 to 20 phr, and Component (III) is present in the amount of 0.5-50 phr, based on the total weight of Component (I), the resin.

In aspect 12 of the invention, there is provided the curable composition of any one of aspects 1-11 wherein Component (II) is present in the amount of 1 to 20 phr, and Component (III) is present in the amount of 0.5-40 phr, based on the total weight of Component (I), the resin.

In aspect 13 of the invention, there is provided the curable composition of any one of aspects 1-11 wherein Component (II) is present in the amount of 0 to 18 phr, and Component (III) is present in the amount of 0.50 to 15.0 phr, based on the total weight of Component (I), the resin.

In aspect 14 of the invention, there is provided the curable composition of any one of aspects 1-13 wherein Component (II) is present in the amount of 5 to 20 phr, and Component (III)(b) is present in the amount of 0.5 to 10 phr, based on the total weight of Component (I), the resin.

In aspect 15 of the invention, there is provided the curable composition of any one of aspects 1-14 wherein Component (I), or Component (II) or Component (III), or combinations, or products thereof, is/are a solid or a liquid.

In aspect 16 of the invention, there is provided the curable composition of any one of aspects 1-15 wherein the equivalent ratio of the acetoacetate (AcAc) functional group of Component (I) to the aldehyde functional groups in the composition is from about 4 to about 0.25; or from about 4 to about 0.5; or from about 3 to about 0.25; or from about 3 to about 0.5; or from about 3 to about 0.25; or from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25. In this aspect, there is provided the composition of any of aspects 1-15 wherein the equivalent ratio of the acetoacetate (AcAc) functional group of Component (I) to the aldehyde functional group is in the range of from about 2 to about 0.5.

In aspect 17 of the invention, there is provided the curable composition of any one of aspects 1-16 wherein the starting molar ratio for Component (III):Component (III) for producing a delayed Component (III) is from 10:1 to 0.1:10, or from 10:1 to 1:10, or from 5:1 to 1:2. In some examples, the starting molar ratio for Component (II):Component (III) can be 2:1, or 4:1, or 1:2.

In aspect 18 of the invention, there is provided the curable composition of any one of aspects 1-17 wherein the product(s) of the combination of said amine or said curing agent with at least one reactivity delayer has an average particle size of 10 to >1000 microns, or 1500 microns or less; of 1000 microns or less; or 0 to 500 microns; or less than 400 microns; or less than 250 microns; or less than 125 microns; or less than 150 microns; or less than 100 microns; or less than 50 microns; or 30 microns or less; or 10 microns or less; or 1 microns or less; or from 10 to 150 microns; or from 10 to 100 microns; or from 5 to 50 microns.

In aspect 19 of the invention, there is provided the curable composition of any one of aspects 1-18 wherein after mixing or reacting all of said Components (I)-(IV), Components (II), (III) or (IV) are either fully reacted in or do not negatively impact the final properties of the composition In aspect 20 of the invention, there is provided the curable composition of any one of aspects 1-19 wherein the delayed reactivity of said amine, or of said curing agent, or of combinations thereof, or of said compositions, is re-activated by heat, moisture, infrared light, ultraviolet light, or pressure, or combinations thereof, or any means known in the art.

In aspect 21 of the invention, there is provided the curable composition of any one of aspects 1-20 which when cured at room temperature for seven days, has less than 75% loss, or less than 50% loss, or less than 20% loss, or less than 10% loss in 180-degree peel strength after further aging at 80° C. for seven days.

In aspect 22 of the invention, there is provided the curable composition of any one of aspects 1-21 wherein curing is delayed after combination of Component (II) or the amine of Component (III) with at least one reactivity delayer.

In aspect 23 of the invention, there is provided the curable composition of any one of aspects 1-22 wherein at least one of Components (I)-(III) causes latency of the reactivity of the curable composition(s) under ambient conditions until activation and curing.

In aspect 24 of the invention, there is provided the curable composition of any one of aspects 1-23 wherein the pot life is >1 hour, or >2 hours, or >4 hours, or >8 hours, or >12 hours, or >24 hours, or >31 hours, or >1 week, or >1 month, as measured by the Brookfield or complex viscosity using the time from the initial viscosity to the time of the doubling of viscosity while maintaining said composition at application temperature or at room temperature.

In aspect 25 of the invention, there is provided the curable composition of any one of aspects 1-23 wherein the pot life is >1 hour, or >2 hours, or >4 hours, or >8 hours, or >12 hours, or >24 hours, or >31 hours, or >1 week, or >1 month, as measured by the Brookfield or complex viscosity using the time from the initial viscosity to the doubling of viscosity while maintaining said composition at 45° C. or at 50° C.

In aspect 26 of the invention, there is provided the curable composition of any one of aspects 1-25 wherein said amine is at least one primary amine or at least one secondary amine or combinations thereof.

In aspect 27 of the invention, there is provided the curable composition of aspect 26 wherein said primary amine or said secondary amine is selected from at least one of: piperidine; piperazine; morpholine, pyrrolidine; ethylenediamine; diethylenetriamine; triethylenetetramine (TETA); tetraethylenepentamine; 2,2,4-trimethylhexamethylenediamine; 1,2-diaminopropane; 1,3-diaminopropane; 1-ethyl-1,3-propanediamine; 2,2-dimethylpropylenediamine; 1,4-diaminobutane; 2-methylpentamethylenediamine; 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediamine; 2,6-toluenediamine; 3-dimethylaminopropylamine; 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine; 1,2,4-triazole; alanine; proline; 1,4,8,11-tetraazacyclotetradecane (cyclam); diphenylethylenediamine, 2,2,4,4-tetramethylcyclobutane-1,3-diamine; 2,2-dimethylpropane-1,3-diamine; 2,3-dimethylbutane-2,3-diamine; 1,2-diaminocyclopentane; 1,2,2-trimethylcyclopentane-1,3-diamine 1,7,7-trimethylbicyclo[2.2.1]heptane-2,3-diamine, dioctyl amine; diisopropylamine; and polyetheramines; or isomers thereof.

In aspect 28 of the invention, there is provided the curable composition of aspect 27 wherein said amine of Component (III) is selected from triethylenetetramine, 3-dimethylaminopropyl amine, 2-methylpentamethylenediamine, hexamethylene diamine, piperidine, piperazine, 1,4,8,11-tetraazacyclotetradecane, pyrrolidine, isomers thereof or combinations thereof.

In aspect 29 of the invention, there is provided the curable composition of any one of aspects 1-28 wherein the curing agent comprises an aliphatic, cycloaliphatic, or aromatic, di-, or poly-aldehyde.

In aspect 30 of the invention, there is provided the curable composition of aspect 29 wherein said curing agent is at least one dialdehyde selected from the group consisting of 1,3-cyclohexanedicarboxaldehyde (1,3-CHDAL); 1,4-cyclohexanedicarboxaldehyde (1,4-CHDAL); mixtures of 1,3-cyclohexanedicarboxaldehyde and 1,4-cyclohexanedicarboxaldehyde; 2,6-norbornanedicarboxaldehyde; 2,5-norbomanedicarboxaldehyde; cyclododecane-1,4,8-tricarbaldehyde; 3-(4-formylcyclohexyl)propanal; tricyclodecane dialdehyde (TCDDAL); o-phthalaldehyde; terephthalaldehyde; isophthalaldehyde; cyclopentane-1,3-dicarbaldehyde; cyclopenta-3,5-diene-1,3-dicarbaldehyde; glutaraldehyde; benzenedipropanal; or any isomers thereof, or mixtures thereof.

In aspect 31 of the invention, there is provided the curable composition of any one of aspects 1-30 wherein the aldehyde useful in the invention can be selected from at least one of mixtures of 1,3- and 1,4-CHDAL, terephthalaldehyde, orthophthalaldehyde, and tricyclodecane dialdehyde, or any isomers thereof or any combinations thereof In aspect 32 of the invention, there is provided the curable composition of any one of aspects 1-31 wherein Component (II) or Component (III) can be a solid resulting from at least one of the following: (a) the pre-reaction of cyclohexanedicarboxyaldehyde and TETA; (b) the pre-reaction of TCDDAL and 2-methylpentamethylenediamine; the pre-reaction of cyclohexanedicarboxyaldehyde and 2-methylpentamethylenediamine; (c) the pre-reaction of cyclohexanedicarboxyaldehyde and piperazine; (d) the pre-reaction of TCDDAL and piperidine; or any blend of any one or more of (a)-(d).

In aspect 33 of the invention, there is provided the curable composition of aspect 32 wherein said blend can be a mixture of a solid resulting from the pre-reaction of (a) TETA and cyclohexanedicarboxyaldehyde and a solid resulting from the pre-reaction of (b) TCDDAL and piperidine, wherein said mixture can be present as Component (II) or Component (III).

In aspect 34 of the invention, there is provided the curable composition of any one of aspects 1-33 wherein said composition is an adhesive composition or a coating composition.

In aspect 35 of the invention, there is provided an article of manufacture comprising at least one substrate coated with at least one curable composition of any of aspects 1-34.

In aspect 36 of the invention, there is provided a process of causing an uncured composition to be latent prior to curing wherein said composition comprises:
I. Component (I) comprising a resin having at least one functional group selected from the group consisting of β-ketoester and malonate functional groups;
II. Component (II) comprising at least one curing agent having at least one aldehyde functional group, wherein said Component (II) is optionally latent;
III. Component (III) comprising at least one amine, salts thereof, or combinations thereof;
wherein before addition of Component (III), the reactivity of the composition is delayed by at least one of the following:
(III)(a) at least one of said Components (I), (II), and (III), or any reaction product thereof, or any combination thereof is a solid; or at least one of Components (II) or (III) or any combination thereof is insoluble in the resin under pot life conditions; or
(III)(b) at least one said amine is first reacted with at least one aldehyde, ketone, acetal or ketal, or mixtures thereof, optionally, to form a solid;
(III)(c) at least one said amine is first reacted with a portion of Component (II), wherein the reaction product thereof is optionally reacted or combined subsequently with additional amounts of either or both of Components (II) and (III), and, prior to reaction of Components (I)-(III), is optionally combined with at least one reactivity delayer; or
(III)(d) at least one said amine is first reacted with all of Component (II) wherein the reaction product is a combination of Components (II) and (III) and no additional amounts of Component (II) or Component (III) are reacted with said composition; or combinations of reaction products as described in (III)(d); and optionally,
IV. Component (IV) comprising at least one reactivity delayer which is combined with Component (II), or Component (III), or a combination thereof.

In aspect 37 of this invention, there is provided a process for preparing and curing a reactive adhesive comprising preparing a composition for a reactive adhesive according to aspects 1-34 and applying heat or otherwise activating the latent component.

In aspect 38 of this invention, there is provided a process for forming a laminate structure, comprising the following steps: (1) forming a composition by combining the three components of the composition of any one of aspects 1-34; (2) applying the composition to a surface of a first substrate; and (3) bringing a surface of a second substrate into contact with the composition on the surface of the first substrate, thereby forming the laminate structure.

In aspect 39 of this invention, there is provided the process of aspect 38 wherein the composition is then cured.

In aspect 40 of this invention, there is provided the process of any of aspects 36-39 or the article of manufacture of aspect 35 wherein at least one substrate or at least two substrates can each be independently selected from the group consisting of a wood material, a metallic material, a plastic material, an elastomeric material, a composite material, a paper material, a fabric material, a laminated structure, a glass material, a foamed material, a metal, a mesh material, a leather material, a synthetic leather material, a vinyl material, poly(acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material, or combinations of two or more thereof.

In aspect 41 of this invention, there is provided the process of aspects 36-39 or the article of manufacture of aspect 35 wherein at least one substrate or at least two substrates can each be independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wovens, and/or nonwovens; foam materials; leather materials; vinyl materials; and/or others that would be apparent to one of ordinary skill in the art. These materials can be used with or without fillers such as talc, glass, etc. as described herein.

In aspect 42 of this invention, there is provided the process of aspects 36-39 or the article of manufacture of aspect 35 wherein the first substrate and the second substrate can be each independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LDPE), oriented polypropylene, biaxially oriented polypropylene (BOPP), nylon, ethylene vinyl alcohol, and extruded films.

In aspect 43 of this invention, there is provided an article of manufacture comprising the composition of any of aspects 1-34 and/or processed by any of the processes of aspects 35-42.

In aspect 44 of this invention, there is provided the article of manufacture(s) of aspect 43 comprising one or more substrates, e.g., flexible substrates, assembly part substrates, automobile interior substrates, woodworking substrates, furniture part substrates, etc.

In aspect 45 of this invention, there is provided the article of manufacture of aspect 44 comprising at least two substrates wherein the composition is applied to the first substrate and wherein the second substrate can be contacted with said composition.

In aspect 46 of this invention, there is provided the article of manufacture of aspect 45 which is layered with multiple substrates wherein said composition is layered between at least two of said substrates.

In aspect 47 of this invention, there is provided the article of manufacture of aspect 46 which is a laminate structure.

In aspect 48 of this invention, there is provided the article of manufacture of aspect 47 wherein said composition is applied to at least one surface of a multi-laminated structure.

In aspect 49 of this invention, there is provided the article of manufacture of any of aspects 40-48 selected from the group consisting of: an adhesive, a laminate, a tape, a label, a tag, a radio frequency identification (RFID) tag, a coating, a sealant, a film, a foam, a potting compound, a disposable hygiene article, a polyester composite, a glass composite, a fiberglass reinforced plastic, a wood-plastic composite, an extruded compound, a polyacrylic blended compound, a potting compound, a rubber compound, a motor vehicle molded part, a motor vehicle extruded part, a motor vehicle laminated part, a furniture part, sheet molding compound (SMC), dough molding compound (DMC), textiles (e.g. fabric materials, mesh, wovens and/or nonwovens) and/or a flexible packaging multilayer.

In aspect 50 of this invention, there is provided the article of manufacture of aspect 49 which comprises an adhesive.

In aspect 51 of this invention, there is provided an adhesive composition comprising the composition of any of aspects 1-34.

In aspect 52 of this invention, there is provided the article of manufacture of any one of aspects 50-51 which is a reactive adhesive.

In aspect 53 of this invention, there is provided the article of manufacture of any of aspects which is a curable or cured adhesive.

In aspect 54 of this invention, there is provided the adhesive composition of any of aspects 1-34 wherein said composition is applied to a substrate at any thickness known in the art for a particular application, for example, from about 0.5 microns to about 50 microns, or from about 0.5 microns to 5 microns, for example, for some flexible film and/or packaging applications.

In aspect 55 of this invention, there is provided the adhesive composition of any of aspects 1-34 or 54 wherein said adhesive composition is applied to a substrate at a thickness of from about 50 to about 500 microns or from about 50 to about 200 microns or about 50 to about 150 microns or about 75 to about 125 microns, for example, for automotive or woodworking assembly.

In aspect 56 of this invention, there is provided the adhesive composition of any of aspects 1-34 or 54-55 which can be selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, hygiene core integrity adhesive, and packaging adhesive.

In aspect 57 of this invention, there is provided a coating of aspect 49 comprising any of the compositions of any of aspects 1-34 or 54-55.

In aspect 58 of this invention, there is provided an article of manufacture of any one of aspects 43-56 comprising a cured composition wherein the bond is maintained after cure and/or post-cure at or above about 23° C.; at or above about 60° C.; or at or above about 120° C.

In all aspects of the invention, the primary and/or secondary amines useful in the invention can act as catalyst and/or activating agent.

Unpredictably, the compositions useful in this invention have a good combination of properties including but not limited to good thermal stability, the ability to cure and/or crosslink, good cure rate, good green strength, good peel strength, and ability to adhere to various substrates.

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifications and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to "a polyester," "a dicarboxylic acid", "a residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified.

It has been discovered that polyesters having moieties containing activated methylene or methine groups, such as those of β-ketoesters, have properties including but not limited to one or more of the following properties: (1) a system that cures and that is isocyanate free, (2) curable at low temperatures (e.g. <8° C.), (3) suitable adhesion at service temperatures up to 130° C., (4) good adhesion to substrates typically bonded or coated with isocyanate-containing systems, (5) no Volatile Components, e.g., Volatile Organic Components (VOCs), or has low Volatile Components, e.g., VOCs, released before, during, and/or after curing, (6) does not generate by-products during curing that can be detrimental to film formation or quality, (7) reduces defects, (8) has more pleasant odor, less odor, or is odorless, (9) can contain low or no moisture, (10) can be used with moisture-impermeable substrates such as artificial leather, (11) under certain conditions, can be a crosslinking system, (12) can provide more controlled curing, (13) good thermal stability and/or UV stability, (14) good chemical resistance, (15) good mechanical properties, for example, tensile strength, elongation at break, impact strength, and/or Young's modulus, (16) good aging resistance or stability, (17) can provide improved green strength, (18) can provide a usable working life for many applications and/or (19) can provide longer pot life [in some instances, the pot life can be extended by controlling the reaction of the components (controlled cure)].

Chemical and/or physical protection of the primary/secondary amines and/or curing agents can provide additional control options to influence the cure profile. Additionally, the compositions do not require moisture, so they can be used with moisture-impermeable substrates such as artificial leather.

The terms "protected", and "latent" and derivatives thereof all refer to delay of the reactivity of any of Components (I)-(IV) of the invention (including but not limited to all of the Components or any combinations thereof), or to any of the curable compositions of the invention.

In one embodiment of the invention, there is provided curable compositions comprising:
I. Component (I) comprising a resin having at least one functional group selected from the group consisting of β-ketoester and malonate functional groups;
II. Component (II) comprising at least one curing agent having at least one aldehyde functional group, wherein said Component (II) is optionally latent;
III. Component (III) comprising at least one amine, salts thereof, or combinations thereof;
wherein before addition of Component (III), the reactivity of the composition is delayed by at least one of the following:
(III)(a) at least one of said Components (I), (II), and (III), or any reaction product thereof, or any combination thereof is a solid; or at least one of Components (II) or (III) or any combination thereof is insoluble in the resin under pot life conditions; or
(III)(b) at least one said amine is first reacted with at least one aldehyde, ketone, acetal or ketal, or mixtures thereof, optionally, to form a solid; or
(III)(c) at least one said amine is first reacted with a portion of Component (II), wherein the reaction product thereof is optionally reacted or combined subsequently with additional amounts of either or both of Components (II) and (III), and, prior to reaction of Components (I)-(III), is optionally combined with at least one reactivity delayer; or
(III)(d) at least one said amine is first reacted with all of Component (II) wherein the reaction product is a combination of Components (II) and (III) and no additional amounts of Component (II) or Component (III) are reacted with said composition; or combinations of reaction products as described in (III)(d) and optionally,
IV. Component (IV) comprising at least one reactivity delayer which is combined with Component (II), or Component (III), or a combination thereof.

In one embodiment of the invention, there are provided compositions wherein Component (I) comprises a resin having at least two functional groups selected from the group consisting of β-ketoester and malonate functional groups; and Component (II) comprises at least one curing agent having at least two aldehyde functional groups, wherein said Component (II) is optionally latent.

In one embodiment of the invention, there are provided compositions wherein Component (I) is at least one amorphous or semi-crystalline polyester or at least one polyether; and Component (III) comprises at least one primary amine and/or at least one secondary amine, salts thereof, or combinations thereof.

A "solid" is defined herein as not a liquid or gas at room temperature and/or at application temperature and can include but is not limited to waxy and/or semi-crystalline materials.

In one embodiment of the invention, there are provided compositions wherein the polyester is an acetoacetate functional polyester comprising the residues of
a. a hydroxyl component comprising:
  i. at least one diol in an amount ranging from 0 to 100 mole % or 50 to 100 mole %, based on the total moles of (i) and (ii) equaling 100 mole %; and
  ii. at least one polyol in an amount ranging from 0 to 100 mole % or 0 to 50 mole %, based on the total moles of (i) and (ii) equaling 100 mole %;
b. at least one carboxyl component comprising a polycarboxylic acid compound, a derivative of a polycarboxylic acid compound, or a combination thereof; and
c. at least one compound selected from an alkyl acetoacetate, a diketene, or a combination thereof.

The β-ketoester groups are represented by Formula 1, wherein R is a branched or straight chain, saturated or unsaturated alkyl, alicyclic, or aromatic group; R' is a hydrogen or a branched or straight chain, saturated or unsaturated alkyl, alicyclic, or aromatic group.

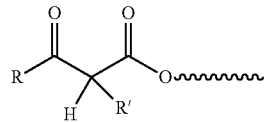

1

In one embodiment of the invention, there are provided compositions of the invention wherein the equivalent ratio of the acetoacetate (AcAc) functional group of Component (I) to the aldehyde functional group is from 5:1 to 1:3, or 5:1 to 1:2, or 5:1 to 1:1; or 1:4 to 4:1; or 1:2 to 0.8; or 1:0.3 to 1:1.2; or 1:0.5 to 1:1.2; or 1:0.7 to 1:1.3; or 1:0.9 to 1:1.1; or 1.2:0.8.

In one embodiment of the invention, there are provided compositions of the invention wherein the equivalent ratio of the acetoacetate (AcAc) functional group of Component (I) to the aldehyde functional groups in the composition is from about 4 to about 0.25; or from about 4 to about 0.5; or from about 3 to about 0.25; or from about 3 to about 0.5; or from about 3 to about 0.25; or from about 2 to about 0.25; or from about 2 to about 0.5; or from about 1.5 to about 0.5;

or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25.

In one embodiment, of this invention, there is provided the composition of the invention wherein the equivalent ratio of the acetoacetate (AcAc) functional group of Component (I) to the aldehyde functional group in the composition is in the range of from about 2 to about 0.5.

The equivalent ratio of the β-ketoacetate functional group(s) in the polyester to the aldehyde functional groups in the composition is defined as the ratio of the equivalents of β-ketoacetate functional groups or acetoacetate (AcAc) functional groups in the polyester to the equivalents of aldehyde functional groups in the composition. For example, the equivalents of the AcAc functional groups in a sample of 100 g AcAc polyester with AcAc number of 120 mgKOH/g can be calculated by the formula: equivalents of AcAc polyester=100×120/56100=0.21; whereas the equivalents of the aldehyde functional group in a sample of 0.10 moles of a dialdehyde is equal to 0.10×2=0.20. Thus, the equivalent ratio is equal to 0.21/0.20=1.05.

The polyesters useful in the invention can contain two or more β-ketoester groups, represented by Formula 2, wherein Z is a polyester residue, R is an alkyl group, R' is hydrogen or an alkyl group and n represents the average number of β-ketoester groups per polymer chain and is an average of at least 2. In one embodiment, the β-ketoester group is acetoacetate (AcAc), and the polyester is an acetoacetate-functional polyester.

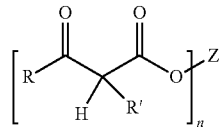

2

The acetoacetate-functional polyesters may be prepared by reacting a polyester resin containing hydroxyl groups, for example, a polyester having a hydroxyl number of at least 5 mg KOH/g, in one embodiment, about 30 to 200 mg KOH/g, with diketene or a compound having the β-ketoester moiety such as t-butylacetoacetate (tBAA). Various methods for the preparation of acetoacetylated polyester coating resins have been described by Witzeman et al. in the Journal of Coatings Technology, Vol. 62, No. 789, pp. 101-112 (1990). A reaction mixture can include: (a) from about 50 to about 95 weight %, or from about 60 to about 99 weight %, or from about 65 to about 95 weight %, or from about 70 to about 95 weight %, or from about 50 to about 90 weight %, or from about 60 to about 90 weight %, or from about 65 to about 90 weight %, or from about 70 to about 90 weight %, or from about 70 to about 85 weight %, or from about 70 to about 80 weight %, of hydroxyl-functional polyester; and (b) residues of alkyl acetoacetate, diketene, or combinations thereof, in an amount ranging from about 5 to about 65 weight %; or from about 5 to about 50 weight %; or from about 5 to about 40 weight %; or from about 5 to about 35 weight %, or from about 5 to about 30 weight %; or from about 10 to about 50 weight %; or from about 10 to about 40 weight %; or from about 10 to about 35 weight %; or from about 10 to about 30 weight %; or from about 15 to about 30 weight %; or from about 20 to about 30 weight %; based on the total weight percentages of (a) and (b) equaling 100 weight %.

In one embodiment of the invention, there are provided compositions wherein the residues of alkyl acetoacetate, diketene, or combinations thereof are present in an amount ranging from about 15 to about 30 weight %.

In one embodiment of the invention, there are provided compositions wherein the diol component (a)(i) is present in an amount ranging from about 35 to about 100; or from about 30 to about 95; or from about 35 to about 95; or from about 50 to about 95; or from about 50 to about 100; or from about 60 to about 100; or from about 60 to about 95; or from about 60 to about 90; or from about 60 to about 80; or from about 70 to 90; or from about 70 to 86; or from about 70 to 80 mole %; and the polyol component (a)(ii) is present in an amount ranging from about from about 0 to about 65; or from about 5 to about 65; or from 0 to about 50; or from about 5 to about 50; or from about 10 to about 50; or from about 0 to about 40; or from about 5 to about 40; or from about 10 to about 40; or from about 5 to about 30; or from about 10 to about 30; or from about 15 to about 30; or from about 14 to about 30; or from about 20 to 30 mole %; or from about 5 to about 15 mole %; wherein the total mole % of (a)(i) (diol component) and (a)(ii) (polyol component) equals 100 mole %.

In one embodiment of the invention, there are provided compositions wherein the polyesters are acetoacetate functional polyesters comprising the residues of
a. a hydroxyl component comprising:
  i. at least one diol in an amount ranging from about 60 to about 90 mole %, based on the total moles of (i) and (ii); and
  ii. a polyol in an amount ranging from about 10 to about 40 mole %, based on the total moles of (i) and (ii);
b. at least one carboxyl component comprising a polycarboxylic acid compound, a derivative of polycarboxylic acid compound, or a combination thereof; and
c. at least one compound selected from an alkyl acetoacetate, a diketene, or a combination thereof in an amount ranging from about 5 to about 65 weight %, based on the total weight of (a), (b), and (c).

In one embodiment of the invention, there are provided compositions wherein any of the compositions of the invention can comprise residues of alkyl acetoacetate, diketene, or combinations thereof, in an amount ranging from about 5 to about 65 weight %; or from about 5 to about 50 weight %; or from about 5 to about 40 weight %; or from about 5 to about 35 weight %, or from about 5 to about 30 weight %; or from about 10 to about 50 weight %; or from about 10 to about 40 weight %; or from about 10 to about 35 weight %, or from about 10 to about 30 weight %, based on the total weight percentages of (a), (b), and (c) equaling 100 weight %.

In one embodiment of the invention, there are provided compositions comprising residues of at least one polyol component such as 1,1,1-trimethylolpropane, 1,1,1-trimethylolethane, glycerin, pentaerythritol, erythritol, threitol, dipentaerythritol, sorbitol, and the like or combinations thereof.

In one embodiment of the invention, there are provided compositions comprising residues of at least one polyol component selected from 1,1,1-trimethylolpropane, pentaerythritol or combinations thereof.

In one embodiment of the invention, there are provided compositions wherein the polyol component comprises from 0.01 to 50 mole %; or from 0.01 to 45 mole %; or from 5 to 50 mole %; or from 10 to 50 mole %; or from 5 to 40 mole %; or from 10 to 40 mole %; or from 15 to 40 mole %; or from 5 to 35 mole %; or from 10 to 35 mole %; or from 15 to 35 mole %; or from 5 to 30 mole %; or from 10 to 30 mole %; or from 15 to 30 mole % of polyol residues based on the total mole percentages of the diol component and the polyol component equaling 100 mole %.

The hydroxyl functional polyesters that are used to prepare acetoacetate polyesters useful in the invention are typically synthesized by reacting a hydroxyl compound, for example, a diol or triol, with a carboxyl compound, for example, a dicarboxylic acid. Examples of hydroxyl compounds include diols such as 2,2-dimethyl-1,3-propanediol (neopentyl glycol), 2-methyl-1,3-propanediol (MPD), tricyclodecanedimethanol, 2-butyl-2-ethyl-1,3-propanediol, 1,4-butanediol, 1,6-hexanediol (HD), 1,2-cyclohexanedimethanol, 1,3-cyclohexanedimethanol, 1,4-cyclohexanedimethanol (CHDM), 2,2,4-trimethyl-1,3-pentanediol, hydroxypivalyl hydroxypivalate, 2,2,4,4-tetramethylcyclobutane-1,3-diol (TMCD), ethylene glycol, diethylene glycol, triethylene glycol, polyethylene glycol (PEG), or combinations thereof.

In one embodiment of the invention, there are provided compositions wherein the polyesters comprise residues of at least one diol component selected from the group consisting of neopentyl glycol, 2-methyl-1,3-propanediol, 1,6-hexanediol, 1,4-cyclohexanedimethanol, 2,2,4,4-tetramethylcyclobutane-1,3-diol, or combinations thereof.

In one embodiment of the invention, there are provided compositions wherein the polyesters can comprise 2-methyl-1,3-propanediol residues.

In one embodiment of the invention, there are provided compositions wherein the polyesters can comprise from 0 to 90 mole %; or from 5 to 90 mole %; or from 10 to 90 mole %; 0 to 80 mole %; or from 5 to 80 mole %; or from 10 to 80 mole %; or from 15 to 80 mole %; or from 20 to 80 mole %; or from 25 to 80 mole %; or from 35 to 80 mole %; or from 0 to 70 mole %; or from 5 to 70 mole %; or from 10 to 70 mole %; or from 15 to 70 mole %; or from 20 to 70 mole %; or from 25 to 70 mole %; or from 35 to 70 mole % of 2-methyl-1,3-propanediol residues, based on the total mole percentages of the diol component and the polyol component equaling 100 mole %.

In one embodiment of the invention, there are provided compositions wherein the polyesters can comprise from 5 to 40 mole %; or from 5 to 35 mole %; or from 5 to 30 mole % of 2-methyl-1,3-propanediol residues.

In one embodiment of the invention, there are provided compositions wherein the polyesters can comprise neopentyl glycol residues. In one embodiment of the invention, there are provided compositions wherein the polyester does not comprise neopentyl glycol residues.

In one embodiment of the invention, there are provided compositions wherein the polyesters can comprise from 0 to 50 mole %; or from 0 to 45 mole %; or from 0.01 to 50 mole %; or from 0.01 to 45 mole %; or from 5 to 35 mole %; or from 20 to 50 mole %; or from 20 to 45 mole %; or from 25 to 50 mole %; or from 25 to 45 mole %; or from 30 to 45 mole % of neopentyl glycol residues.

In one embodiment of the invention, there are provided compositions wherein the polyesters can comprise a total of 70 mole % of 2-methyl-1,3-propanediol residues and neopentyl glycol residues, based on a total mole percentage of the diol component and the polyol component equaling 100 mole % of the hydroxyl component.

In one embodiment of the invention, there are provided compositions wherein the polyesters can comprise residues of 1,4-cyclohexanedimethanol.

In one embodiment of the invention, there are provided compositions wherein the polyesters can comprise from 15 to 85 mole %; or from 20 to 80 mole %; or from 35 to 80 mole %; or from 40 to 75 mole %; or from 60 to 85 mole %; or from 65 to 80 mole %; or from 60 to 75 mole % of 1,4-cyclohexanedimethanol residues.

In one embodiment of the invention, there are provided compositions wherein the polyesters can comprise 1,6-hexanediol residues.

In one embodiment of the invention, there are provided compositions wherein the polyesters can comprise from 5 to 95 mole %; or from 5 to 85 mole %; or from 5 to 40 or from 15 to 85 mole %; or from 35 to 85 mole %; or from 55 to 85 mole % of 1,6-hexanediol residues.

In one embodiment of the invention, there are provided compositions wherein the polyesters can comprise from 0 to 85 mole % 1,6-hexanediol residues, and/or from 0 to 85 mole % of 1,4-cyclohexanedimethanol residues.

In one embodiment of the invention, there are provided compositions wherein the polyesters can comprise residues of 1,6-hexanediol and 1,4-cyclohexanedimethanol.

In one embodiment of the invention, there are provided compositions wherein the polyesters can comprise from 5 to 40 mole % 1,6-hexanediol and from 40 to 75 mole % of 1,4-cyclohexanedimethanol.

In one embodiment of the invention, the diol can be 2,2,4,4-tetraalkylcyclobutane-1,3-diol (TACD). Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, and 2,2,4,4-tetra-n-butylcyclobutane-1,3-diol. In one embodiment, the TACD can be TMCD.

In one embodiment of the invention, there are provided compositions wherein the polyesters can comprise residues of 2,2,4,4-tetramethyl-1,3-cyclobutanediol in the amount of 20 to 50 mole %; or 20 to 40 mole %; or 20 to 35 mole %; or 20 to 30 mole %; or 30 to 50 mole %; or 25 to 50 mole %; or 25 to 45 mole %; or 25 to 40 mole %; or 25 to 35 mole %; or 30 to 50 mole %; or 30 to 45 mole %; or 35 to 45 mole %.

In one embodiment of the invention, there are provided compositions wherein the polyesters do not comprise 2-methyl-1,3-propanediol residues.

The carboxyl compound can be a polycarboxylic acid compound, a derivative of polycarboxylic acid compound, or a combination thereof. Suitable polycarboxylic acid compounds can include compounds having at least two carboxylic acid groups. In one embodiment, the polycarboxylic acid compound comprises a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another embodiment, the polycarboxylic acid compound comprises a tricarboxylic acid or anhydride, for example, trimellitic acid or trimellitic anhydride.

Examples of dicarboxylic acids that can be used include but are not limited to aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itaconic acid, tetrahydrophthalic anhydride, tetrahydrophthalic acid, hexahydrophthalic acid or anhydride, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

In one embodiment of the invention, there are provided compositions wherein the polyesters can comprise at least one carboxyl component selected from the group consisting of adipic acid, isophthalic acid (or dimethyl isophthalate), terephthalic acid, dimethyl terephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

In one embodiment of the invention, there are provided compositions wherein the polyesters can comprise at least one carboxyl component selected from the group consisting of adipic acid and isophthalic acid, or combinations thereof.

In one embodiment of the invention, there are provided compositions wherein the polyesters can comprise at least one carboxylic acid component further comprising from 0 mole % to 100 mole % adipic acid and from 0 mole % to 100 mole % isophthalic acid; or from 50 mole % to 100 mole % adipic acid and from 0 mole % to 50 mole % isophthalic acid; based on the total mole % of the carboxylic acid component equaling 100 mole %.

In one embodiment of the invention, there are provided compositions wherein the polyesters can comprise (a) a dicarboxylic acid component comprising 50 to 100 mole % adipic acid, 0 to 50 mole % isophthalic acid; and (b) at least one polyol comprising residues of 5 to 40, or 10 to 40, or 10 to 30 mole % of 1,1,1-trimethylolpropane, pentaerythritol or combinations thereof, (c) the diol component comprises residues of 0 to 90 mole % 2-methyl-1,3-propanediol, and 0 to 50 mole % neopentyl glycol, (d) optionally, 1,6-hexanediol, and (e) optionally, 1,4-cyclohexanedimethanol; based on the total mole % of the dicarboxylic acid component equaling 100 mole % and the total mole % of the polyol and diol components equaling 100 mole %.

In one embodiment of the invention, there are provided compositions wherein the polyesters can comprise (a) a dicarboxylic acid component comprising 50 to 100 mole % adipic acid and 0 to 50 mole % isophthalic acid; (b) at least one polyol comprising residues of 5 to 40 mole %, 10 to 40 mole %, or 10 to 30 mole % 1,1,1-trimethylolpropane, pentaerythritol or combinations thereof, (c) the diol component comprises residues of from 0 to 90 mole % 2-methyl-1,3-propanediol, and from 0 to 50 mole % neopentyl glycol, (d) from 5 to 85; or from 5 to 40; or from 15 to 85; or from 35 to 85; or from 55 to 85 mole % 1,6-hexanediol, and/or (e) from 15 to 85; or from 20 to 80; or from 35 to 80; or from 40 to 75; or from 60 to 85; or from 65 to 80; or from 60 to 75 mole % of 1,4-cyclohexanedimethanol.

In one embodiment of the invention, there are provided compositions wherein either or both of Components (I) and (II) comprise at least one aromatic group. For example, the diacid of the polyester can comprise either isophthalic acid or terephthalic acid and/or the aldehyde can be terephthalaldehyde.

In one embodiment of the invention, there are provided compositions wherein diol component (a)(i) of the polyester contains only oxygen, carbon, and hydrogen.

In one embodiment of the invention, there are provided compositions wherein diol component (a)(i) of the polyester does not have any carbonyl groups (—CO—).

In one embodiment of the invention, there are provided compositions wherein diol component (a)(i) of the polyester does not contain ether groups.

In one embodiment of the invention, there are provided compositions comprising at least one polyether functionalized with acetoacetate groups, a polyester functionalized with acetoacetate groups, or combinations thereof.

In one embodiment of the invention, there are provided compositions wherein the polyether can be selected from at least one poly(alkylene glycol).

In one embodiment of the invention, there are provided compositions wherein at least one poly(alkylene glycol) can be selected from at least one of unsubstituted poly(alkylene glycol)s having alkylene chains of 1 to 4 carbon atoms, substituted or unsubstituted poly(alkylene glycol)s having alkylene chains of at least 4 carbon atoms or less than 10 carbon atoms.

In one embodiment of the invention, there are provided compositions wherein the poly(alkylene glycol)s can be selected from poly(ethylene glycol), poly(propylene glycol), poly(tetramethylene glycol), poly(pentamethylene glycol), poly(hexamethylene glycol), poly(heptamethylene glycol), or poly(octamethylene glycol).

In one embodiment of the invention, there are provided compositions wherein the poly(alkylene glycol)s can be selected from poly(ethylene glycol), poly(propylene glycol) and poly(tetramethylene glycol).

Almost any number of repeating units may be used, however, in one embodiment, the poly(alkylene glycol)s can have number average molecular weights in the range of about 500 to 5,000. Suitable poly(alkylene glycols) can have a variety of suitable end groups, including but not limited to hydroxyl, epoxy, methyl, and the like. Preferred end groups can be methyl and hydroxyl.

In one embodiment of the invention, there are provided compositions wherein the at least one polyether can be branched. For example, glycerol or sucrose may be included to increase branching, such as in propoxylated glycerol and propoxylated sucrose.

In one embodiment of the invention, there are provided compositions wherein the branching agents can be 1,1,1-trimethylolpropane, 1,1,1-trimethylolethane, glycerin, sorbitol, pentaerythritol, triisocyanates, sucrose, and/or aliphatic or aromatic glycols, or mixtures thereof.

The amount of polyether useful in the invention can vary as long as it can be formed into the desired article.

In one embodiment of the invention, there are provided compositions wherein Component (I) contains from 100% or less, or 0.01 to 100%, or 0.01 to 80%, or 0.01 to 65%, or 0.01 to 25%, or 20 to 100%, or 20 to 80%, or 20 to 65%, or 5 to 25%, or 20 to 80%, or 30 to 100%, or 30 to 80%, or 30 to 65%, or 40 to 100%, or 40 to 80%, or 40 to 65%, or 35 to 65%, or 35 to 54%, or 50 to 100%, or 50 to 80%, or 50 to 100%, or 50 to 80%, or 60 to 100%, or 60 to 80%, by weight of acetoacetylated polyether, based on the total weight percentage of Component (I) equaling 100 weight %. The remaining weight percentages can be any polymer or copolymer, for example, polyesters, polyurethanes, or polycarbonates (acetoacetylated or not).

In one embodiment of the invention, there are provided compositions wherein the polyethers comprise at least one polyalkylene oxide.

In one embodiment of the invention, there are provided compositions wherein at least one polyalkylene oxide can be selected from linear poly(ethylene oxide), linear poly(propylene oxide), linear copolymers of poly(ethylene oxide) and poly(propylene oxide), linear poly(1,3-trimethylene oxide), and linear poly(1,4-tetramethylene oxide).

In one embodiment of the invention, there are provided compositions comprising poly(alkylene glycol) copolymers. The copolymers may be alternating, random, segmented, block, graft, or branched.

In one embodiment of the invention, there are provided compositions wherein the polyether can be selected from poly(ethylene glycol)-ran-poly(propylene glycol), poly(ethylene glycol)-block-poly(propylene glycol)-block-poly(ethylene glycol) and poly(propylene glycol)-block-poly(ethylene glycol)-block-poly(propylene glycol).

In one embodiment of the invention, there are provided compositions wherein the polyether is a block copolymer where a poly(propylene glycol) is first initiated with a polyhydric alcohol and is then endcapped with ethylene oxide.

The polyether condensation product may be prepared using methods known in the art. For example, a polyether condensation product may be formed by reacting polyethylene glycol with tetramethyl cyclopentane-1,2,3,4-tetracarboxylate. This is a general method that may be used to prepare other polyether condensation products useful in the invention.

The condensation product of the polyethers can be produced by reacting at least one core molecule having more than one carboxylic acid group with a sufficient amount of at least one polyether terminated with hydroxy groups to produce an esterified polyether with an average of more than two hydroxy end groups. Suitable core molecules include, but are not limited to oxalic acid, malonic acid, succinic acid, glutaric acid, adipic acid, tetrahydrophthalic anhydride, tetrahydrophthalic acid, hexahydrophthalic acid or anhydride, benzenedicarboxylic acid, benzenetricarboxylic acid, benzenetetracarboxylic acid, cyclohexanetricarboxylic acid, cyclopentanetetracarboxylic acid, adamantanetetracarboxylic acid, biphenyltetracarboxylic acid, benzophenonetetracarboxylic acid, propanetricarboxylic acid, butanetetracarboxylic acid, and mixtures thereof.

In addition to poly(alkylene glycol)s, polyethers comprising polymeric ethers derived from cyclic ether monomers can be used. For example, poly(2,3-dihydrofurandiyl), prepared by cationic polymerization of 2,3-dihydrofuran, can be incorporated into an oxygen scavenging composition in the same fashion as the above-mentioned poly(alkylene glycol)s.

In one embodiment of the invention, there are provided compositions comprising blends of at least one acetoacetylated polyether resin and/or at least one acetoacetylated polyester resin(s) and optionally, other polymers.

In one embodiment of the invention, there are provided compositions comprising from 100% or less, or 0.01 to 100%, or 0.01 to 80%, or 0.01 to 65%, or 0.01 to 25%, or 20 to 100%, or 20 to 80%, or 20 to 65%, or 5 to 25%, or 20 to 80%, or 30 to 100%, or 30 to 80%, or 30 to 65%, or 40 to 100%, or 40 to 80%, or 40 to 65%, or 35 to 65%, or 35 to 54%, or 50 to 100%, or 50 to 80%, or 50 to 100%, or 50 to 80%, or 60 to 100%, or 60 to 80% by weight of acetoacetylated polyesters of the invention wherein the remaining weight percentages of the resin in Component (I) can be any polymer or copolymer, for example, polyethers, polyurethanes, or polycarbonates, (acetoacetylated or not), based on the total weight percentage of Component (I) equaling 100 weight %.

In one embodiment of the invention, there are provided compositions wherein the alkyl acetoacetate of Component (I) of the invention can be selected from acetoacetate, methyl acetoacetate, ethyl acetoacetate, n-propyl acetoacetate, isopropyl acetoacetate, n-butyl acetoacetate, isobutyl acetoacetate, t-amyl acetoacetate, diisopropyl carbinol acetoacetate, or mixtures thereof.

The hydroxyl number of the hydroxyl functional resin used to make the curable acetoacetate functional polyester resins can be within a range of from 0 to 300, or from 100 to 300, or from 120 to 200, or from 150 to 170 mg KOH/g.

In one embodiment, Component (I) or compositions of the invention can have an acid number (AN) of 0 to 20, or 0 to 15, or 0 to 10, or less than 10, or 0 to 5, or less than 20, or less than 5, or less than 2, or less than 1.5 mg KOH/g, with and/or without neutralizing agents being added to the composition.

In one embodiment of the invention, there are provided compositions wherein the acid number of Component (I) or the compositions of the invention can be from 0 to about 14, or from 0 to about 13, or from 0 to about 12, or from 0 to about 11, or from 0 to about 10, or from 0 to about 9, or from 0 to about 8, or from 0 to about 7, or from 0 to about 6, or from 0 to 5 or from 0 to about 4, or from 0 to about 3, or from 0 to about 2, or from 0 to about 1, or from 0.01 to about 15, or from 0.01 to about 14, or from 0.01 to about 13, or from 0.01 to about 12, or from 0.01 to about 11, or from 0.01 to about 10, or from 0.01 to about 9, or from 0.01 to about 8, or from 0.01 to about 7, or from 0.01 to about 6, or from 0.01 to 5 or from 0.01 to about 4, or from 0.01 to about 3, or from 0.01 to about 2, or from 0.01 to about 1.5, or from 0.01 to about 1, or from 0.50 to about 15, or from 0.50 to about 14, or from 0.50 to about 13, or from 0.50 to about 12, or from 0.50 to about 11, or from 0.50 to about 10, or from 0.50 to about 9, or from 0.50 to about 8, or from 0.50 to about 7, or from 0.50 to about 6, or from 0.50 to 5 or from 0.50 to about 4, or from 0.50 to about 3, or from 0.50 to about 2, or from 0.50 to about 1.5, or from 0.25 to about 1.25 mg KOH/g, with or without addition of neutralizing agents. In one embodiment, the acid number can be from 0.01 to about 2, or from 0.01 to about 1.5 mg KOH/g, without addition of neutralizing agents.

In one embodiment of the invention, there are provided compositions wherein the polyester has an acid number of less than about 10 mg KOH/g as measured according to ASTM Method D7253-16.

The acid number as referred to herein was measured by using a procedure based on ASTM D7253-16 entitled "Standard Test Method for Polyurethane Raw Materials: Determination of Acidity as Acid Number for Polyether Polyols," and hydroxyl number was measured using a procedure based on ASTM E222-17 entitled "Standard Test Methods for Hydroxyl Groups Using Acetic Anhydride."

In one embodiment of the invention, there are provided compositions wherein Component (I), e.g., acetoacetate functional polyester, acetoacetate functional polyether, or blends thereof can have a glass transition temperature (Tg) of about −85° C. to about 150° C.; or about −85° C. to about 130° C.; or about −85° C. to about 120° C.; or about −85° C. to about 110° C.; or about −85° C. to about 100° C.; or about −85° C. to about 80° C.; or about −85° C. to about 70°

C.; or about −85° C. to about 60° C.; or about −85° C. to about 50° C.; or about −85° C. to about 40° C.; or about −85° C. to about 30° C.; or about −85° C. to about 200° C.; or about −85° C. to about 10° C.; or about −85° C. to about 0° C.; or about −85° C. to about −10° C.; or about −85° C. to about −20° C.; or about −85° C. to about −25° C.; or about −85° C. to about 30° C.; or about −85° C. to about 60° C.; or about −85° C. to about 50° C.; or about −85° C. to about 40° C.; or about −85° C. to about 30° C.; or about −85° C. to about 20° C.; or about −85° C. to about 10° C.; or about −85° C. to about 0° C.; or about −85° C. to about −10° C.; or about −85° C. to about −20° C.; or about −850° C. to about −25° C.; or about −85° C. to about −30° C.; or about −70° C. to about 60° C.; or about −70° C. to about 50° C.; or about −70° C. to about 40° C.; or about −70° C. to about 30° C.; or about −70° C. to about 20° C.; or about −70° C. to about 10° C.; or about −70° C. to about −50° C.; or about −70° C. to about 0° C.; or about −70° C. to about −10° C.; or about −70° C. to about −20° C.; or about −70° C. to about −25°; or about −700 to about −30° C.; or about −6500 to about 60° C.; or about −65° C. to about 50° C.; or about −65° C. to about 40° C.; or about −65° C. to about 30° C.; or about −65° C. to about 25° C.; or about −65° C. to about 20° C. or about −65° C. to about 10° C.; or about −65° C. to about 0° C.; or about −65° C. to about −10° C.; or about −65° C. to about −20° C.; or about −65° C. to about −25° C.; or about −65° C. to about −30° C.; or about −45° C. to about 60° C.; or about −45° C. to about 50° C.; or about −45° C. to about 40° C.; or about −45° C. to about 30° C.; or about −45° C. to about 25° C.; or about −45° C. to about 20° C.; or about −45° C. to about 10° C.; or about −45° C. to about 0° C.; or about −45° C. to about −10° C.; or about −45° C. to about −20° C.; or about −45° C. to about −25° C.; or about −45° C. to about −30° C. As used herein, Tg and/or melting point (mp) is determined using a Q2000 differential scanning calorimeter (DSC) from TA Instruments, New Castle, Del., US, at a scan rate of 20° C./min.

In one embodiment of the invention, there are provided compositions wherein Component (I) can have a Tg of from about −85° C. to about −10° C.; or about −70° C. to about 50° C.; or about −70° C. to about 20° C.; or about −70° C. to about −10° C.; or about −70° C. to about −20° C.; or from about −65° C. to about 40° C.; or from about −65° C. to about 25° C.; or from about −65° C. to about −20° C.; or from about −65° C. to about −25° C.; or from about −10° C. to about 50° C.; or from about −45° C. to about −10° C.; or from about −45° C. to about −25° C.; or from about −10° C. to about 50° C.; or from about −45° C. to about −10° C.; or from about −45° C. to about −25° C.

In one embodiment of the invention, there are provided compositions wherein Component (I) can have a Tg of from about −70° C. to about 50° C.; or from about −70° C. to about 20° C.; or from about −70° C. to about −10° C.; or from about −45° C. to about −10° C.; or from about −70° C. to about −20° C.; or from about −60° C. to about −25° C. Depending on the applications, the uncured polyesters, polyethers and/or polyester/polyether blends can have high or low Tg's.

In one embodiment of this invention, there are provided compositions wherein Component (I) can have a melting point from about 10 to about 150° C., or from about 10 to 100° C., or from about 10 to 80° C., or from about 10 to 75° C., or from about 10 to 60° C., or from 15 to about 150° C., or from about 15 to 100° C., or from about 15 to 80° C., or from about 15 to 75° C., or from about 25 to 60° C., or from 25 to about 150° C., or from 25 to about 100° C., or from 25 to about 80° C., or from about 25 to 75° C., or from about 25 to 60° C.

The number average molecular weight (Mn) of Component (I) useful in the present invention can be from 500 to 100,000; or from 700 to 50,000; or from 700 to 40,000; or from 700 to 30,000; or from 700 to 25,000; or from 700 to 20,000; or from 700 to 15,000; or from 700 to 10,000; or from 700 to 9,000; or from 700 to 8,000; or from 700 to 7,000; or from 1000 to 6,000; or from 700 to 5,000; or from 700 to 4,000; or from 700 to 3500; or from 1,000 to 50,000; or from 1,000 to 40,000; or from 1,000 to 30,000; or from 1,000 to 25,000; or from 1,000 to 20,000; or from 1000 to 15,000; or from 1000 to 10,000; or from 1000 to 9,000; or from 1000 to 8,000; or from 1000 to 7,000; or from 1000 to 6,000; or from 1000 to 5,000; or from 1000 to 4,000; or from 1200 to 3500; or from 1500 to 4000; or from 1500 to 3500; or from 1500 to 3000; or from 1500 to 2500; or from 1400 to 3000; or from 1400 to 2500; or from 500-6000 g/mol.

In one embodiment of the invention, there are provided compositions wherein Component (I) can have a number average molecular weight (Mn) from 1000-6000 g/mol; or 1000-5000 g/mol; or 1500-4000 g/mol; or 1400-3000 g/mol; or 1400-2500 g/mol; or 1500-3500 g/mol; or 1500-3000 g/mol; or 1500-2500 g/mol; or 500-6000 g/mol; or 1000-6000 g/mol. The polyester can be linear or branched. The polyester can be amorphous or semi-crystalline. The Mn is measured by gel permeation chromatography (GPC) using polystyrene equivalent molecular weight.

In this invention, viscosity can be reported as Brookfield viscosity or complex viscosity. Brookfield viscosity can be measured using a Brookfield viscometer as described in ASTM D3236 "Apparent Viscosity of Hot Melt Adhesives and Coating Materials." Complex viscosity can be measured by a Discovery Hybrid Rheometer (DHR). In one embodiment of the invention, for example, for solventless compositions, complex viscosity can be measured in centipoise (cP) at or above 25° C. by a Discovery Hybrid Rheometer (DHR), T.A. Instruments.

For cured or uncured compositions, Brookfield and/or complex viscosity measurements can be reported in centipoise (cP) units. In various embodiments, Component (I) of the invention and/or the curable (pre-cured) compositions of the invention, for example, adhesive compositions, can exhibit a Brookfield viscosity or a complex viscosity in the range of 5 to 700,000 cP, or 5 to 300,000 cP, or 300 to 200,000 cP, or 300 to 150,000 cP, or 300 to 100,000 cP, or 500 to 200,000 cP, or 500 to 150,000 cP, or 500 to 100,000 cP, or 500 to 90,000 cP, or 500 to 80,000 cP, or 500 to 50,000 cP, or 500 to 45,000 cP, or 500 to 40,000 cP, or 500 to 35,000 cP, or less than 30,000 cP, or 500 to 30,000 cP, or 500 to 25,000 cP, or 500 to 20,000 cP, or 500 to 15,000 cP, or 500 to 10,000 cP, or 500 to less than 10,000 cP, or 500 to 8,000 cP or 500 to 5,000 cP, or 500 to 3,000 cP, or 1000 to 100,000 cP, or 1000 to 90,000 cP, or 1000 to 80,000 cP, or 1000 to 50,000 cP, or 1000 to 45,000 cP, or 1000 to 40,000 cP, or 1000 to 35,000 cP, or 1000 to 30,000 cP, or 1000 to 25,000 cP, or 1000 to 20,000 cP, or 1000 to 15,000 cP, or 1000 to 10,000 cP, or 1000 to less than 10,000 cP, or 1000 to 8,000 cP or 1000 to 5,000 cP, or 1000 to 3,000, or 5000 to 90,000 cP, or 5000 to 80,000 cP, or 5000 to 50,000 cP, or 5000 to 45,000 cP, or 5000 to 40,000 cP, or 5000 to 35,000 cP, or 5000 to 30,000 cP, or 5000 to 25,000 cP, or 5000 to 20,000 cP, or 5000 to 15,000 cP, or 5000 to 10,000 cP, or 5000 to less than 10,000 cP, or 5000 to 8,000 cP, or 10,000 to 90,000 cP, or 10,000 to 80,000 cP, or 10,000 to 50,000 cP, or 10,000 to 45,000 cP, or 10,000 to 40,000 cP, or 10,000 to 35,000 cP, or 15,000 to 90,000 cP, or 15,000 to 80,000 cP, or 15,000 to 50,000 cP, or 15,000 to 45,000 cP, or 15,000 to 40,000 cP, or 15,000 to 35,000 cP, or 20,000 to 90,000 cP, or 20,000 to 80,000 cP, or 20,000 to 50,000 cP, or 20,000 to 45,000 cP, or 20,000 to 40,000 cP, or 20,000 to 35,000 cP, or 25,000 to 90,000 cP, or 25,000 to 80,000 cP, or 25,000 to 50,000 cP, or 25,000 to 45,000 cP, or 25,000 to 40,000 cP, or 25,000 to 35,000, or 30,000 to 90,000 cP, or 30,000 to 80,000 cP, or 30,000 to 50,000 cP, or 30,000 to 45,000 cP, or 30,000 to 40,000 cP, or 35,000 to 90,000 cP, or 35,000 to 80,000 cP, or 35,000 to 50,000 cP, or 35,000 to 45,000 cP, or 35,000 to 40,000 cP, at application temperature, or at room temperature, or at 50° C. or less, or at 45° C. or less, or at 40° C. or less. The desired viscosity of the final composition will depend upon the application and can be adjusted for the application method.

In one embodiment of the invention, there are provided compositions wherein the Brookfield viscosity (or the complex viscosity) of Component (I) or any of the compositions of the invention is less than 700,000 centipoise, or less than 300,000 centipoise, or from 500 to 300,000 centipoise, or less than 100,000 centipoise, or less than 80,000 centipoise, or less than 30,000 centipoise, or less than 20,000 centipoise, or less than 10,000 centipoise, or less than 5,000 centipoise, or from 500 to 30,000 centipoise, or from 4500 centipoise or less, or from 2500 centipoise or less, or from 2000 centipoise or less, or 1000 centipoise or less, at application temperature, or at room temperature, or at 50° C. or less, or at 45° C. or less, or at 40° C. or less.

In one embodiment of the invention, there are provided compositions wherein the Brookfield viscosity (or the complex viscosity) of Component (I) or the compositions of the invention is less than 300,000 centipoise, or from 500 to 300,000 centipoise, or less than 30,000 centipoise, or from 500 to 30,000 centipoise, at application temperature, or at room temperature, or at 50° C. or less, or at 45° C. or less, or at 40° C. or less.

In one embodiment of the invention, there are provided compositions wherein the Brookfield viscosity (or the complex viscosity) of Component (I) or the curable compositions of the invention is from 500 cP or less, or 100 cP or less, or 50 cP or less, or from 1 to 100 cP, or from 1 to 50 cP, or from 10 to 50 cP, at application temperature, or at room temperature, or at 50° C. or less, or at 45° C. or less, or at 40° C. or less.

In one embodiment of the invention, there are provided curable compositions, e.g., solventless compositions, wherein the Brookfield viscosity (or the complex viscosity) of Component (I) or any of the compositions of the invention is from 5 to 5,000 cP, or 5000 cP or less, or 4500 cP or less, or 2500 cP or less, or 2000 cP or less, or 1500 cP or less, or 1000 cP or less, at application temperature, or at room temperature, or at 50° C. or less, or at 45° C. or less, or at 40° C. or less.

In other embodiments, the curable adhesive compositions may exhibit a ring and ball softening point in the range of −10 to 180° C.

In one embodiment of the invention, there are provided compositions comprising an adduct having two or more β-ketoacetate functional groups selected from 2-methyl-1, 3-propanediol diacetoacetate; neopentyl glycol diacetoacetate; 2,2,4,4-tetramethylcyclobutane-1,3-diol diacetoacetate; or trimethylolpropane triacetoacetate. These adducts can function as reactive diluents to reduce the viscosity of the curable formulations, especially those of solventless formulations for extending their pot life and/or for modifying the functionality of the β-ketoacetate functional groups available for curing agents.

In one embodiment of the invention, there are provided compositions comprising an adduct having two or more β-ketoacetate functional groups selected from 2-methyl-1, 3-propanediol diacetoacetate, 2,2,4,4-tetramethylcyclobutane-1,3-diol diacetoacetate; neopentyl glycol diacetoacetate, and trimethylolpropane triacetoacetate.

In one embodiment of the invention, there are provided compositions wherein at least one basic catalyst or activating agent can be selected from the group consisting of primary and/or secondary amines (primary amines are defined herein as comprising primary amine functionality and secondary amines are defined herein as comprising secondary amine functionality), salts thereof and/or mixtures thereof, including but not limited to aliphatic, cycloaliphatic, aliphatic-aromatic, and/or aromatic amines. For example, the definition of a primary amine does not exclude an amine having both primary amine functionality and tertiary amine functionality. Salts of the amines can include but are not limited to their carboxylate, phosphate, sulfate, and/or hydrochloride salts. The salt of the amine can be prepared by any method known in the art or by the following methods: (1) in situ by addition of the corresponding acid and amine and/or (2) it can be prepared separately by pre-reacting amine and acid and adding as a single component as a catalyst to the curable composition.

In one embodiment of the invention, there are provided compositions wherein said at least one amine can be selected from C1-C20 aliphatic amines, C1-C20 cycloaliphatic amines, or combinations thereof.

In one embodiment of the invention, there are provided compositions wherein at least one amine comprising at least one primary and/or secondary functionality can be selected from at least one of: piperidine; piperazine; morpholine, pyrrolidine; ethylenediamine; diethylenetriamine; triethylenetetramine (TETA) or isomers thereof; tetraethylenepentamine or isomers thereof; 2,4,4-trimethylhexamethylenediamine; 1,2-diaminopropane; 1,3-diaminopropane; 1-ethyl-1, 3-propanediamine; 2,2-dimethylpropylenediamine; 1,4-diaminobutane; 2-methylpentamethylenediamine (MPMDA); 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl) ethylenediamine; 2,4-toluenediamine; 2,6-toluenediamine; 3-dimethylaminopropylamine (DMAPA); 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine (IPDA); norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl) aniline; diethyltoluenediamine; m-phenylenediamine; 1,2,4-triazole; alanine; proline; 1,4,8,11-tetraazacyclotetradecane (cyclam); diphenylethylenediamine; 2,2,4,4-tetramethylcyclobutane-1,3-diamine; 2,2-dimethylpropane-1,3-diamine; 2,3-dimethylbutane-2,3-diamine; 1,2-diaminocyclopentane;

1,2,2-trimethylcyclopentane-1,3-diamine; 1,7,7-trimethylbicyclo[2.2.1]heptane-2,3-diamine; dioctyl amine; diisopropylamine; and/or polyetheramines such as JEFFAMINE® D-230, D-400, D-2000, and T-403 amines.

In one embodiment of the invention, there are provided compositions wherein the amine comprises primary amine functionality and can be selected from at least one of: ethylenediamine; diethylenetriamine; triethylenetetramine (TETA) or isomers thereof; tetraethylenepentamine or isomers thereof; 3-dimethylaminopropylamine (DMAPA); 3-diethylaminopropylamine; 2,2,4-trimethylhexamethylenediamine; 1,2-diaminopropane; 1,3-diaminopropane; 2,2-dimethylpropylenediamine; 1,4-diaminobutane; 2-methylpentamethylenediamine (MPMDA); 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediamine; 2,6-toluenediamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine (IPDA); norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine, or combinations thereof.

In one embodiment, the amines of the invention having primary amine functionality can comprise aminosilanes including but not limited to the following: 3-(dimethoxymethylsilyl)propylamine; 4-amino-3,3-dimethylbutyl trimethoxysilane; 4-amino-3,3-dimethylbutylmethyl dimethoxysilane; 3-aminopropylmethyl diethoxysilane; N-(2-aminoethyl)-3-aminopropyl trimethoxysilane; N-(2-aminoethyl)-3-aminopropyl triethoxysilane; (3-trimethoxysilylpropyl)diethylenetriamine; 3-(1,3-dimethylbutylidene)aminopropyltriethoxysilane; 3-(2-aminoethylamino)propyldimethoxymethylsilane; 3-(2,8,9-trioxa-5-aza-1-sila-bicyclo[3.3.3]undec-1-yl)-propylamine; trimethoxysilylpropylamine; and triethoxysilylpropylamine.

In one embodiment of the invention, amines having primary amine functionality can comprise any specifically listed herein or any combination(s) thereof.

In one embodiment of the invention, there are provided compositions wherein at least one amine can be selected from the group consisting of triethylenetetramine (TETA) including isomers thereof, 3-dimethylaminopropyl amine, 2-methylpentamethylenediamine, hexamethylene diamine (HMDA), piperidine, piperazine, 1,4,8,11-tetraazacyclotetradecane, pyrrolidine, or combinations thereof.

In one embodiment of the invention, there are provided compositions wherein at least one amine can be selected from the group consisting of triethylenetetramine or isomers thereof, 3-dimethylaminopropyl amine, 2-methylpentamethylenediamine, hexamethylene diamine, or combinations thereof.

In one embodiment of the invention, there are provided compositions wherein at least one amine has secondary amine functionality.

In one embodiment of the invention, there are provided compositions wherein at least one amine can be selected from the group consisting of piperidine, piperazine, triethylenetetramine or isomers thereof, 2-methylpentamethylenediamine, hexamethylene diamine or combinations thereof.

In one embodiment of the invention, there are provided compositions wherein said at least one amine can be selected from sterically hindered C1-C20 dialkyl amines, such as diisopropylamine.

In one embodiment of the invention, there are provided compositions wherein said at least one amine can be selected from C1-C20 dialkyl amines such as diisopropylamine and dioctylamine.

In one embodiment of the invention, there are provided compositions wherein monoethylamine and/or amines having only tertiary amine functionality, i.e., no primary or secondary amine functionality, are excluded.

In one embodiment of the invention, there are provided compositions wherein amines having any tertiary amine functionality and/or monoethylamine are excluded.

In one embodiment of the invention, there are provided compositions wherein the amine is a solid or a liquid.

In one embodiment of the invention, there are provided compositions wherein at least one amine and/or any reaction product thereof is present in the amount of up to 25 parts per hundred (phr) based on the total weight of Component (I), the resin.

The compositions of the present invention can comprise one or more base catalysts of Component (III) selected from at least one amine, including but not limited to amines having primary and/or secondary amine functionality, salts thereof and/or mixtures thereof, in an amount ranging from 0.10 to 10, 0.10 to 9.0, 0.10 to 8.0, 0.10 to 7.0, 0.10 to 6.0, 0.10 to 5.0, 0.10 to 4.0, 0.10 to 3.0, 0.10 to 2.0, 0.10 to 1.0, 0.20 to 10, 0.20 to 9.0, 0.20 to 8.0, 0.20 to 7.0, 0.20 to 6.0, 0.20 to 5.0, 0.20 to 4.0, 0.20 to 3.0, 0.20 to 2.0, 0.20 to 1.0, 0.30 to 10, 0.30 to 9.0, 0.30 to 8.0, 0.30 to 7.0, 0.30 to 6.0, 0.30 to 5.0, 0.30 to 4.0, 0.30 to 3.0, 0.30 to 2.0, 0.30 to 1.0, 0.40 to 10, 0.40 to 9.0, 0.40 to 8.0, 0.40 to 7.0, 0.40 to 6.0, 0.40 to 5.0, 0.40 to 4.0, 0.40 to 3.0, 0.40 to 2.0, 0.40 to 1.0, 0.50 to 10, 0.50 to 9.0, 0.50 to 8.0, 0.50 to 7.0, 0.50 to 6.0, 0.50 to 5.0, 0.50 to 4.0, 0.50 to 3.0, 0.50 to 2.0, 0.50 to 1.0, 1.0 to 10, 1.0 to 9.0, 1.0 to 8.0, 1.0 to 7.0, 1.0 to 6.0, 1.0 to 5.0, 1.0 to 4.0, 1.0 to 3.0, or 1.0 to 2.0 phr, based on the total weight of Component (I), the resin.

In one embodiment of this invention, there are provided compositions comprising one or more base catalysts selected from at least one amine, including but not limited to primary and/or secondary amines, salts thereof and/or mixtures thereof, in an amount ranging from 0.1 to 15 phr, or 0.1 to 10 phr, or from 0.10 to 3 phr, or 0.5 to 10 phr, or 0.5 to 10 phr, or 0.5 to 10 phr, or 0.1 to 10 phr, or 0.1 to 3 phr, or 0.1 to 1.5 phr, or 3 to 10 phr, or 1 to 9 phr, or 0.2 to 7 phr, or 0.3 to 6 phr, or 0.5 to 5 phr, or 0.5 to 3 phr, or 0.5 to 2 phr, or 1 to 10 phr, or 1 to 3 phr, or 1 to 2 phr, or 1 to 1.5 phr or 0.5 to 1.5 phr, based on the total weight of Component (I), the resin.

In one embodiment of this invention, there are provided compositions wherein the amine and/or reaction product thereof is present in an amount ranging from 0.5 to 10 phr, 3 to 10 phr, 1 to 9 phr, 0.5 to 5 phr, or 1 to 1.5 phr based on the total weight of Component (I), the resin and depending on the application.

In one embodiment of this invention, there are provided compositions wherein the amine and/or reaction product thereof is present in an amount ranging from 0.5 to 10 phr, or 0.5 to 5 phr, or 0.5 to 4.5 phr based on the total weight of Component (I), the resin.

In one embodiment of this invention, there are provided compositions wherein the amine is present in an amount ranging from 0.5 to 4.5, or 0.5 to 4.0, or 0.5 to 3.5, or 0.5 to 3.0, or 0.5 to 2.5, or 0.5 to 2.0, or 0.5 to 1.5, or 0.5 to 1.0 phr, based on the total weight of Component (I), the resin.

In one embodiment of this invention, there are provided compositions where the curing agent with aldehyde functional groups can be either Component (II) or where components (II) and (III) have been first reacted.

In one embodiment of the invention, there are provided compositions wherein the curing agent comprises an aliphatic, or aromatic, di- or poly-aldehyde or mixtures thereof. In one embodiment, the curing agent (II) can be a small molecule or an adduct having one or more aldehyde functional groups or two or more aldehyde functional groups.

The aldehydes useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company, Midland, Mich., US; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde (TCDDAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanal; or any isomers thereof; or mixtures thereof.

In one embodiment of the invention, the aldehyde useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company; 2,6-norbornanedicarboxaldehyde; terephthalaldehyde, isophthalaldehyde, orthophthalaldehyde, cyclopenta-3,5-diene-1,3-dicarbaldehyde and tricyclodecane dialdehyde, or any isomers thereof or any combinations thereof.

In one embodiment of the invention, the aldehyde useful in the invention can be selected from at least one of mixtures of 1,3- and 1,4-CHDAL, terephthalaldehyde, orthophthalaldehyde, and tricyclodecane dialdehyde, or any isomers thereof or any combinations thereof.

The aldehyde compounds may be made latent to improve storage stability and/or extend the open time for application of the curable composition of the invention. The aldehyde may be reacted with a diol such as ethylene glycol to form a dioxolane, with an amine to form an imine, with hydroxylamine to form an oxime, or with sodium bisulfite to form a sulfonate salt. The resulting latent aldehydes may be activated by changing the pH, heating or during the curing time.

In one embodiment of the invention, there are provided compositions wherein monoaldehydes are excluded from the scope of this invention.

In one embodiment of the invention, there are provided compositions wherein the aldehydes or compounds with aldehyde functional groups (e.g., wherein Components (II) and (III) are first reacted to make a reaction product that has aldehyde functional groups) useful in the invention can act as crosslinkers and/or curing agents. (For example, where Components (II) and (III) are first reacted to make a reaction product, this reaction product can be a compound that has aldehyde functional groups and/or amine functional groups and/or that has no aldehyde or amine functional groups).

In one embodiment of the invention, there is provided the curable composition wherein the starting molar ratio for Component (II):Component (III) for producing a Component (III) with latent reactivity is from 10:1 to 0.1:10, or from 10:1 to 1:10, or from 5:1 to 1:2. In some examples, the starting molar ratio for Component (II):Component (III) can be 2:1, or 4:1, or 1:2.

In one embodiment of the invention, there is provided the curable composition wherein the product(s) of the combination of said amine or said curing agent or any of Components (III)(a)-(d) with at least one reactivity delayer of Component (IV) has an average particle size of 1500 microns or less; of 1000 microns or less; or 0 to 500 microns; or less than 400 microns; or less than 250 microns; or less than 125 microns; or less than 150 microns; or less than 100 microns; or less than 50 microns; or 30 microns or less; or 10 microns or less; or 1 microns or less; or from 10 to 150 microns; or from 10 to 100 microns; or from 5 to 50 microns.

In one embodiment of the invention, there is provided the curable composition wherein the solid amine and/or the solid aldehyde and/or Components (III)(a)-(d) can have an average particle size of 1500 microns or less; of 1000 microns or less; or 0 to 500 microns; or less than 400 microns; or less than 250 microns; or less than 125 microns; or less than 150 microns; or less than 100 microns; or less than 50 microns; or 30 microns or less; or 10 microns or less; or 1 microns or less; or from 10 to 150 microns; or from 10 to 100 microns; or from 5 to 50 microns.

In one embodiment, at least one semi-crystalline polyester resin can be used. In one embodiment, the semi-crystalline polyester resin can possess enough crystalline character to give the material a sharp melting point rather than slowly softening when heated. The semi-crystalline polyester resin can be a solid, a waxy or a semi-solid material at room temperature with a melting point, for example, from 10 to 100° C., or for example, from 15 to 75° C., or for example, from 25 to 65° C.

The glass transition temperature (Tg) of the semi-crystalline polyester useful in the invention can be from −70 to 20° C., or from −60 to 0° C., or from −50 to −20° C., or in any subsets of the ranges mentioned herein for the polyester useful in the invention.

The semi-crystalline polyester resin, like the other polyesters useful herein, can have a number average molecular weight (Mn) from 1000-5000 g/mol, or from 1500-4000 g/mol.

In this invention, "curing" means to develop at least one strength property and/or increase in the average molecular weight (either Mn or Mw) of the composition(s) of the invention, for example, an adhesive composition or a coating composition, by chemical reaction. "Curing agent" means a substance or mixture of substances that reacts with resin during a curing reaction. "Curing temperature" means the temperature to which the composition(s) of the invention or an article of manufacture containing the composition(s) of the invention is subjected to cure the composition. "Curing time" means the period of time for curing of the composition(s) of the invention to occur, whether or not they cure at room temperature, and whether or not they are subjected to application of thermal energy; radiation, e.g., microwave, ultraviolet, or infrared radiation; ultrasonic waves; pressure; moisture; or other sources of activation; or by chemical reaction; or any other variables. "Curable" means capable of curing.

In one embodiment of the invention, there are provided compositions comprising essentially no solvent or which is solventless except for where solvents can be added to the final composition to adjust the viscosity. By solventless or comprising essentially no solvent, it is meant that solvent is present in an amount of 0 to 5 weight % or 0 to 2 weight % based on the total weight of the composition.

In one embodiment of the invention, there are provided compositions wherein Components (I)-(III) are mixed or reacted without the presence of solvent.

In one embodiment of the invention, there are provided compositions wherein Components (I)-(III) are mixed or reacted in the presence of solvent.

In one embodiment of the invention, there are provided compositions wherein said adducts having two or more β-ketoester functional groups described herein are used as reactive diluents to reduce the viscosity of the curable compositions and/or to reduce the solvent content.

The curable composition of the invention may be essentially solvent free, solvent-less or solvent-based. In one embodiment, the solvent-based composition of the invention comprises an organic solvent. Suitable organic solvents include ethyl acetate, butyl acetate, xylene, ketones (for example, acetone, methyl amyl ketone and methyl ethyl ketone), 2-butoxyethanol, ethyl-3-ethoxypropionate, toluene, butanol, cyclopentanone, cyclohexanone, ethanol, and other volatile inert solvents typically used in adhesives and coatings.

In one embodiment of the invention, there are provided compositions which contains one or more organic solvents selected from the group comprising ethyl acetate, butyl acetate, xylene, methyl amyl ketone, methyl ethyl ketone, ethanol, acetone, methanol and toluene.

In one embodiment of the invention, there are provided compositions wherein at least one solvent can be selected from ethyl acetate, butyl acetate, ethanol and acetone, or combinations thereof.

In one embodiment of the invention, there are provided compositions wherein at least one solvent can be selected from ethyl acetate, butyl acetate, or combinations thereof.

In one embodiment of the invention, there are provided compositions wherein said organic solvents are used to reduce the viscosity of the adhesive composition.

In one embodiment of the invention, there are provided compositions comprising at least one solvent which is not an ether or polyether and/or which does not contain ether groups.

In one embodiment of this invention, the curable composition of this invention does not contain solvents or residual amounts of solvents such as ethylene glycol and/or ether-containing compounds, for example, dimethyl ether, ethylene glycol diethyl ether, diethylene glycol dimethyl ether, or diethylene glycol diethyl ether.

The amount of solvents (excluding water) can range from 0% to 75%, 5% to 75%, 10% to 75%, 15% to 75%, 20% to 75%, 25% to 75%, 30% to 75%, 35% to 75%, 40% to 70%, 0% to 70%, 5% to 70%, 10% to 70%, 15% to 70%, 20% to 70%, 25% to 70%, 30% to 70%, 35% to 70%, 40% to 70%, 0% to 65%, 5% to 65%, 10% to 65%, 15% to 65%, 20% to 65%, 25% to 65%, 30% to 65%, 35% to 65%, 40% to 65%, 0% to 60%, 5% to 60%, 10% to 60%, 15% to 60%, 20% to 60%, 25% to 60%, 30% to 60%, 35% to 60%, 40% to 60%, 0% to 55%, 5% to 55%, 10% to 55%, 15% to 55%, 20% to 55%, 25% to 55%, 30% to 55%, %35% to 55%, 40% to 55%, 0% to 50%, 5% to 50%, 10% to 50%, 15% to 50%, 20% to 50%, 25% to 50%, 30% to 50%, 35% to 50%, 40% to 50%, 0% to 45%, 5% to 45%, 10% to 45%, 15% to 45%, 20% to 45%, 25% to 45%, 0% to 40%, 5% to 40%, 10% to 40%, 15% to 40%, 20% to 40%, 25% to 40%, or 0% to 5% by weight based on the total weight of the composition equaling 100 weight %.

In one embodiment, the amount of solvents (excluding water) can range from 20 to 65%, or 20 to 55%, or 20 to 50%, or 25 to 45%, or 40 to 60%, or 25 to 55%, or 25 to 60%, by weight based on the total weight of the composition equaling 100 weight %. The percentage by weight of solids (based on the total weight of the composition equaling 100 weight %) is the remainder of the weight % of the composition that does not comprise solvent(s).

Therefore, the percentage by weight of solids based on the total weight of the composition equaling 100 weight % would be, for example, 20% to 100%, 20% to 95%, 20% to 90%, 20% to 85%, 20% to 80%, 20% to 75%, 20% to 70%, 25% to 100%, 25% to 98%, 25% to 95%, 25% to 90%, 25% to 85%, 25% to 80%, 25% to 75%, 25% to 70%, 30% to 100%, 30% to 95%, 30% to 90%, 30% to 85%, 30% to 80%, 30% to 75%, 30% to 70%, 35% to 100%, 35% to 95%, 35% to 90%, 35% to 85%, 35% to 80%, 35% to 75%, 35% to 70%, 40% to 100%, 40% to 95%, 40% to 90%, 40% to 85%, 40% to 80%, 40% to 75%, 40% to 70%, 50% to 100%, 50% to 95%, 50% to 90%, 50% to 85%, 50% to 80%, 50% to 75%, 50% to 70%, 50% to 65%, 50% to 60%, 55% to 100%, 55% to 95%, 55% to 90%, 55% to 85%, 55% to 80%, 55% to 75%, 55% to 70%, 55% to 65%, 60% to 100%, 60% to 95%, 60% to 90%, 60% to 85%, 60% to 80%, 60% to 75%, 60% to 70%, 95% to 99.99%, or 98% to 99.99%.

In one embodiment of the invention, there is provided composition(s) of the invention wherein the solids content is from 25 to 100, or from 25 to 98, or from 25 to 95, or from 35 to 80, or from 35 to 75, or from 40 to 60, or from 45 to 60, or from 40 to 65, or from 45 to 65, or from 50 to 80, or from 55 to 75% by weight solids.

In one embodiment of the invention, there is provided composition(s) of the invention wherein the solids content is from 25 to 80, or from 30 to 80, or from 35 to 80, or from 35 to 75, or from 30 to 65, or from 30 to 60, or from 40 to 60, or from 45 to 60, or from 40 to 65, or from 45 to 65, or from 50 to 80, or from 55 to 75% by weight solids.

In one embodiment of the invention, there is provided composition(s) of the invention wherein the solids content is from 25 to 100% by weight solids, 25 to 95% by weight solids, or 95% by weight solids or greater, or 100% by weight solids.

In one embodiment of the invention, there is provided composition(s) of the invention wherein the solids content of the composition is from 35 to 75% by weight solids.

In one embodiment of the invention, there are provided compositions wherein the solids content of the composition is from 35 to 75% by weight solids.

In some cases, the composition(s) of the invention can be a liquid composition in water or solvent, applied to a surface and dried or permitted to dry, while, in other embodiments, the composition may be at or near 100 percent solids.

The term "excluding water", as used herein, means that water is not added as a solvent but moisture and/or water can be formed during the curing process.

In one embodiment of this invention, the curable composition of the invention can be water-free, and/or moisture-free, and/or can comprise substantially no water, and/or can contain essentially no water, or can contain one of the following percentages of water: 0 to 20 weight %, 0 to 19 weight %, 0 to 18 weight %, 0 to 17 weight %, 0 to 16 weight %, 0 to 15 weight %, 0 to 14 weight %, 0 to 13 weight %, 0 to 12 weight %, 0 to 11 weight %, 0 to 10 weight %, 0 to 9 weight %, 0 to 8 weight %, 0 to 7 weight %, 0 to 6 weight %, 0 to 5 weight %, 0 to 4 weight %, 0 to 3 weight %, 0 to 2 weight %, 0 to 1 weight %, 0.01 to 20 weight %, 0.01 to 19 weight %, 0.01 to 18 weight %, 0.01 to 17 weight %, 0.01 to 16 weight %, 0.01 to 15 weight %, 0.01 to 14 weight %, 0.01 to 13 weight %, 0.01 to 12 weight %, 0.01 to 11 weight %, 0.01 to 10 weight %, 0.01 to 9 weight %, 0.01 to 8 weight %, 0.01 to 7 weight %, 0.01 to 6 weight %, 0.01 to 5 weight %, 0.01 to 4 weight %, 0.01 to 3 weight %, 0.01 to 2 weight %, or 0.01 to 1 weight %, based on the total weight of the composition. The term "substantially water free" means that no more than 0.01 to 2 weight % water can be present prior to the curing reaction.

However, presence of water in the compositions of the invention can be used within the context of this invention to control cure rate by slowing it down. Water or moisture can be added to or generated in the compositions of the invention by any method known in the art, e.g., the amines/catalysts can be chosen based on their ability to absorb water.

In one embodiment of this invention, there are provided curable compositions which, upon curing, can release essentially no Volatile Components, e.g., VOCs, or has low Volatile Components, e.g., VOCs, released before, during, and/or after curing, or less than 5 weight %, less than 4 weight %, less than 3 weight %, less than 2 weight %, or less than 1 weight %°/Volatile Components or VOCs; based on the total weight of the composition. In one embodiment, the cure delaying functionality reduces or eliminates Volatile Component(s) in the final formulation.

In one embodiment of this invention, there are provided curable compositions which, upon curing, can release essentially no gases or no gases.

In one embodiment of the invention, there are provided compositions further comprising at least one compound selected from waxes; paraffins; rosins; rosin ester resins; tackifier resins; polyester resins; polyol resins; or acrylics, the acrylics having a number average molecular weight of from about 2,000 to 15,000 and a Tg of from about 40° C. to 130° C.; or mixtures thereof.

In one embodiment of the invention, there are provided compositions that is used at, or above, or near its glass transition temperature.

In one embodiment of the invention, there is provided a cured composition wherein ΔT is the difference between the temperature at use and the glass transition temperature (Tg) of the cured composition, and ΔT is from −30 to 60° C. or from −30 to 10° C.

In one embodiment of the invention, there are provided cured compositions that maintains at least 50%, or at least 80% of 180 degree peel strength after aging at 80° C. for seven days as measured according to ISO 8510-2-2006 Part 2 at 5 mm/sec.

In one embodiment of the invention, there are provided cured compositions having a 180 degree peel strength of at least 8.9 N/25 mm (2 lb/in), or at least 13.3 N/25 mm (3 lb/in), or at least 17.8 N/25 mm (4 lb/in), or at least 22.25 N/25 mm (5 lb/in), according to ISO 8510-2-2006 Part 2 at 5 mm/sec.

In one embodiment of the invention, there are provided cured compositions having a T-peel strength of at least 100 g/in as measured according to ASTM F904-16 "Standard Test Method for Comparison of Bond Strength or Ply Adhesion of Similar Laminates Made from Flexible Materials" when cured for one week at room temperature. In some embodiments, the T-peel strength measured as noted can be at least 100 g/in, or at least 150 g/in, or at least 200 g/in, or at least 250 g/in, or at least 300 g/in, or at least 350 g/in, or at least 400 g/in, or at least 500 g/in.

In one embodiment of the invention, there are provided cured compositions having a T-peel strength of at least 120 g/in as measured according to ASTM F904-16 "Standard Test Method for Comparison of Bond Strength or Ply Adhesion of Similar Laminates Made from Flexible Materials" when aged for eight weeks at room temperature.

In one embodiment of the invention, there are provided cured compositions having a T-peel strength of at least 120 g/in as measured according to ASTM F904-16 "Standard Test Method for Comparison of Bond Strength or Ply Adhesion of Similar Laminates Made from Flexible Materials" when aged for four weeks, or eight weeks, at room temperature.

In one embodiment of the invention, there are provided cured compositions having a T-peel strength of at least 150 g/in as measured according to ASTM F904-16 "Standard Test Method for Comparison of Bond Strength or Ply Adhesion of Similar Laminates Made from Flexible Materials" when aged for three weeks at 40° C.

In one embodiment of the invention, there are provided cured compositions having a T-peel strength loss of less than 20% as measured according to ASTM F904-16 "Standard Test Method for Comparison of Bond Strength or Ply Adhesion of Similar Laminates Made from Flexible Materials" when aged at 40° C. for three weeks, or at 80° C. for one week.

In one embodiment of the invention, there are provided cured compositions having a T-peel strength loss of less than 20% as measured according to ASTM F904-16 "Standard Test Method for Comparison of Bond Strength or Ply Adhesion of Similar Laminates Made from Flexible Materials" for the time period from having been aged for one week to having been aged for four weeks at room temperature.

In one embodiment of the invention, there are provided cured compositions wherein the peak tensile strength was retained or increased when first aged for one week at room temperature and then at 80° C. for one week. In one embodiment of the invention, there are provided cured compositions having a peak tensile strength of from 0.1 to 60 MPa, from 0.1 to 50 MPa, from 0.1 to 45 MPa, from 0.1 to 40 MPa, from 0.1 to 35 MPa, from 0.1 to 30 MPa, or from 0.1 to 25 MPa, as measured according to ASTM D638 when aged for one week at room temperature.

In one embodiment of the invention, there are provided compositions having a peak tensile strength of from 0.1 to 60 MPa, from 0.1 to 50 MPa, from 0.1 to 45 MPa, from 0.1 to 40 MPa, from 0.1 to 35 MPa, from 0.1 to 30 MPa, or from 0.1 to 25 MPa, as measured according to ASTM D638 when first aged for one week at room temperature and then at 80° C. for one week.

In one embodiment of the invention, there are provided compositions having an elongation at break of from 1 to 560%, or from 1 to 350%, or from 1 to 300%, or from 10 to 400%, or from 10 to 350%, or from 10 to 325%, or from 10 to 300%, or from 25 to 400%, or from 25 to 350%, or from 25 to 325%, or from 25 to 300%, or from 50 to 400%, or from 50 to 350%, or from 50 to 325%, or from 50 to 300%, as measured according to ASTM D638 when aged for one week at room temperature.

In one embodiment of the invention, there are provided compositions having a Young's modulus of from 0.1 to 5000 MPa, or from 0.1 to 4500 MPa, or from 0.1 to 4000 MPa, or from 0.1 to 3500 MPa, or from 0.1 to 3000 MPa, or from 0.1 to 2500 MPa, or from 0.1 to 2000 MPa as measured according to ASTM D638 when aged for one week at room temperature.

In one embodiment of the invention, there are provided compositions useful in the invention that are capable of curing, being curable, having been cured, or having reached a gelation point. At the gelation point, a loose network of crosslinks are formed across the material and the gel or gelation point can be measured as either (1) the point when the storage modulus (G') and the loss modulus (G") crossed, or (2) when the tan delta became independent of frequency, each method by rotational rheometry using a Discovery Hybrid Rheometer 3 (DHR), T.A. Instruments.

As used herein, storage modulus is a measure of elastic response of a material. It measures the stored energy. Loss modulus is a measure of viscous response of a material. It measures the energy dissipated as heat. Tan delta, a measure of damping, is the ratio of loss modulus to the storage modulus, G"/G'. These properties can be used to evaluate compositions for stability at storage and spray conditions, gelation process, and thermal stability.

In one embodiment of the invention, there are provided compositions having a gelation point, or that cures, at or above 25° C. as measured by a Discovery Hybrid Rheometer (DHR), T. A. Instruments.

"Pot life" herein means period of time during which a multi-part composition can be used after mixing the components. "Working life" means the time period that a composition is available to be applied to at least one substrate and to be capable of forming a bond.

Pot life measurements can include various methods such as: (1) the time from the initial viscosity (when components have been all combined) to the time of doubling of viscosity; (2) reaching a particular viscosity value above which the composition can no longer be used in a given application or application method; (3) reaching a viscosity so high that the curable composition can no longer be molded or applied to a substrate, depending on the particular application and its requirements; or (4) for solvent-based compositions, reaching a viscosity of 24 seconds using a #2 Zahn cup following ASTM Method D4212 at room temperature.

In one embodiment of the invention, various factors can influence pot life including, but not limited to, choice of and/or amount of Components (I), (II), and/or (III), choice of solvent and concentration of the formulation in the solvent. Extended pot life can provide the user with more flexibility in efficiently applying the curable composition of the invention. In certain embodiments of the invention, extended pot life of the compositions is provided.

In some embodiments and using any of the pot life measurement methods described herein, the compositions of the invention can have a very adequate pot life ranging from minutes, to hours, to days. In some embodiments and using any of the pot life measurement described herein, the pot life of the compositions of the invention can be 5 minutes or more; or 10 minutes or more; or 25 minutes or more. Independently, in some embodiments, pot life can be 7 days or less; or 1 day or less; or 8 hours or less; or 2 hours or less; or 30 minutes or less.

In one embodiment of the invention, there are provided compositions having a gelation point at or above 25° C. of 2 minutes or greater, or one-half hour or greater, or 1 hour or greater. Particle size, crystallinity, viscosity of the resin, homogeneity of the mixtures, and kinetics, among other factors, influence the rate at which these compositions gel.

In one embodiment of the invention, there are provided compositions wherein Component (I) comprises at least one polyester or polyether, which is semi-crystalline at or below 80° C., or below 65° C., or below 50° C., or below 40° C., or below 35° C., whether or not it is present in a blend with at least one non-crystalline resin and wherein said blend is viscous or a solid.

In one embodiment of the invention, there are provided compositions wherein Component (I) is a solid, a waxy or a semi-solid material at room temperature.

In one embodiment of this invention, there are provided compositions wherein: (a) Components (I), (II) and (III) are combined in any order; or (b) Component (II) is first combined with Component (III); or (c) Components (I) and (II) are combined first; or (d) Component (III) is first combined with Component (I).

In one embodiment of this invention, there are provided compositions wherein Component (III) is first combined with Component (I) and the product thereof is then combined with Component (II).

In one embodiment of the invention, there are provided compositions wherein the amine has primary amine functionality.

In one embodiment of the invention, there are provided compositions wherein Components (I), (II), and (III) are combined together simultaneously in the same vessel.

In one embodiment of the invention, there are provided compositions wherein, after optional activation, said composition is cured at 20° C. or higher in six days or less, and optionally, then post-cured at or above 20° C.

The compositions of the invention can comprise at least one additive selected from the group consisting of tackifiers, plasticizers, fillers, waxes, pigments, stabilizers, antioxidants, adhesion promoters, flame retardants, conductive agents, rheology modifiers and mixtures thereof, and the process of preparing the curable compositions of the invention may comprise an additional step of blending in one or more of these additives.

In various embodiments, the compositions of the invention can comprise at least 0.1, 0.5, 1, 2, 3, 4 or 5, or less than 5 weight % of at least one antioxidant, based on the total weight of the composition equaling 100 weight %.

One or more fillers, such as but not limited to talc, carbon black, calcium carbonate, titanium dioxide and zinc oxide, may be incorporated into the curable compositions of the invention. In various embodiments, the adhesives of the invention can comprise: 1, 5, 10, 20, 30, 40, 80 or less, 70 or less, 60 or less, 55 or less, 50 or less, or 45 or less weight percent of at least one filler, based on the total weight of the compositions equaling 100 weight %. Moreover, the adhesives of the invention can comprise in the range of 1 to 80, 5 to 70, 10 to 60, 20 to 55, 30 to 50, or 40 to 45 weight percent of at least one filler, based on the total weight of the compositions equaling 100 weight %.

Further, in some embodiments, the composition of the invention may exclude one or more additives typically found in conventional compositions. For example, in some cases, the adhesive formed using the compositions of the invention can be used as a pressure sensitive adhesive (e.g., tapes and labels) and nonwoven adhesive applications without addition of oils or plasticizers that can possibly volatilize, migrate, or be extracted. For example, in some cases, adhesive compositions of the present invention can include not more than about 2, not more than about 1.5, not more than about 1, not more than about 0.5, not more than about 0.25, not more than about 0.1, or not more than about 0.05 weight percent of one or more oils or plasticizers, based on the total weight of the adhesive composition equaling 100 weight %.

In one embodiment of the invention, there are provided compositions wherein the composition does not contain: a polyvinyl alcohol, or a polyvinyl polymer, or a poly vinyl acetate polymer.

In one embodiment of the invention, there are provided compositions wherein neutralizing agents are not added to the composition after the polymerization reaction. Neutralizing agents can include but are not limited to primary amines, secondary amines, tertiary amines, and ammonia as well as any other neutralizing agent known in the art, for example, for water dispersible or water dispersed microgel compositions.

In one embodiment of the invention, there are provided compositions wherein the compositions can contain residues of amine, formed from the use of at least one primary or at least one secondary amine, that may be incorporated into the composition during curing. The primary and/or secondary amines or amine salts useful in this invention can be used as catalysts for the reaction of the β-ketoacetate (AcAc) group of Component (I) with the aldehyde functional groups of Component (II) and not as a neutralizing agent.

In one embodiment of the invention, there are provided compositions wherein the polyester resin is not an alkyd polyester resin and/or is not a polyester resin containing alkyd residues and/or fatty acid residues.

In one embodiment of the invention, there are provided compositions of the invention which is not a thermosetting composition.

In one embodiment of the invention, there are provided compositions of the invention which is a thermosetting composition.

In one embodiment of the invention, there are provided compositions wherein the composition of this invention does not contain compounds containing polysaccharide groups and/or oxidized polysaccharides having aldehyde functional groups.

In one embodiment of the invention, there are provided compositions wherein curing occurs between β-ketoacetate (AcAc) functional Component (I) and the aldehyde functionality, forming carbon-carbon bonds.

In one embodiment of the invention, there are provided compositions that can be cured at low temperatures (e.g. <100° C.).

In one embodiment of the invention, there are provided compositions that can be cured at room temperature, or 10° C. to 130° C., or 20° C. to 130° C., or 20° C. to 120° C., or 20° C. to 115° C., or 20° C. to 110° C., or 20° C. to 105° C., or 20° C. to 100° C., or 20° C. to 90° C., or 20° C. to 80° C., or 20° C. to 70° C., or 30° C. to 130° C., or 30° C. to 120° C., or 30° C. to 115° C., or 300 to 110° C., or 30° C. to 105° C., or 30° C. to 100° C., or 30° C. to 90° C., or 30° C. to 80° C., or 30° C. to 70° C., or 40° C. to 130° C., or 40° C. to 120° C., or 40° C. to 115° C., or 40° C. to 110° C., or 40° C. to 105° C., or 40° C. to 100° C., or 40° C. to 90° C., or 40° C. to 80° C., or 40° C. to 70° C., or 50° C. to 130° C., or 50° C. to 120° C., or 50° C. to 115° C., or 50° C. to 110° C., or 50° C. to 105° C., or 50° C. to 100° C., or 50° C. to 900° C., or 50° C. to 800° C., or 60° C. to 130° C., 60° C. to 120° C., or 60° C. to 115° C., or 60° C. to 110° C., or 60° C. to 105° C., or 60° C. to 100° C., or 60° C. to 90° C., or 60° C. to 80° C., or 70 to 130° C., 70° C. to 120° C., or 70° C. to 115° C., or 70° C. to 110° C., or 70° C. to 105° C., or 70° C. to 100° C., or 60° C. to 90° C., or 70° C. to 80° C. or 80° C. to 130° C., 80° C. to 120° C., or 80° C. to 115° C., or 80° C. to 110° C., or 80° C. to 105° C., or 80° C. to 100° C., or 80° C. to 90° C., or 90° C. to 130° C., 90° C. to 120° C., or 90° C. to 115° C., or 90° C. to 110° C., or 90° C. to 105° C., or 90° C. to 100° C., or 100° C. to 130° C., 100° C. to 120° C., or 100° C. to 115° C., or 10° C. to 30° C.

In another embodiment of the invention, there are provided compositions wherein, after curing, the compositions of the invention can be processed or used at temperatures of up to 130° C., or up to 120° C., or up to 115° C., or up to 11° C., or up to 105° C., or up to 100° C., or up to 95° C., or up to 90° C., or up to 85° C., or up to 80° C., or up to 75° C. At these temperatures, the compositions of the invention can maintain suitable adhesion or bond strength for the particular application. "Suitable adhesion or bond strength" can include but is not limited to any adhesion or bond strength values/measures contained herein or that are known to one of ordinary skill in the art for the particular application.

In one embodiment of this invention, the compositions of the invention are not water-dispersible polyester microgel compositions.

In one embodiment of the invention, acrylates are not blended with the acetoacetylated Component (I) of the invention/and or the compositions of the invention.

In order to extend the pot life of the curable adhesive of the invention, the base catalyst (III) may be temporarily made latent. For example, a carboxylic acid, such as benzoic acid, acetic acid, formic acid, or cyanoacetic acid, can also be added to the composition to create a latent catalyst which can be subsequently activated during cure. The addition of mild buffering agents such as weak acids can influence the cure rate, thermal stability and polymer performance. Solid catalysts may be particularly suited to further chemical protecting, as only the outer surface of a solid particle need be made latent.

In one embodiment, at least one co-reactant of the compositions of the invention can be caused to be latent under ambient or other conditions until curing. Means for reactivating latent co-reactants can be the application of thermal or IR or UV energy. More specifically, the catalysts (amines) and/or curing agents (aldehydes) may be released for reaction in a controlled manner through a physical protecting mechanism or protecting layer, for example, a coated or blended component that releases the curing agent and/or catalyst upon heating, to improve storage stability, and/or extend the pot life or open time for application of the curable composition of the invention, and/or enable rapid formation of initial "green strength" while preventing full cure until "activated" or "de-protected." This may also be called a controlled cure profile. Solid curing agents can be particularly suited for physical protection, as only the outer surface of a particle usually has to be coated. The protecting layer could include materials such as waxes, polyester resins, tackifier resins, or rosin ester tackifier resins, including but not limited to Permalyn™ 6110, Permalyn™ 6110M, Permalyn™ 5095, Kristalex™ 3070, or Foralyn™ 90 (Eastman Chemical Company). Physical and chemical mechanisms may be combined to improve latency and/or to control the cure profile of the inventive curable compositions by activating, or de-protecting, under varying conditions. In one embodiment, tackifier resins can be used. In one embodiment, waxes can used. In another embodiment, a combination of tackifier resins and/or waxes can be used.

The curable adhesive composition of the invention can react at an ambient temperature in the presence of a base catalyst. In a so-called 2K system, it can be advantageous to mix two components of the composition shortly before use, to prevent the composition from premature reaction and becoming useless. In one embodiment of the present invention, the mixing of two components first does not result in significant reactions in the absence of a catalyst. Thus, the acetoacetylated resin and the curing agent may be mixed and stored until the mixture is ready to be used. The base catalyst can then be added shortly before use.

The curable composition of the invention is also capable of reacting at higher temperature (above ambient temperature) with more control of shelf life in the presence of a protected base catalyst (amine) and/or a protected curing agent. In this so-called 1K system, the present invention allows the mixing of at least the three components (acetoacetylated resin, curing agent and amine); the acetoacetylated resin and the curing agent may not react in the presence of a catalyst (amine) when the curing agent is protected, for example, up to 100%. The protected compositions can be mixed and stored until the mixture is ready to be used and is activated (de-protected).

The manner and order of protection of the curing agent(s) and the catalyst(s) (amine) can be used to control the cure profile of the curable composition of the invention in both 1K and 2K systems.

The curable composition of the invention may be a 1K system with extended shelf life, and a controlled cure profile that provides desired green strength and is also capable of curing at higher temperature. For example, the curable adhesive composition of the invention may comprise a portion of a physically protected base catalyst that is de-protected (activated) at 40° C. and a portion of a physically protected base catalyst that is de-protected at 60° C. In this example 1K system, the present invention allows the mixing of the three components (acetoacetylated resin, curing agent and amine catalyst) and storage until the mixture is ready to be used. The inventive composition can be activated in stages, with first de-protection at 40° C. to allow a first stage of curing and formation of green strength, which is desired to hold assembled substrates in position, followed by second stage de-protection at 60° C. to allow further cure of the composition.

The cure profile of the curable composition may also be controlled by a combination of chemical and/or physical protection strategies and with selection of catalyst(s) and/or curing agent(s). For example, the curable composition may comprise two catalysts with different reactivity that are protected by the same or different physical mechanism. The protection provides extended shelf life and/or pot life, and after activation/de-protection at the indicated condition(s), for example, the catalyst that provides faster reaction speed may provide a desired level of green strength, and the catalyst that provides lower reaction speed may provide the final level of cure and bond strength. In this manner, the formulator can obtain a desirable, superior balance of composition properties for a particular application method, substrate choice, and/or end use requirement.

The curable composition of the invention can include chemical and/or physical protection of the curing agent and/or catalyst (amine). Upon de-protection/de-activation, the protecting agent can then be released allowing the composition(s) of the invention to achieve improvement in green bond strength and/or final adhesion bond strength as measured, for example, by 180 degree peel adhesion. Non-limiting examples of such materials can include functionalized waxes, tackifier resins, rosin acid tackifier resins, and rosin ester tackifier resins.

In one embodiment, there is provided any of the compositions of the invention wherein said third Component (III) comprises at least one amine, salts thereof, or mixtures thereof; and In one embodiment of the invention, there are provided compositions wherein said Component (III) comprises at least one primary amine or at least one secondary amine, salts thereof, or mixtures thereof; provided curable compositions comprising:

I. Component (I), comprising a resin having at least one functional group selected from the group consisting of β-ketoester and malonate functional groups;

II. Component (II), comprising at least one curing agent having at least one aldehyde functional group, or isomers thereof, wherein said Component (II) is optionally latent;

III. Component (III), comprising at least one amine, salts thereof, or combinations thereof;

wherein before addition of Component (III), the reactivity of the composition is delayed by at least one of the following:

(III)(a) at least one of said Components (I), (II), and (III), or any reaction product thereof, or any combination thereof is a solid; or at least one of Components (II) or (III) or any combination thereof is insoluble in the resin under pot life conditions; or (III)(b) at least one said amine is first reacted with at least one aldehyde, ketone, acetal or ketal, or mixtures thereof, optionally, to form a solid; or (III)(c) at least one said amine is first reacted with a portion of Component (II), wherein the reaction product thereof is optionally reacted or combined subsequently with additional amounts of either or both of Components (II) and (III), and, prior to reaction of Components (I)-(III), is optionally combined with at least one reactivity delayer; or (III)(d) at least one said amine is first reacted with all of Component (II) wherein the reaction product is a combination of Components (II) and (III) and no additional amounts of Component (II) or Component (III) are reacted with said composition; or combinations of reaction products as described in (III)(d); and optionally, IV. Component (IV) comprising at least one reactivity delayer which is combined with Component (II), or Component (III), or a combination thereof.

In one embodiment of the invention, there are provided compositions wherein Component (III)(b) is a reaction product or a combination of two or more reaction products of at least one said amine with at least one aldehyde, ketone, acetal, ketal or combinations thereof.

In one embodiment of the invention, there are provided compositions wherein at least one basic catalyst or activating agent can be selected from the any amine of the invention that, unprotected, would catalyze reactions at room temperature, but are prevented or delayed from reacting under these conditions because the catalytic moieties are physically protected from reaction by being incorporated such that they are not physically released without the appropriate trigger.

In one embodiment, the system reactivity can be further controlled by the particle size of a solid Component (II) or (III) or the combination of Components (II) and (III). The particle size can be any size including but not limited to particle size less than 710 micron (25 mesh); or less than 250 microns (60 mesh); or less than 125 microns (120 mesh); or less 64 microns (230 mesh); or less than 30 microns, or less than 10 microns, or less than 1 micron. In one embodiment, the particle size can be small enough to be sprayed where spray applications are recommended and/or used. In addition, the particle size can be small enough to allow random distribution and fast activation resulting in a more homogeneous film.

In one embodiment of the invention, there are provided compositions wherein said reactivity delayer comprises at least one of the following: waxes; paraffins; rosins; rosin ester resins; tackifier resin; polyester resin; polyol resins; or acrylics, said acrylics having a number average molecular weight of from about 2,000 to 15,000 and a Tg of from 40° C. to 130° C.

In addition to physically protecting curing agents (II) and/or base catalysts (III), tackifying resins (tackifiers) may be added to the curable compositions of the invention to modify the adhesive or coating properties, including but not limited to the green strength, viscosity, wetting behavior, adhesion, particularly to low energy surfaces, and viscoelastic behavior of the finished adhesive or coating composition. The tackifier resin selected may vary depending on the exact curable composition and the balance of properties needed in an application, such as peel strength, shear strength, and tack. These properties are important to adhesive compositions and the best advantages are achieved where the overall balance of these properties, both initially and over time in different environmental conditions, have been optimized.

Tackifier resins that may be present in the adhesive compositions include, without limitation, cycloaliphatic hydrocarbon resins, C5 hydrocarbon resins, C5/C9 hydrocarbon resins, aliphatic-aromatic hydrocarbon resins, aromatically modified C5 resins (commercially available as Piccotac™ resins, Eastman Chemical Company, TN, US), C9 hydrocarbon resins (commercially available as Picco™ resins, Eastman), pure monomer resins, e.g. copolymers of styrene with alpha-methyl styrene, vinyl toluene, para-methyl styrene, indene, and methyl indene (commercially available as Kristalex™ resins, Eastman), dicyclopentadiene (DCPD) resins, dicyclopentadiene based/containing resins, cyclopentadiene based/containing resins, terpene resins (commercially available as Sylvares™ resins, AZ Chem Holdings, LP, Jacksonville, Fla., US), terpene phenolic resins, terpene styrene resins, rosin acid resin, esters of rosin (commercially available as Permalyn™ resins, Eastman), esters of modified rosins, liquid resins of fully or partially hydrogenated rosins, fully or partially hydrogenated rosin esters (commercially available as Foral™ E and Foralyn™ resins, Eastman), fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated DCPD resins (commercially available as Escorez® 5000-series resin), fully or partially hydrogenated modified DCPD resins (commercially available as Escorez® 5600-series resin), both Escorez® resins available from ExxonMobil Chemical Company, TX, US), fully or partially hydrogenated modified dicyclopentadiene based/containing resins, aromatically modified C5 resins (commercially available as Piccotac™ resins, Eastman), fully or partially hydrogenated aromatically modified C5 resins, fully or partially hydrogenated C9 resins (commercially available as Regalite™ resins, Eastman), fully or partially hydrogenated pure monomer resins (e.g., copolymers or styrene with alpha-methyl styrene, vinyl toluene, para-methyl styrene, indene, and methyl indene) (commercially available as Regalrez™ resins, Eastman), fully or partially hydrogenated C5/cycloaliphatic resins (commercially available as Eastotac™ resins, Eastman), fully or partially hydrogenated C5/cycloaliphatic/styrene/C9 resins, fully or partially hydrogenated cycloaliphatic resins, and/or combinations thereof.

In one embodiment of this invention, the tackifier resin used in this invention can be selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and combinations thereof.

The compositions of the invention can be useful as a "warm" melt adhesive for those applications where hot melt adhesives are currently employed and applied by techniques known to those skilled in the art. The melting point and/or ring and ball softening point (RBSP) of one or more tackifier resins in the curable compositions can be selected to suit the intended end use for the curable composition, where RBSP is measured by ASTM D6493-11 "Standard Test Methods for Softening Point of Hydrocarbon Resins and Rosin Based Resins by Automated Ring-and-Ball Apparatus." In various embodiments, the tackifier resin has a RBSP from −10° C. to 160° C. In some embodiments, the tackifier resin has an acid number in the range of 0 to 170, 0 to 30, 0 to 25, or 0 to 11 mg KOH/g. In some embodiments, tackifier resins with zero or low acid numbers are preferred to reduce interference with the base catalyst. In some embodiments, tackifier resins can have moderate or high acid numbers, for example, where the primary and/or secondary amine is buffered.

In other embodiments, tackifier resins with RBSP above the expected application temperature and with acid numbers of about 5 to about 10, or of about 11 to about 22, or of about 145 to about 165 mg KOH/g, can be added in amounts up to an equimolar amount of base catalyst in order to act as a base scavenger at high temperatures and improve thermal stability of the cured composition as well as to provide improved adhesion. Non-limiting examples of tackifier resins that may be used include Poly-Pale™ (AN 155, RBSP 103° C.), Dymerex™ (AN 145, RBSP 144° C.), Foral™ AX-E (AN 165, RBSP 80° C.), Permalyn™ 6110 (AN 13, RBSP 103° C.), and Foralyn™ 90 (AN 8, RBSP 82° C.) (Eastman).

In one embodiment of the invention, there are provided compositions wherein said reactivity delayer can be selected from C5 hydrocarbon resins, C9 hydrocarbon resins, aliphatic-aromatic hydrocarbon resins, aromatic hydrocarbon resins, pure monomer hydrocarbon resins, alkane hydrocarbons, aliphatic-aromatic hydrocarbon resins, fully or partially hydrogenated C9 resins, rosin ester resins, polyester resins, polyol resins, and/or combinations thereof.

In one embodiment of the invention, there are provided compositions wherein said reactivity delayer can be selected from aromatic hydrocarbon resins, pure monomer hydrocarbon resins, aliphatic-aromatic hydrocarbon resins, or combinations thereof.

In addition to adjusting the cure profile of the composition through the physical protecting of the catalyst and/or curing agent, the wax(es) and/or tackifier resin(s) may reduce the overall viscosity of the adhesive, reduce application temperature, and improve application and uniformity.

Any conventionally known wax which is suitable for use in formulating adhesives can be used in the practice of the invention. Suitable waxes can include, for example, microcrystalline wax, paraffin wax, waxes produced by Fischer-Tropsch processes, functionalized waxes (maleated, fumerated, silanated, or wax with functional groups etc.), polyolefin waxes, petroleum waxes, polypropylene waxes, polyethylene waxes, ethylene vinyl acetate waxes, and vegetable waxes.

Non-limiting examples of commercially available waxes that can be suitable for this invention include A-C™ 9 and A-C™ 810, available from Honeywell International Inc. Morristown, N.J., US; POLYWAX™ 400, 850, 1000, and 3000 from Baker Hughes Inc., Sugar Land, Tex., US; Licocene™ PE4201 from Clariant International LTD, Muttenz, Switzerland; Epolene™ N-15, Epolene™ C-10, Epolene™ C-17 and Epolene™ C-18 from Westlake Polymers, LLC, Houston, Tex., US; Sasolwax™ 3279 microcrystalline wax from Sasol Chemical Industries Limited, South Africa; and microcrystalline wax Be Square™ 195 (Baker Hughes).

In various embodiments, adhesives comprising the curable compositions of the inventions can comprise at least 1, 2, 5, 8, or 10 and/or not more than 40, 30, 25, 20, or 15 weight percent of at least one tackifier based on the total weight of the final composition equaling 100 weight %. Moreover, said adhesives can comprise in the range of 1 to 40, 5 to 30, 8 to 25, or 10 to 20 weight percent of at least one tackifier.

Furthermore, a functionalized wax may react with the curable composition, reducing the amount of material that may potentially migrate from the adhesive or coating. Suitable functionalized waxes include but are not limited to Honeywell A-C™ 596; Clariant Licocene™ MA6252 and Licocene™ MA6452; and Westlake Epolene™ E-43.

In one embodiment of the invention, there are provided compositions wherein the combination referred to in Components III-III comprises either chemically reacting or mixing.

In one embodiment of the invention, there are provided compositions wherein said reactivity delayer is combined with said amine at a ratio of between 25:1 to 0.5:1 parts by weight.

In one embodiment of the invention, there are provided compositions wherein said reactivity delayer is combined with said amine at a ratio of between 10:1 to 0.5:1 parts by weight.

In one embodiment of the invention, there are provided compositions wherein Component (I) is present in the amount of 55 to 95 weight %, Component (II) is present in the amount of 0 to 20 weight %, and Component (III) is present in the amount of 0.5% to 25% weight %, based on the total weight of Components (I), (II), and (III).

In one embodiment of the invention, there are provided compositions wherein Component (I) is present in the amount of 55 to 95 weight %, Component (II) is present in the amount of 5 to 20 weight %, and Component (III) is present in the amount of 0.5% to 25% weight %, based on the total weight of Components (I), (II), and (III).

In one embodiment of the invention, there are provided compositions wherein Component (I) is present in the amount of 80 to 90 weight %, Component (II) is present in the amount of 0 to 18 weight %, and Component (III) is present in the amount of 0.5 to 15% weight %, based on the total weight of Components (I), (II), and (III).

In one embodiment of the invention, there are provided compositions wherein Component (I) is present in the amount of 80 to 90 weight %, Component (II) is present in the amount of 8 to 18 weight %, and Component (III) is present in the amount of 0.5 to 7% weight %, based on the total weight of Components (I), (II), and (III).

In one embodiment of the invention, there are provided compositions wherein said amine is a solid.

In one embodiment of the invention, there are provided compositions wherein said solid amine can be selected from hexamethylene diamine (HMDA), piperazine, 1,4,8,11-tetraazacyclotetradecane, or combinations thereof.

In one embodiment of the invention, there are provided compositions wherein Component (III)(e) is a reaction product which is a solid resulting from the pre-reaction of all of Component (II) with Component (III).

In one embodiment of the invention, there are provided compositions wherein all or a portion of Component (II) is pre-reacted with Component (III) prior to being reacted with Component (I) and the remainder of Component (II).

In one embodiment of the invention, there are provided compositions wherein the molar ratio for Component (II):Component (III) is from 10:1 to 0.1:10, or from 10:1 to 1:10, or from 5:1 to 1:1. In some examples, the starting molar ratio for Component (II):Components (III) can be 2:1, or 4:1, or 1:2.

In one embodiment of the invention, there are provided compositions wherein Component (III) is a solid resulting from the pre-reaction of cyclohexanedicarboxyaldehyde and TETA.

In one embodiment of the invention, there are provided compositions wherein the molar ratio of cyclohexanedicarboxyaldehyde to TETA is 2:1.

In one embodiment of the invention, there are provided compositions wherein the molar ratio of cyclohexanedicarboxyaldehyde to TETA is 4:1.

In one embodiment of the invention, there are provided compositions wherein Component (III) is a solid resulting from the pre-reaction of TCDDAL and 2-methylpentamethylenediamine.

In one embodiment of the invention, there are provided compositions wherein the molar ratio of TCDDAL to 2-methylpentamethylenediamine) is 2:1.

In one embodiment of the invention, there are provided compositions wherein Component (III) is a solid resulting from the pre-reaction of cyclohexanedicarboxyaldehyde and 2-methylpentamethylenediamine.

In one embodiment of the invention, there are provided compositions wherein the molar ratio of cyclohexanedicarboxyaldehyde to 2-methylpentamethylenediamine is 2:1.

In one embodiment of the invention, there are provided compositions wherein Component (III) is a solid resulting from the pre-reaction of cyclohexanedicarboxyaldehyde and piperazine.

In one embodiment of the invention, there are provided compositions wherein the molar ratio of cyclohexanedicarboxyaldehyde to piperazine is 2:1.

In one embodiment of the invention, there are provided compositions wherein Component (III) is a solid resulting from a pre-reaction of TCDDAL and piperidine.

In one embodiment of the invention, there are provided compositions wherein the molar ratio of TCDDAL to piperidine is 1:2.

In one embodiment of the invention, there are provided compositions wherein a solid resulting from the pre-reaction of TETA and cyclohexanedicarboxyaldehyde and/or a solid resulting from the pre-reaction of TCDDAL and piperidine is present as Component (III).

In one embodiment of the invention, there are provided compositions wherein after mixing or reacting all of said Components I-III, the remaining reactivity delayer is either fully reacted in or does not negatively impact the final properties of the composition.

In one embodiment of the invention, there are provided compositions wherein at least one curing agent of Component (II) is a solid.

In one embodiment of the invention, there are provided compositions wherein the reactivity of said amine is re-activated by applying thermal energy; radiation, e.g., microwave, ultraviolet, or infrared radiation; ultrasonic waves; pressure; moisture; or other sources of activation; or provided by a chemical reaction; or any other variables.

In one embodiment of the invention, there are provided compositions that when cured at room temperature for seven days, have less than 75% loss, or less than 50% loss, or less than 20% loss, or less than 10% loss in 180 degree peel strength after further aging at 80° C. for seven days.

In one embodiment of the invention, there are provided compositions wherein curing is delayed after combination with at least one reactivity delayer.

In one embodiment of the invention, the composition of the invention comprises reactivity delayer(s) wherein the pot life is >1 hour, or >2 hours, or >4 hours, or >8 hours, or >12 hours, or >24 hours, or >31 hours, or >1 week, or >1 month, as measured by the Brookfield or complex viscosity using the time from the initial viscosity to the time of the doubling of viscosity while maintaining said composition at application temperature, or at room temperature, or at 45° C., or at 50° C.

In one embodiment of the invention, there are provided compositions comprising a fifth component, Component (V), which is at least one additive comprising at least one adhesion promoter, or at least one green strength enhancer, or combinations thereof, or wherein said at least one additive is both an adhesion promoter and a green strength enhancer.

In one embodiment of the invention, there are provided compositions wherein Component (V) is at least one tackifying resin and, optionally, can be present in an amount from about 0.5 to about 10 phr, or from about 0.5 to about 8 phr, or from about 1 to about 8 phr, or from about 1.5 phr to about 7 phr, based on the total weight of Component (I), the resin.

In one embodiment of the invention, there are provided compositions wherein Component (V) is present in an amount from about 1 phr to about 70 phr, or from about 1 phr to about 60 phr, or from about 1 phr to about 50 phr, or from about 1 phr to about 40 phr, or from about 1 phr to about 30 phr, or from about 1 phr to about 25 phr, or from about 4 phr to about 56 phr, or from about 5 phr to about 50 phr, or from about 5 phr to about 40 phr, or from about 5 phr to about 30 phr, or from about 5 phr to about 25 phr, or from about 10 phr to about 50 phr, or from about 10 phr to about 40 phr, or from about 10 phr to about 30 phr, or from about 10 phr to about 25 phr, or from about 10 phr to about 20 phr, based on the total weight of Component (I), the resin.

In one embodiment of the invention, there are provided compositions wherein Component (V) is present from about 10 phr to about 25 phr, based on the total weight of Component (I), the resin.

In one embodiment of the invention, there are provided compositions wherein the green bond strength of the cured adhesive compositions is increased by addition of Component (V). Alternatively, the green bond strength of the composition which includes Component (V) is greater than the green bond strength of the composition which does not include Component (V). Component (III) levels can contribute to green bond strength.

"Green bond strength" or "green strength" is defined herein as the ability of a composition to hold two surfaces together when brought into contact and before the composition develops its ultimate bond properties when fully cured and as defined in ASTM 907. Good green strength is desirable, in some instances, because it can relate to a composition's resistance to deformation and fracture before curing. In addition, good green strength, in some instances, can indicate that a composition will withstand mechanical operations or other processing techniques.

In one embodiment, the compositions of the invention that contain Component (V) demonstrate retention of cohesive strength as measured by the 180 peel test as described herein. In another embodiment, the compositions of the invention that contain Component (V) in an amount up to 25 weight %, or up to 20 weight % or up to 15 weight %, demonstrate either no loss of cohesive strength or a loss of no more than 20%, or no more than 15%, or no more than 10%, or no more than 5%, of cohesive strength as measured by the 180 peel test measured as described herein.

In one embodiment of the invention, there are provided compositions wherein said Component (V) can be any tackifier(s) described herein or known in the art or that can be selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated modified dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and/or combinations thereof.

In one embodiment of this invention, there is provided curable compositions of the invention wherein:
  (a) Component (I) comprises at least two functional groups selected from the group consisting of β-ketoacetate and malonate functional groups;
  (b) Component (II) comprises at least one curing agent having at least two aldehyde functional groups;
    wherein the equivalent ratio of the acetoacetate (AcAc) functional groups of Component (I) to the aldehyde functional groups in the composition is from about 3 to 0.25, or from about 3 to 0.5, or from about 2.5 to 0.25, or from about 2.5 to 0.5, or from about 2.5 to 0.6, or from about 2 to 0.25, or from about 2 to 0.5, or from about 2 to 0.6; or from about 1.2 to 0.8;
  (c) Component (III) is at least one amine having primary or secondary functionality, or combinations thereof as described herein in any of the embodiments;
  (d) optionally, Component (IV) comprising at least one reactivity delayer which is combined with Component (II), or Component (III), or a combination thereof; and optionally,
  (e) Component (V) is at least one tackifier resin, wherein:
    a. the tackifier resin is present in an amount from about 1 phr to about 70 phr, or from about 10 phr to about 60 phr, or from about 10 phr to about 25 phr, based on the total weight of Component (I), the resin; and,
    b. the tackifier resin is selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, rosin acid resins esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof; and c. wherein the 180-degree peel strength and/or T-peel strength of the composition is greater than when a tackifier resin or other adhesion promoter is not present in the same composition.

In one embodiment of the invention, there are provided compositions of the invention including tackifiers which are cured.

In one embodiment of the invention, there are provided compositions wherein the 180-degree peel adhesion and/or T-peel strength of the composition is greater than when a tackifier resin or other adhesion promoter is not present in the same composition.

In one embodiment of the invention, there are provided compositions wherein the 180-degree peel adhesion and/or T-peel strength of the composition is at least 100 percent greater than when tackifier or other adhesion promoter is not present in the same composition.

In one embodiment of the invention, there are provided compositions wherein the tackifier resin is present in an amount up to about 65 parts per hundred acetoacetylated polyester and/or polyether [Component (I)]; and wherein the 180-degree peel adhesion of the composition is greater than when tackifier or other adhesion promoter is not present.

In one embodiment of the invention, there are provided compositions wherein at least one additive to promote adhesion is first combined with (a) Component (I), Component (II), or Component (III); or (b) Component (I) and Component (II); or (c) Component (II) and Component (III); or (d) Component (I) and Component (III) or (e) any order of combination of Components (I)-(IV) can be used.

In various embodiments, the curable adhesive compositions can be applied in the range of about 0.5 gsm to about 200 gsm (gsm=grams per square meter). In embodiments where the curable composition will be used to bond substrates to each other, the add-on rate used will be suitable for generating laminates or composites with the desired bond strength. The curable compositions can be applied to one or both substrates before the substrates are brought into contact to form a composite, laminate or article. The article so formed may be optionally contacted with additional substrates, additional curable compositions, adhesives, and/or may be subjected to applied pressure and/or applied heat, in any order or combination without limitation.

In one embodiment of the invention, there is provided a process for maintaining the temperature of Components (I)-(V) of any of the compositions of the invention such that spontaneous polymerization is not induced until activation, e.g., thermal activation.

In one embodiment of the invention, there is provided a process for preparing and curing a reactive adhesive comprising preparing a composition of the invention for a reactive adhesive and applying heat from an external source at a temperature above or at ambient temperature to said composition, whereby polymerization is initiated.

In one embodiment of the invention, there is provided a process for forming a laminate structure, comprising the following steps: (1) forming a composition by combining the three components of any of the compositions of the invention; (2) applying the adhesive composition to a surface of a first substrate; and (3) bringing a surface of a second substrate into contact with the adhesive composition on the surface of the first substrate, thereby forming the laminate structure.

In one embodiment, an article of manufacture is provided comprising at least one flexible substrate coated with at least one composition of the invention.

In one embodiment, an article of manufacture is provided comprising at least two substrates wherein said substrates comprise flexible film and wherein between said substrates of flexible film is at least one of the compositions of the invention which has cured.

In one embodiment of the invention, the article of manufacture of the invention can be a laminated structure.

In one embodiment of the invention, there is provided a process for preparing a flexible film laminate comprising applying at least one of Components (I)-(V) of any of the compositions of the invention independently on the surface of a first flexible film substrate, applying at least one of the remaining components of Components (I)-(V) on the surface of a second flexible film substrate, and then curing said combined components, thus forming the cured composition of the invention.

In one embodiment of the invention, there is provided the above process wherein at least one of the adhesive compositions of the invention is then cured, for example, at or near room temperature.

In one embodiment of the invention, there is provided a process wherein at least one adhesive composition of the invention can be applied to a at least one substrate or at least two substrates wherein the substrate(s) can each be independently selected from the group consisting of a wood material, a metallic material, a plastic material, an elastomeric material, a composite material, a paper material, a fabric material, a glass material, a foamed material, a metal, a mesh material, a leather material, a synthetic leather material, a vinyl material, poly(acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material, or combinations of two or more substrates thereof.

In one embodiment of this invention, there is provided a process wherein at least one composition of the invention can be applied to at least one substrate or at least two substrates wherein the substrate(s) can be independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wovens, and/or nonwovens; foam materials; leather materials; vinyl materials; and/or others that would be apparent to one of ordinary skill in the art. These materials can be used with or without fillers such as talc, glass, etc. as described herein.

In one embodiment of the invention, there is process wherein at least one adhesive composition of the invention can be applied to at least one substrate or at least two substrates wherein the substrate(s) can be each independently selected from a polyester composite, a glass composite, or a wood-plastic composite.

In one embodiment of the invention, there is provided a process wherein at least one adhesive composition of the invention can be applied to at least one substrate or at least two substrates wherein the substrate(s) can each be independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LDPE), oriented polypropylene, biaxially oriented polypropylene (BOPP), nylon, ethylene vinyl alcohol, and extruded films.

In one embodiment, there is provided an article of manufacture comprising at least one composition of the invention and/or processed by any of the processes of the invention.

In one embodiment, there is provided an article of manufacture comprising at least one composition of the invention and further comprising one or more substrates, e.g., flexible substrates, assembly part substrates, automobile interior substrates, woodworking substrates, furniture part substrates, etc. "Flexible substrate" is defined herein as a substrate that is less than 10 mil thick. "Flexible film" is defined herein as a film that is less than 10 ml thick. "Flexible film substrate" is defined herein as a film substrate that is less than 10 mil thick.

In one embodiment, there is provided an article of manufacture comprising at least two substrates wherein at least one composition of the invention is applied to the first substrate and wherein the second substrate can be contacted with said composition.

In one embodiment, there is provided an article of manufacture which is layered with multiple substrates wherein at least one composition of the invention is layered between at least two of said substrates.

In one embodiment, there is provided an article of manufacture comprising at least one composition of the invention which is a laminate structure.

In one embodiment, there is provided an article of manufacture wherein at least one composition of the invention is applied to at least one surface of a multi-laminated structure.

In one embodiment, there is provided an article of manufacture comprising at least one composition of the invention selected from the group consisting of: an adhesive, a laminate, a tape, a label, a tag, a radio frequency identification (RFID) tag, a coating, a sealant, a film (whether or not flexible), a foam, a potting compound, a disposable hygiene article, a polyester composite, a glass composite, a fiberglass reinforced plastic, a wood-plastic composite, an extruded compound, a polyacrylic blended compound, a potting compound, a rubber compound, a motor vehicle molded part, a motor vehicle extruded part, a motor vehicle laminated part, a furniture part, sheet molding compound (SMC), dough molding compound (DMC), textiles (e.g. fabric materials, mesh, wovens and/or nonwovens) and/or a flexible packaging multilayer.

In one embodiment, the substrates used in the articles of manufacture of the invention can be flexible film substrates comprising at least one composition of the invention.

In one embodiment, the articles of manufacture of the invention can be assembly parts or components including but not limited to automobile parts, woodworking parts, and/or furniture parts comprising at least one composition of the invention.

In one embodiment, the article of manufacture of the invention can comprise an adhesive. The adhesive compositions of the invention can comprise any one of the compositions of the invention. In one embodiment, the adhesive compositions of the invention can be reactive adhesives. In one embodiment, the adhesive compositions of the invention can be curable or cured.

In one embodiment, any of the adhesive compositions of the invention can be applied to a substrate at any thickness known in the art for a particular application, for example, from about 0.5 microns to about 100 microns, or from about 0.5 microns to about 50 microns, or from about 0.5 microns to 5 microns, for example, for some flexible packaging applications.

In one embodiment, any of the adhesive compositions of the invention can be applied to a substrate at any thickness known in the art for a particular application, including but not limited to 50 to 200 microns or 50 to 150 microns or 75 to 125 microns, for example, for some assembly applications such as auto assembly or woodworking assembly.

The compositions of this invention can provide desirable properties for a variety of applications. In certain embodiments, the compositions of this invention are suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

In one embodiment, any of the adhesive compositions of the invention can be selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, hygiene core integrity adhesive, packaging adhesive, and hygiene core integrity adhesive.

In some embodiments, such as pressure sensitive adhesives, the curable compositions of the present invention can be characterized by adhesive strength by 180-degree peel test e.g. according to ISO 8510-2-2006 Part 2 at 5 mm/sec or PSTC-101 Method A, cohesive strength and/or temperature resistance by static shear hold power testing (room temperature or elevated temperature, e.g., 40° C. or 70° C.) by PSTC-107 and/or by shear adhesion failure temperature (SAFT) by PSTC-17.

In one embodiment, the articles of manufacture of the invention can be coating compositions.

In one embodiment, the article of manufacture of the invention can comprise a cured composition wherein the bond is maintained after cure and/or post-cure at or above about 23° C.; at or above about 60° C.; or at or above about 120° C.

In one embodiment of the invention, acrylates are not included within the compositions of the invention and/or adhesives made therefrom and/or articles of manufacture of the invention made therefrom.

Compositions based on such acetoacetylated compounds, e.g., polyesters and aldehyde compounds, are especially suitable for low-temperature curing adhesive applications without the use of isocyanates. Primary and secondary amines can offer options for improved thermal stability. Chemical and/or physical protection of the primary/secondary amines and/or curing agents can provide additional control options to influence the cure profile. Additionally, the novel system does not require moisture, so it can be used with moisture-impermeable substrates such as artificial leather.

The compositions of the present invention may be prepared according to any suitable method, techniques and equipment. For example, the components of the composition may be blended in a mixer, an extruder, an aluminum can, and/or at the point of application, e.g. a head mixing system. In some cases, the components of the composition may be blended, optionally with a solvent, to form a mixture, which can then be cast onto a backing or other substrate and dried or cured or partially cured to form an article comprising the curable composition.

Furthermore, the composition may be shaped into a desired form, such as a tape or sheet, by an appropriate technique including casting, extrusion, or roll coating techniques (gravure, reverse roll, etc.). Alternatively, the composition may be applied to a substrate using conventional adhesive application equipment recognized in the art, e.g. curtain coating, slot-die coating, wire-wound rod coating, gravure coating, roll coating, knife coating, hot or "warm" melt coating. The composition may be applied as either a continuous or discontinuous coating or film or layer or sprayed through different nozzle and/or head configurations at different speeds using typical application equipment. The application may be followed by drying or heat treatment.

In another embodiment, the curable adhesive of the present invention is a laminating adhesive for flexible packaging. The curing temperature for such an adhesive is desirably a low temperature ranging from room temperature to about 50° C.

After formulation, the curable adhesive can be applied to a substrate and subsequently laminated to another substrate. Suitable substrates include but are not limited to textile, fabric, mesh, film, poly(acrylonitrile butadiene styrene) (ABS), polypropylene (PP), glass-filled PP, talc-filled PP, impact-modified PP, polycarbonate (PC), PC-ABS, biaxially oriented polypropylene (BOPP), thermoplastic polyolefin (TPO) compounds, pigmented TPO compounds, filled TPO compounds, rubber-modified TPO compounds, paper, glass, plastic, metal, PVC (polyvinyl chloride), PET (polyethylene terephthalate), modified PET such as PETG (PET modified with 1,4-cyclohexanedimethanol) and PCTG, Mylar™ plastic, aluminum, leather, synthetic leather, vinyl, nonwoven materials, foams, painted surfaces, printed surfaces, thermosets, thermoplastics, polymer films such as polyethylene, polypropylene, oriented polyethylene, oriented polypropylene; metallized plastic films; aluminum foil; wood; metals such as aluminum, steel or galvanized sheeting; glass; urethane elastomers; primed (painted) substrates, and laminates, blends or coated substrates comprising at least one of these materials. Any of these substrates may be untreated, corona treated, chemically treated, plasma treated, flame treated, rubber-modified, impact-modified, filled with e.g. talc or glass, pigmented with e.g. carbon black, chromium oxide or titanium oxide, or otherwise modified as known by those skilled in the art to provide improved properties to the substrate.

The curable adhesive can be coated onto a substrate using techniques known in the art, for example, by spraying, draw-down, roll-coating, brushing, nozzle dispensing, printing, etc. and subsequently laminated to another substrate manually or by a roll-to-roll laminating machine. The coating and laminating process may be done at room temperature or elevated temperatures. The laminated films may be cured at room temperature or elevated temperatures. In various embodiments, the curable mixture of the present invention can cure at 20° C. in various amounts of time. In one embodiment, the curable mixture of the present invention can cure at 20° or higher in six days or less.

In certain embodiments of the invention, the compositions of the invention can be prepared by a process comprising: (a) mixing at least one component having two or more β-ketoester functional groups, and at least one component having two or more aldehyde functional groups with at least one primary or secondary amine, and (b) after optional activation, curing the composition at 20° C. or higher, for example, in six days or less, and (c) optionally, post-curing the composition at or above 20° C.

In certain embodiments of the invention, the compositions of the invention can be prepared by a process comprising: (a) mixing at least one component having two or more β-ketoester functional groups, and at least one component having two or more aldehyde functional groups with at least one primary or secondary amine, and (b) after optional activation, curing the composition at or above 20° C., or above 35° C., or above 50° C., or above 55° C., or above 70° C., or above 80° C., or above 100° C., or from 20° C. to 130° C., or from 50° C. to 130° C., or from 50° C. to 80° C., in any time known to one of ordinary skill in the art, for example, in six days or less, and (c) optionally, post-curing the composition at or above 20° C., or above 35° C., or above 55° C., or above 70° C., or above 80° C., or above 100° C., or from 20° C. to 110° C., or from 50° C. to 110° C.

In some embodiments, the curable composition of this invention can be cured after optional activation, for example, to de-protect a component, at temperatures above 20° C., or above 35° C., or above 50° C., or above 55° C., or above 70° C., or above 80° C., or above 100° C., and can then be post-cured at a higher temperature(s) above 20° C., or above 35° C., or above 55° C., or above 70° C., or above 80° C., or above 100° C.

In some embodiments, the curable compositions can be partially cured before being applied to a substrate, used in a laminate, molded or otherwise incorporated into an article.

In some embodiments, the curable compositions of the present invention can be characterized by lap shear testing: ASTM D3163-01(2014) Standard Test Method for Determining Strength of Adhesively Bonded Rigid Plastic Lap-Shear Joints in Shear by Tension Loading. Impact strength can also be measured by any method known in the art, for example, by pendulum or ball drop impact tests.

In some embodiments, the curable compositions of the present invention can be used in flexible packaging and characterized by tests such as DIN ISO 53357 Internal Adhesion, DIN ISO 55529 Sealed Seam Strength, DIN 53357 Bonding Adhesion, DIN 53504 Elongation at Tear and Tearing Tension, ASTM D1003 Transparency of film, ASTM D2578 Wetting Tension of Film Surface, ASTM F1249 Water Vapor Transmission Rate, and/or ASTM F2622 or D3985 Oxygen Transmission Rate The inventive compositions can exhibit improved heat resistance and/or improved adhesion over time, particularly after heat aging, as evidenced by tests such as elevated temperature aging of the adhered articles comprising the inventive compositions, followed by lap shear testing, by fiber tear testing, by peel testing, by peel adhesion failure temperature (PAFT) testing, by shear adhesion failure temperature (SAFT) testing, and/or by shear hold power testing at elevated temperatures such as 40° C., 60° C., 70° C., 85° C., 95° C., 105° C., 120° C. The adhered articles comprising the compositions of the invention can also exhibit improved humidity resistance as evidenced, for example, by aging at 95 to 100% relative humidity at 40° C. for 24 to 144 hours followed by any of the above listed adhesion and cohesion tests at room temperature and/or at elevated temperature.

Improved chemical resistance of the compositions can be shown by reduced degradation of adhesive and cohesive strength after exposure to selected chemicals. In general, resistance to solvents, water, foods, cleaning products and other chemicals can be measured by direct exposure up to and including immersion for a period of time followed by adhesive and cohesive testing as described above to compare to pristine material testing. Visual observations are made in general for degradation of articles during/after exposure. Uptake of the test fluid can be measured gravimetrically or spectroscopically.

In all embodiments of the invention, the primary and/or secondary amines useful in the invention can act as catalyst or activating agent.

The following examples further illustrate how the polyesters useful in the invention can be made and evaluated, and how the curable compositions useful in this invention can be made and evaluated and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLES

In the Examples herein, analysis of the acetoacetate (AcAc) number of the resin employs a potentiometric titration method based on the titration of the proton in the AcAc group with a strong base, tetrabutylammonium hydroxide solution (TBAOH) in methanol. The titration was conducted on a titrator (904 Titrando, Metrohm AG, US) equipped with Tiamo software and a pH electrode (DG116-solvent, Mettler Toledo, US) as sensing probe. Depending on the expected AcAc number of the sample, 0.05 to 0.5 grams sample was weighted to a titration cell and stirred to dissolve in 35 ml pyridine at room temperature. The sample solution was titrated to the endpoint at pH around 16, which was determined by Tiamo software or manually. The AcAc number, reported as mg KOH/g sample, was calculated from the volume of TBAOH used at the titration endpoint, its normality, and weight of sample.

Glass transition temperature, Tg, was determined using a Q2000 differential scanning calorimeter (DSC) from TA Instruments, New Castle, Del., US, at a scan rate of 20° C./min.

In the Examples and Tables herein, rotational rheology analysis was used both to find relative gel points and follow comparative viscosity build. In this document one of four profiles (methods) was used and each method is defined in the Table or experimental description:

DHR1: 20 minute isothermal hold at 25° C., 20 min isothermal hold at 35° C., a temperature ramp at 1.75° C./min to 70° C. and a final temperature ramp at 5° C./min to 120° C.

DHR2: 20 minute isothermal hold at 25° C., 20 min isothermal hold at 35° C., a temperature ramp at 2.5° C./min to 85° C., and a final temperature ramp at 3.5° C./min to 140° C.

DHR3: 20 min isothermal hold at 40° C. and a temperature ramp at 10° C./min to 140° C. over the next 10 min.

DHR4: a 14 hour isothermal hold at 50° C.

Rheological properties of the composition were measured on a TA Instruments Discovery Hybrid Rheometer 3 (DHR) in a parallel plate geometry. The diameter of the disposable aluminum plates was 25 mm, and the gap was 1.0 mm. Temperature studies were run in auto-strain mode with the initial strain set at 5.0% and at a frequency of 2 rad/sec.

The process for running the sample involved combining the components with stirring. The sample was placed in a Discovery Hybrid Rheometer 3 (DHR). Upon loading the sample onto the DHR, the spindle is brought down to geometry gap. The sample is trimmed, and the oven doors closed, and the desired DHR method is followed. Gel point was taken as the time or temperature when the storage modulus (G') and the loss modulus (G") crossed. Storage modulus is a measure of elastic response of a material. It measures the stored energy. Loss modulus is a measure of viscous response of a material. It measures the energy dissipated as heat. Tan delta, a measure of damping, is the ratio of loss modulus to the storage modulus, G"/G. For a crosslinking system, the gel point is also indicated when the tan delta is independent of frequency. The gelation point is dependent upon time, temperature and many other physical and chemical variables. The controlled variables will be described for each data set to allow for comparative conclusions.

In the following Examples, the equivalent ratio of the acetoacetate functional group in the resin to the aldehyde functional group is about 1, unless otherwise indicated. In the Examples below, "phr" means parts per hundred resin wherein Component (I) is the resin. Also, the amount of catalyst/amine is present in about 1.5 phr, unless otherwise indicated.

Example 1. Synthesis of Acetoacetate Functional Polyester 1 (Resin 1)

Hydroxyl Functional Polyester 1:

A 2-L kettle with a four-neck lid was equipped with a mechanical stirrer, a thermocouple, a heated partial condenser (115° C.), a Dean-Stark trap, and a chilled condenser (15° C.). To the flask were charged neopentyl glycol (NPG) (178.6 g), 2-methyl-1,3-propanediol (MPD) (154.6 g), trimethylolpropane (TMP) (131.5 g), adipic acid (AD) (511.5 g), and the acid catalyst, Fascat-4100 (Arkema Inc.) (0.98 g). The reaction was allowed to react under nitrogen at 170° C. for one hour, at 200° C. for one hour, and at 230° C. for about 3 hours to yield a clear, viscous mixture. A total of 126 g of the distillate was collected in the Dean-Stark trap. The resulting mixture was allowed to cool to 120° C. for the reaction with t-butyl acetoacetate below. Acid number: <1.0 mg KOH/g; hydroxyl number: 165.5 mg KOH/g; glass transition temperature (Tg): −49.6° C.; number average molecular weight (Mn): 2050 g/mole; weight average molecular weight (Mw): 5921 g/mole.

Acetoacetate Functional Polyester 1:

The next synthesis was aimed to convert hydroxyl number of 150 mg KOH/g of the above hydroxyl functional polyester (1) to acetoacetate number of 150 mg KOH/g. To the above hydroxyl-functional polyester 1 (850 g) was added t-butyl acetoacetate (359 g). The mixture was gradually heated and allowed to react at 120° C. for 20 minutes and at 140° C. for two hours. A total of 144 g of the condensate (t-butanol) was collected in the Dean-Stark adapter. The resulting viscous resin was allowed to cool and subsequently collected. Glass transition temperature (Tg): −50.9° C.; number average molecular weight (Mn): 1873 g/mole; weight average molecular weight (Mw): 6004 g/mole; AcAc number 124 mgKOH/g.

The resins in Examples 2-10 were prepared and tested as in Example 1 and the compositions and properties are as shown in Table 1.

TABLE 1

Composition and Properties of Acetoacetylated Polyesters

| Ex. # and Resin # | MPD (g) | TMP (g) | Adipic Acid (g) | 1,6-hexanediol (g) | Other Monomer | t-Butyl Acetoacetate (g) | Mw (g/mol)/ Mn (g/mol) | Tg (° C.)/ Tm (° C.) | Acetoacetate # (mg KOH/g) |
|---|---|---|---|---|---|---|---|---|---|
| 1 | 154.6 (1.70 moles) | 131.5 (0.97 moles) | 511.5 (3.50 moles) | 0 | NPG 178.6 (1.71 moles) | 359 (3.04 moles) | 6004/1873 | −50.9 | 124 |
| 2 | 0 | 79.2 (0.58 moles) | 280.7 (1.92 moles) | 209.3 (1.77 moles) | 0 | 237.3 (2.01 moles) | 7123/2234 | −63.5/10-17 | 129 |
| 3 | 0 | 57.5 (0.42 moles) | 281.3 (1.93 moles) | 230.5 (1.95 moles) | 0 | 237.3 (2.01 moles) | 5289/1928 | −63.1/12-22 | 127 |
| 4 | 0 | 70.3 (0.52 moles) | 278.9 (1.91 moles) | 219.5 (1.86 moles) | 0 | 211.5 (1.80 moles) | 5955/1664 | −65.6/11-25 | 118 |
| 5 | 0 | 51.4 (0.38 moles) | 280.1 (1.97 moles) | 237.6 (2.01 moles) | 0 | 211.5 (1.80 moles) | 5531/1917 | −66.9/14-27 | 118 |
| 6 | 221.4 (2.46 moles) | 48.84 (0.36 moles) | 613.8 (4.20 moles) | 290.4 (2.46 moles) | 0 | 28.2 (0.24 moles) per 100 g resin | 3933/1667 | −64.7 | 86 |
| 7 | 0 | 58.4 (0.43 moles) | 252.5 (1.73 moles) | 0 | CHDM 251.3 (1.47 moles) | 211.5 (1.80 moles) | 5474/2026 | −40.7/55-70 | 121 |
| 8 | 0 | 83.6 (0.62 moles) | 286.7 (1.96 moles) | 200.4 (1.70 moles) | 0 | 211.5 (1.80 moles) | 11495/2476 | −60.1/4-16 | 115 |
| 9 | 154.6 (1.70 moles) | 131.5 (0.96 moles) | 255.7 (1.75 moles) | 0 | IPA 290.7 (1.75 moles) NPG 178.6 (1.71 moles) | 374 (3.17 moles) | 6390/2003 | −32.6 | 123 |
| 10 | 9.7 (0.11 moles) | 66.3 (0.49 moles | 253.1 (1.73 moles) | 0 | CHDM 233.3 (1.62 moles) | 232.0 (1.97 moles) | 5358/1880 | −41.8/47-61 | 125 |

Examples 11-20—Use of Wax as Reactivity Delayer to Control Cure Profile

Curable compositions were prepared by adding 13.5 grams of acetoacetylated polyester of Example 6 to a vial and then adding 1.5 grams of a mixture of 1,3- and 1,4-cyclohexanedicarboxaldehyde (CHDAL) curing agent with stirring. The catalyst or catalyst/wax mixture was added as listed in Table 2, and the vial was shaken, and the contents were immediately transferred to Gardner viscosity tubes to the level of the line provided by the Gardner Tube manufacturers. The tubes were periodically inverted, and the time it took for the air bubble to rise to the top of the tube was measured and recorded in seconds (Table 2). A dash indicates that no measurement was taken at that time. The catalyst/wax mixture was made by taking the indicated catalyst, blending one part of catalyst into four parts melted paraffin (melting point 54° C.), cooling the mixture and grinding the resulting solid using a mortar and pestle. The solid was rinsed with distilled water, dried under vacuum and added as indicated.

In all cases when a catalyst was added the viscosity increased relative to the control, Example 20. When the reactivity delayed catalyst/wax mixture was added to the AcAc polyester/curing agent mixture, the composition cured more slowly than when the catalyst alone was added, or the composition did not cure. Using the time for the bubble to rise to the top of the inverted vial as an indication as degree of cure, Examples 13, 15 and 19 cured an unexpected four-times more slowly than Examples 11, 14 and 18 without the catalyst/wax blend. Surprisingly, Example 16 with reactivity delayed TMG/wax cured 18-times more slowly than Example 16 with TMG only. This illustrates that this reactivity delayer-technique can be used with wax or other materials such as tackifier resins, and presumably can also be applied to physical protection of curing agents, to control the cure profile of the compositions.

TABLE 2

Demonstration of reactivity delayed wax/catalyst mixture to adjust composition cure time.

| | | | Time after catalyst addition that viscosity was tested (min) | | | | | | | |
|---|---|---|---|---|---|---|---|---|---|---|
| Ex. # | Catalyst | Amount of catalyst | 3 min | 12 min | 23 min | 33 min | 49 min | 70 min | 80 min | 150 min |
| | | | Time for bubble to rise (sec) | | | | | | | |
| 11 | 2,3,4,6,7,8,9,10-octahydropyrimido[1,2-a]azepine (DBU) | 0.75 phr | 67 | — | 105 | 120 | — | — | — | — |
| 12 | DBU | 0.83 phr | 37 | 53 | 90 | — | — | — | 140 | 229 |
| 13 | 20 weight % DBU in paraffin wax | 3.75 phr wax mixture | 15 | — | 24 | 24 | — | — | — | — |
| 14 | 2,3,4,6,7,8-hexahydropyrrolo[1,2-a]pyrimidine (DBN) | 0.75 phr | 26 | 47 | — | — | 100 | 113 | — | — |

TABLE 2-continued

Demonstration of reactivity delayed wax/catalyst mixture to adjust composition cure time.

| Ex. # | Catalyst | Amount of catalyst | 3 min | 12 min | 23 min | 33 min | 49 min | 70 min | 80 min | 150 min |
|---|---|---|---|---|---|---|---|---|---|---|
| | | | Time for bubble to rise (sec) | | | | | | | |
| 15 | 20 weight % DBN in paraffin wax | 3.75 phr wax mixture | 26 | 23 | — | — | 27 | 33 | — | — |
| 16 | Tetramethylguanidine (TMG) | 0.75 phr | 107 | — | — | — | 298 | 305 | — | — |
| 17 | 20 weight % TMG in paraffin wax | 3.75 phr wax mixture | 23 | — | — | — | 21 | 31 | — | — |
| 18 | 1,4,8,11-Tetraazacyclotetradecane [Cyclam] (solid) | 0.75 phr | 20 | 34 | 61 | 88 | — | — | 150 | 195 |
| 19 | 20 weight % Cyclam in wax | 3.75 phr wax mixture | 30 | 23 | 34 | 35 | — | — | 37 | 48 |
| 20 | No catalyst | 0 phr | 6 | 7 | — | 6 | — | — | 6 | — |

Examples 21-28—Use of Wax, Tackifiers or Resins as Reactivity Delayer to Control Cure Profile Curable compositions were prepared by adding 5.0 grams of acetoacetylated polyester of Example 1 to a vial and then adding the amount of curing agent as indicated in Table 3 with stirring. The prepared delayed reactivity catalyst mixture was then added with stirring, and a sample was placed in the DHR and tested using DHR1 method.

A delayed reactivity catalyst mixture was made by melting one part of the indicated amine catalyst into ten parts of melted paraffin (melting point 54° C.), or STEPANPOL™ PC-105P-30 solvent-free saturated polyester resin (Stepan Company), or Kristalex™ 3070 aromatic hydrocarbon pure monomer resin, acid number of 0 mg KOH/g, ring and ball softening point of 70° C. (Eastman Chemical Company, Kingsport, Tenn., USA) as indicated in Table 3 in the Reactivity Delayer column. The dispersed mixture was quickly cooled, and the resulting solid was ground using a mortar and pestle or cryogenically ground (Example 28) using a model 6750 Freezer/Mill™ from SPEX SamplePrep LLC (Metuchen, N.J., USA). The mill was equipped with stainless steel grinding balls and stainless steel containers. The Freezer/Mill™ was programmed to run at three 3-minute intervals with a 2-minute cooling rest cycle between intervals.

Each of the acetoacetylated polyester, curing agent and catalyst combinations in these examples were previously shown to reach the gel point within minutes at room temperature. When the acetoacetylated polyester, curing agent and delayed reactivity catalyst mixture were combined and run by DHR1 method, the viscosity of the composition remained relatively stable for 20 minutes at 25° C., and surprisingly remained relatively stable for the subsequent 20 minutes at 35° C. As the system ramped to 70° C., each of the compositions reached the gel point. Unexpectedly, different reactivity delayers used with the same resin/curing agent/catalyst, Examples 21, 22 and 23, increased the gel point temperature by different amounts, with the gel temperature range being 60-72° C., indicating that the activation temperature for curing can be chosen by selection of the reactivity delayer. Selection of the correct reactivity delayer and catalyst can delay significant cure of the curable composition until the desired activation temperature is reached. This illustrates to one skilled in the art that this technique can be used with wax, polyols, tackifier resins or other materials, and can also be applied to physical protection of curing agents, to control the cure profile of the inventive compositions.

Example 28 is a duplicate of Example 24 with the exception that Example 28 was cryogenically ground to a particle size that went through a 35 mesh sieve. Unexpectedly, Example 28 had gel formation after 12 mins at 25° C. instead of being relatively stable at 25° C. and activating at 690. The cryogenically ground catalyst/reactivity delayer mixture delayed curing from the typical ambient temperature gel time of 2-3 min when using unprotected catalyst, indicating that small particle size has been demonstrated as a suitable technique herein for an application where a 2K system is applied immediately and room temperature cure within one hour is desired. For both 1K and 2K systems, catalyst/reactivity delayer mixtures with larger particle sizes of the reactivity delayer/catalyst mixture have been demonstrated to provide longer cure delays and higher cure activation temperatures, providing increased pot life and/or shelf life before cure activation.

The control of the cure profile, as described but not limited to the above, through particle size and size distribution can be applied to catalysts and/or curing agents that are protected by any method described herein or known in the art.

In Table 3, the amount of reactivity delayer to catalyst is generally 10 parts wax/tackifier/rosin/resin/other blending agent to 1 part catalyst.

The control of the cure profile by adjusting the type of reactivity delayer/blending agent and the ratio of reactivity delayer to the catalysts and/or curing agents can be combined with control though particle size and size distribution and with any other method described herein or known in the art.

TABLE 3

Catalyst Delayed Activation Due to Physical Protection or Physical Properties, run by DHR1 method

| Ex. | Reactivity Delayer in Mixture | Curing Agent | Curing Agent (g) | Catalyst in Mixture | Catalyst (g); (Catalyst/ Reactivity Delayer Mixture, g) | Gel Point Temperature (° C.) | Composition Change in viscosity, 20 min @ 25° C. (%) | Composition Change in viscosity, 20 min @ 35° C. (%) |
|---|---|---|---|---|---|---|---|---|
| 21 | Kristalex 3070 10:1 (Tm 70° C.) | Tricyclodecane-dialdehyde (TCDDAL) and isomers | 1.06 | Triethylene-tetramine (TETA) | 0.064 (0.7 Mixture) | 72 | 135 | 76 |
| 22 | STEPANPOL PC-105P-30 10:1 (Tm 55-65° C.) | TCDDAL and isomers | 1.06 | TETA | 0.064 (0.7 Mixture) | 63 | 42 | 13 |
| 23 | Paraffin mp 54° C. (10:1) | TCDDAL and isomers | 1.06 | TETA | 0.064 (0.7 Mixture) | 60 | 36 | 3 |
| 24 | STEPANPOL PC-105P-30 10:1 | TCDDAL and isomers | 1.06 | (2-Methylpenta-metheylenediamine) (MPMDA) | 0.064 (0.7 Mixture) | 69 | −6 | 13 |
| 25 | STEPANPOL PC-105P-30 10:1 | Terephthalaldehyde (TPAL) | 0.74 | TETA | 0.064 (0.7 Mixture) | 65 | 14 | 71 |
| 26 | STEPANPOL PC-105P-30 10:1 | TPAL | 0.74 | MPMDA | 0.064 (0.7 Mixture) | 64 | −10 | 5 |
| 27 | STEPANPOL PC-105P-30 10:1 | TCDDAL and isomers | 1.06 | TETA | 0.064 (0.7 Mixture) | 61 | 31 | 17 |
| 28 | STEPANPOL PC-105P-30 10:1 | TCDDAL and isomers | 1.06 | MPMDA | 0.064 (0.7 Mixture cryogenically ground) | Gel Point at room temp | | |

Examples 29-35. Using Physical Properties of Catalysts to Control Cure Profile Curable compositions were prepared by adding 5.0 g grams of acetoacetylated polyester of Example 1 to a vial and then adding the amount of curing agent and catalyst as indicated in Table 4 with stirring. The sample was evaluated using DHR1 method.

Examples 29, 30, 31 and 32 in Table 4 all contain the solid catalyst piperazine. Example 29, comprising a 10:1 blend of STEPANPOL PC-105P-30: piperazine, and Example 30 containing solid piperazine, gel at surprisingly similar temperatures. Unpredictably, blending the solid catalyst with the reactivity delayer did not significantly affect the gel temperature. The data shows that the solid form of the catalyst has an important role in the gel delay. Hence, the data demonstrates that the physical properties of the catalyst can be used to control the cure times. Examples 30 and 32 show that having a solid curing agent, a solid cut of TCDDAL isomers and the solid terephthalaldehyde (TPAL), respectively, significantly delayed gelation to higher temperatures as compared to Example 31 which uses a liquid cut of TCDDAL isomers and has a lower gel point temperature.

Examples 33, 34 and 35 in Table 4 show difference between cure rates of two solid catalysts and one liquid catalyst in identical systems with identical DHR profiles. A solid component effect on curing depends on the melting point, the solubility and the particle size of the solid, among other things. Piperazine (mp 106° C.) and cyclam (mp 188° C.) have different melting points and solubilities at the same particle size. The composition with triethylenetetramine (mixture of isomers) (TETA) catalyst cured much faster, partly due to the fact it was a liquid with good solubility in the system at room temperature. Surprisingly, even though piperazine has a lower melting point than cyclam, piperazine delayed the gel point of the composition more effectively (Examples 33 and 34). In general, solid reagents with high melting points and low solubility will delay the composition reactivity and increase the gel temperature. Particle size, crystallinity, viscosity of the resin, homogeneity of mixtures, and kinetics, among other factors, also influence the rate at which these compositions gel.

Examples 32 and 33 vary only in particle size of the solid catalyst. The smaller 125 micron catalyst generally thickens the unreacted composition more quickly relative to the larger 500 micron catalyst. However, when the particle size is substantially larger as in Example 29 (>1000 micron), the viscosity of the unreacted composition is significantly increased until the cure delaying agent melts. Comparison of examples 32 and 33 shows the smaller particle sized catalyst system results in an unexpectedly lower gel point temperature in Example 33.

TABLE 4

Physical Properties of Catalyst Influences Cure, run by DHR1 method

| Example | Curing Agent | Curing Agent Amount | Catalyst or Reactivity delayer/Catalyst Mixture | Gel temp (° C.) | Viscosity change after 20 min 35° C. (poise) | Initial viscosity at 35° C. & (at gel point) (poise) |
|---|---|---|---|---|---|---|
| 29 | tricyclodecane-dialdehyde [TCDDAL] (solid) | 1.06 | 700 mg of Piperazine:STEPANPOL PC-105P-30 1:10 blend > 1000 microns | 58 | Stable | 6000000 (700) |

TABLE 4-continued

Physical Properties of Catalyst Influences Cure, run by DHR1 method

| Example | Curing Agent | Curing Agent Amount | Catalyst or Reactivity delayer/Catalyst Mixture | Gel temp (° C.) | Viscosity change after 20 min 35° C. (poise) | Initial viscosity at 35° C. & (at gel point) (poise) |
|---|---|---|---|---|---|---|
| 30 | TCDDAL (solid) | 1.06 | 100 mg Piperazine < 500 microns | 77 | 80 poise | 200 (700) |
| 31 | TCDDAL (liq) | 1.06 | 100 mg Piperazine < 500 microns | 61 | 10 poise | 200 (700) |
| 32 | TPAL melted in | 0.74 | 100 mg Piperazine < 500 microns | 103 | Stable | 10 (90) |
| 33 | TPAL melted in | 0.74 | 100 mg Piperazine < 125 microns | 85 | Stable | 600 (300) |
| 34 | TPAL melted in | 0.74 | 100 mg Cyclam < 125 microns | 51 | 1,400 | 600 (2000) |
| 35 | TPAL melted in | 0.74 | 100 mg TETA (liq) | 25 | 260,000 | 40,000 (200,000) |

Examples 36-45. Controlled Cure Catalyst Systems Providing Delayed Reactivity and Gel Point after Activation Amine is added into a 4 oz vial of dialdehyde as specified in Table 5. The mixture is stirred rapidly with a metal spatula under nitrogen. The reaction exotherms with the evaporation of water. The resulting reaction product is placed in a vacuum oven at room temperature to remove any excess low boiler, and after 24 h the resulting solid is ground and sieved to the desired mesh size. Examples 36-40 and 42 are made by the mixing of two liquids resulting in a solid chemically-protected catalyst. These examples show that the curing agent can be used to delay cure when it is prereacted with the catalyst. The solid reaction product causes both the catalyst and the curing agent to be unreactive until the catalyst system is later activated.

If residual amine is present, it can be removed, such as in Example 36 where any excess piperidine could be readily evaporated away. The advantage of this catalyst system is that Component (II) can be added in excess if the final product is still a solid. Any excess Component (II) would count towards the total curing agent required to achieve the desired final cured properties of the composition. Another clear advantage of this solid catalyst system is the ability to grind the material down to very small particle sizes, creating a more uniform composition without losing the delayed cure feature. A final advantage of this catalyst system is that the product of the reaction of Component (II) and Component (III) results in a decrease of the release of volatiles in the curing step.

TABLE 5

Examples 36-45 Prepared controlled cure catalyst systems

| Ex. # | Moles Aldehyde | Moles Amine | Aldehyde Reacted with amine catalyst | Amine | DSC Tm (° C.) |
|---|---|---|---|---|---|
| 36 | 1 | 2 | TCDDAL mixture of isomers | Piperidine | 14 |
| 37 | 2 | 1 | CHDAL | TETA | 80 |
| 38 | 4 | 1 | CHDAL | TETA | 114 |
| 39 | 2 | 1 | TCDDAL | MPMDA | 49 |
| 40 | 2 | 1 | CHDAL | MPMDA | 70 |
| 41 | 2 | 1 | CHDAL | Piperazine | 62 |
| 42 | 1 | 1 | CHDAL | MPMDA | <25 |
| 43 | 1 | 2 | TPAL | Piperidine | >100 |
| 44 | 1 | 2 | TPAL | Piperazine | >100 |
| 45 | 1 | 2 | TCDDAL | Piperazine | >100 |

Examples 46-55: Use of Controlled Cure Catalyst Systems 36-45 to Control Gel Point Curable compositions were prepared by adding 5.0 g grams of acetoacetylated polyester of Example 1 to a vial, then adding TPAL, and heating at 80° C. until the solid dissolved, about 30 mins. The mixture was cooled to room temperature, and the Component (III), controlled cure catalyst systems of Examples 36-45, was added with stirring. Amounts were as indicated in Table 5. The amount of TPAL added provided an equivalent ratio AcAc/CHO of about 1.0 when the dialdehyde released from the catalyst system was included. The catalyst system provided the same amount of amine as when adding the specified amine at about 1.5 parts per hundred resin (phr), where all of Component (I) is the resin. The sample was evaluated using the DHR2 method.

Surprisingly all these compositions displayed delayed reactivity as seen by the increased temperature of the observed gel point (Table 6). Even when solids were used to make the catalyst systems some level of cure delay was observed. (Examples 53, 54 and 55) The range of controlled cure catalyst systems shown in Table 6 (Examples 46-55) gave a range of gel points from 35° C.-108° C., as measured by DHR2 Method. This range can be further modified by, for example, controlling variables such as particle size, additional solvent, cure temperature, combinations of catalyst systems, additional curing agents, and variations in resins, resin combinations, and combinations thereof.

TABLE 6

Examples 46-55 Composition gel points using controlled cure catalyst systems, measured using DHR2 Method

| Example | Catalyst System | Catalyst System (g) | Resin 1 175 (g) | TPAL (g, premixed with resin) | Gel point by DHR2 (° C.) |
|---|---|---|---|---|---|
| 46 | 36 | 0.16 | 5.0 | 0.68 | 69 |
| 47 | 37 | 0.22 | 5.0 | 0.60 | 83 |

TABLE 6-continued

Examples 46-55 Composition gel points using controlled
cure catalyst systems, measured using DHR2 Method

| Example | Catalyst System | Catalyst System (g) | Resin 1 175 (g) | TPAL (g, premixed with resin) | Gel point by DHR2 (° C.) |
|---|---|---|---|---|---|
| 48 | 38 | 0.36 | 5.0 | 0.45 | 96 |
| 49 | 39 | 0.36 | 5.0 | 0.54 | 99 |
| 50 | 40 | 0.32 | 5.0 | 0.50 | 100 |
| 51 | 41 | 0.28 | 5.0 | 0.53 | 108 |
| 52 | 42 | 0.2 | 5.0 | 0.7 | 60 |
| 53 | 43 | 0.26 | 5.0 | 0.7 | 35 |
| 54 | 44 | 0.26 | 5.0 | 0.7 | 71 |
| 55 | 45 | 0.2 | 5.0 | 0.7 | 75 |

Example 56-59 Effect of Resting Time on Composition Comprising Controlled Cure Catalyst System on Cure Profile Curable compositions were prepared by adding 5.0 g grams of acetoacetylated polyester of Example 1 to a vial and then adding 0.70 g of TPAL and heating the mixture at 80° C. until the solid dissolved. The mixture was cooled to room temperature, and 300 mg of the catalyst system Example 36, sieved through a 120 mesh screen, was added with stirring. Examples 56-59 were allowed to rest (stored) after complete mixing for different lengths of time before the DHR method was run, as indicated in Table 7. Unexpectedly, when the system was allowed to rest, the temperature at which the composition gelled decreased with increased resting time and then stabilized; also, the initial viscosity of the system increased. The gel point temperature for the system decreased from 69° C. to 59° C. after 8 hours. Residual amine can be addressed through multiple methods of purification and neutralization depending upon the control cure catalyst system. The lowering of the gel temperature appears to change more significantly in the first few hours.

TABLE 7

Examples 56-59 Effect of Catalyst System Resting
time on Gel Point, measured by DHR1 method

| Example | Initial Viscosity (Poise) | Resting time before DHR1 | Gel point by DHR1 (° C.) |
|---|---|---|---|
| 56 | 190 | 3 min | 69 |
| 57 | 200 | 1.5 h | 65 |
| 58 | 300 | 3 h | 61 |
| 59 | 900 | 8 h | 59 |

Examples 60-62: Effect of Solvent Addition on Cure Profile Using Controlled Cure Catalyst System Curable compositions were prepared by adding 5.0 g of acetoacetylated polyester of Example 1 to a vial, adding 0.70 g of TPAL, and heating the mixture at 80° C. until the solid dissolved. The mixture was cooled to room temperature and 150 mg of catalyst system Example 37 sieved through a 120 mesh screen was added with stirring, followed by addition of ethyl acetate (EtOAc) solvent, added with stirring, as indicated in Table 8. Examples 60-62 were evaluated by DHR2 Method.

The compositions with lower levels of solvent (EtOAc) display higher gel temperatures. The composition with no solvent gelled at 108° C., while the examples with 20% EtOAc gelled at 75° C. Although all runs experienced the same DHR method, the increase in solvent level and subsequent decrease in initial viscosity of the composition unexpectedly resulted in faster viscosity build. The system with the higher levels of EtOAc solvent, Example 62, cures faster. Interestingly, the curing agent Example 37 provided a very stable viscosity during the 25° C. and 35° C. portions of the DHR run regardless of the solvent level.

TABLE 8

Examples 60-62 Effect of Added Solvent on Gel Point of Composition
comprising Controlled Cure Catalyst System (DHR2 Method)

| Example | Amount of EtOAc in Composition | Initial Viscosity (Poise) | Viscosity at end of DHR2 run (Poise) | Gel point by DHR2 (° C.) |
|---|---|---|---|---|
| 60 | 0 | 250 | 10000 | 108 |
| 61 | 10 wt % | 35 | 400000 | 90 |
| 62 | 20 wt % | 15 | 900000 | 75 |

Examples 63-65: Effect of Catalyst System Particle Size on Cure Profile

Curable compositions were prepared by adding 5.0 g grams of acetoacetylated polyester of Example 1 to a vial, adding 0.70 g of TPAL, and heating the mixture at 80 C until the solid dissolved. The mixture was cooled to room temperature, and then 150 mg of catalyst system Example 37, sieved through either a 35 mesh, 120 mesh, or a 230 mesh screen, was added with stirring as indicated in Table 9. Examples 63-65 were tested using DHR2 Method Unexpectedly, the decrease in particle size resulted in faster viscosity build (faster curing). The system with the smallest particle size curing system, Example 65, appeared to move towards complete cure faster. The compositions varied in gel times with no particular trend. However, the smallest particle size composition, Example 65, (63 micron (230 mesh)) gelled at the lowest temperature (85° C.). Additionally, the curing agent Example 37 provided a very stable viscosity during the 25° C. and 35° C. portions of the DHR2 Method run, regardless of the catalyst particle size.

TABLE 9

Example 63-65 Effect of Curing System Particle
Size Curable composition tested was Resin 1, TPAL
premixed with resin, and Example 37 of different
particle sizes, tested using DHR2 Method.

| Example | Particle Size (microns) | Initial Viscosity (Poise) | Viscosity at end of DHR2 run time (Poise) | Gel point by DHR2 (° C.) |
|---|---|---|---|---|
| 63 | Mortar and Pestle < 595 | 200 | 4000 | 105 |
| 64 | 125 | 200 | 100,000 | 108 |
| 65 | 65 | 150 | 800,000 | 85 |

Examples 66-71: Effect of Resin Design on Cure Profile

Curable compositions were prepared by adding 5.0 g of semi-crystalline acetoacetylated polyester resins of Examples 2, 3, 4, 5, 7 or 8 to a vial, then 0.70 g of TPAL, and heating the mixture at 80° C. until the solid dissolved. The mixture was cooled to room temperature and 150 mg of catalyst system Example 36, sieved through a 60 mesh screen, was added as indicated in Table 10, with stirring, and run by DHR2 Method. All these waxy semi-crystalline polyester resin compositions showed a relatively stable viscosity as measured during the 35° C. portions of the DHR2 Method run. It was also interesting to see that although the compositions had the same catalyst system, Example 36, and catalyst system loading, the different acetoacetylated resin in the compositions resulted in gel temperatures over a range of 21° C. This indicates that the resin selection is an important factor in designing a successful controlled cure strategy.

TABLE 10

Examples 66-71 Effect of resin design, e.g. Waxy Semi-Crystalline Resins, on cure profile, DHR2 Method

| Example | Resin Example | Gel Temp. (° C.) | Initial 35° C. Viscosity and Final Viscosity after 20 min 35° C. (poise) |
|---|---|---|---|
| 66 | 4 | 69 | 56-63 |
| 67 | 2 | 71 | 99-116 |
| 68 | 8 | 73 | 254-269 |
| 69 | 3 | 69 | 50-54 |
| 70 | 5 | 76 | 39-49 |
| 71 | 7 | 90 | NA |

Examples 72-78: Influence of Controlled Cure Catalyst System on Cure Composition Properties Curable compositions were prepared by adding 0.88-1.0 equivalents of curing agent TPAL and/or TCDDAL to acetoacetylated polyester Examples 1, 9 or 10 as shown in Table 11. The mixture was heated to 90° C. until the solid dissolved and then cooled to room temperature. Then the catalyst or catalyst system Example 36 or Example 37 (sieved through 120 mesh screen) was added with stirring. Examples 72-78 were evaluated for 180 degree peel strength at 4 mil thickness between ABS-Magnum 3325 and CGT brown PVC.

A 10 mil drawdown bar was used to form a film (target thickness: 4 mil) of the composition on ABS-Magnum 3325 (1"×6"). A flexible coverstock (CGT brown PVC) was placed over the composition, and a handheld roller was rolled over the sample twice to laminate the sample. The samples were heated as described in Table 11, then cured at ambient conditions for 7 days. Peel testing was done either after 7 days cure or after an additional 7 day post-cure at 80° C.

The samples were tested for 180-degree peel strength following ISO 8510-2-2006 Part 2 at 5 mm/s (12 inch/minute) crosshead displacement rate using an MTS Criterion Universal Tensile Tester model C43-104E, 500 Newton load cell (MTS Systems Corporation, Eden Prairie, Minn., US). A minimum of three samples of each composition were tested and the average and standard deviation reported.

Examples 72-75 all use piperidine as the catalyst at similar levels. Examples 72 and 75 have the same composition; however, Example 75 was made using the liquid piperidine catalyst directly whereas Example 72 uses catalyst system Example 36 where piperidine is pre-reacted with curing agent TCDDAL and then ground to form a 125 micron solid. This work demonstrates that the catalyst system, which delays cure, still produces an adhesive with good bond strength, even after thermal aging. Examples 73 and 74 use the same catalyst system Example 36 with different AcAc resins. These systems also have good bond strength, showing that Example 36 catalyst system works well with a variety of resins. Likewise, Examples 76 and 77 have the same compositions except that Example 77 was made using the liquid triethylenetetramine (mixture of isomers) (TETA) catalyst directly whereas Example 76 uses catalyst system Example 37 where TETA is pre-reacted with curing agent CHDAL and then ground to form a 125 micron solid. This work demonstrates that this catalyst system, which delays cure, also produces an adhesive with good bond strength, even after thermal aging. The composition made with the Example 9 resin (Examples 73 and 78) using the catalyst systems Example 36 and 37 respectively give particularly good bond strength even after thermal aging. Example 79 contains control cure catalyst system 38 but contains no added Component (II), which reduces the number of components needed. As seen in Table 11, this composition also results in good bond strength with good performance even after thermal aging.

TABLE 11

Examples 72-79 Influence of controlled cure catalyst system on cured composition bond properties.

| | | | | | After 7 day RT cure | | After 7 day RT cure + 7 days at 80° C. | |
|---|---|---|---|---|---|---|---|---|
| Example # | Resin # | Curing Agent | Catalyst or Catalyst system | Cure condition | Peel strength (N/25 mm) | failure mode | Peel strength (N/25 mm) | failure mode |
| 72 | 1 | TPAL 0.88 equiv | Example 36 6 phr | 75° C. 75 min, RT 7 day | 25 (5) | A(C) | 34 (8) | A(C) |
| 73 | 9 | TPAL 0.88 equiv | Example 36 6 phr | 75° C. 75 min, RT 7 day | 19 (5) | A(C) | 40 (10) | substrate failure + A(C) |
| 74 | 10 | TPAL 0.88 equiv | Example 36 6 phr | 75° C. 75 min, RT 7 day | 37 (2) | A | 22 (3) | A |
| 75 | 1 | TPAL 0.88 equiv and TCDDAL 0.14 equiv | Piperidine 3.0 phr | 75° C. 75 min, RT 7 day | 17 (4) | C(A) | 16 (2) | C(A) |
| 76 | 1 | TPAL 1.0 equiv | Example 37 6.0 phr | 80° C. 1 hr, then RT 7 days | 18 (3) | C(A) | 15 (3) | C(A) |
| 77 | 1 | TPAL 0.88 equiv and CHDAL 0.19 equiv | TETA 3.0 phr | 80° C. 1 hr, then RT 7 days | 8 (2) | A | 30 (13) | A |

TABLE 11-continued

Examples 72-79 Influence of controlled cure catalyst system on cured composition bond properties.

| Example # | Resin # | Curing Agent | Catalyst or Catalyst system | Cure condition | After 7 day RT cure Peel strength (N/25 mm) | failure mode | After 7 day RT cure + 7 days at 80° C. Peel strength (N/25 mm) | failure mode |
|---|---|---|---|---|---|---|---|---|
| 78 | 9 | TPAL 0.87 equiv | Example 37 6.0 phr | 80° C. 1 hr, then RT 7 days | 32 (2) | C(A) | 28 (15) | A (2)/ substrate failure (2) |
| 79 | 9 | None | Example 38 (16.3 phr) | 100° C. 30 min, then RT 7 days | 34 (1) | C | 58 (3) | C |

Trinseo Magnum 3325 ABS, 0.125" thickness, from Standard Plaque Inc. (Melvindale, MI)
P1NEAC Longitude 704S obtained from CGT Limited (Cambridge, ON)

Another feature critical to the success of a control cure system is a useful pot life after the components (resin, curing agent and catalyst system) are mixed at room temperature. This relates to a useful working life, the time when adhered parts can be adjusted and realigned prior to gelation.

Examples 80-94: Balance Between Pot Life and Gel Point Using Control Cure Systems Curable compositions were prepared by combining 10.0 grams of acetoacetylated polyester Example 1, 9, or 10/9 in a 10:1 blend, 125 micron catalyst system Example 36, 37, 38 or 36/37 in 1:1 blend, and solid 125 micron TPAL added in sufficient quantity so that the equivalent ratio of AcAc/CHO was about 1. Samples were prepared and aliquots removed at regular intervals and tested by DHR3 Method until the sample gelled, as indicated in Table 12. The time in which viscosity doubled, as measured during the initial DHR3 hold, was noted as one measure of composition stability and pot life.

The three different control cure catalyst systems provided both unique gel point temperatures and room temperature stability. With the resins of Example 1 and 9, gel points generally correlate to the melting point of the catalyst systems. If a system melts or dissolves at a lower temperature, it is available to cure the system sooner. Note that blended catalysts provide a convenient averaging of the gel point and stability, offering an opportunity to "dial-in" the gel profile with a limited portfolio of control cure catalyst systems.

In all the systems where the liquid catalyst was added directly to the composition, without incorporation into a control cure catalyst system, gelation was observed in less than 5 minutes at 25° C. (Examples 80-82) The two resins and the resin blend provide differentiated stability when used with the control cure catalyst systems. As higher viscosity resins are used, Resin 1 (45 poise) (Examples 83-86) to Resin 9 (450 poise) (Examples 87-90), the composition stability more than doubles. Note that the initial viscosity of the three compositions evaluated varied by orders of magnitude, as measured by DHR3 Method. (See Examples 83-86 (Resin 1), 87-90 (Resin 9), 91-94 (Blend of Resin 10 and 9). The resin blend in Examples 82 and 91-94 use a 10:1 ratio by weight of a mixture of Resin 10 and Resin 9. In general, the control cure catalyst systems were more stable in this resin blend, but unexpectedly Example 36 catalyst system used in Example 91 had higher stability and lower gel temperature than the other catalyst systems evaluated. Although not anticipated, this is consistent with the blend results shown in Example 94.

TABLE 12

Examples 80-94 Balance between pot life and gel point using control cure systems, various resins, and TPAL as curing agent, by DHR3 Method.

| Example | Catalyst System from Table 5 or Amine | Resin | Amount Amine or Catalyst System Added (phr) | Amine in Catalyst System (phr) | Aldehyde present in control cure system | Amine present in control cure system | Initial Viscosity at 40° C. (poise) | Pot life at 25° C. (Time to 2x viscosity) | Gel point Temperature (° C.) |
|---|---|---|---|---|---|---|---|---|---|
| 80 | TETA | 1 | 1.5 | — | — | — | 40 | 4 min | 40 |
| 81 | TETA | 9 | 1.5 | — | — | — | 600 | 3.2 min | 40 |
| 82 | TETA | 10:1 9:10 | 1.5 | — | — | — | 9000 | 2.4 min | 40 |
| 83 | 36 | 1 | 3.2 | 1.5 | TCDDAL | Piperidine | 35 | <1 h | 65 |
| 84 | 37 | 1 | 4.38 | 1.5 | CHDAL | TETA | 40 | 11 h | 102 |
| 85 | 38 | 1 | 7.23 | 1.5 | CHDAL | TETA | 50 | 31 h | 111 |
| 86 | 36/37 | 1 | 2.9/2.1 | 1/1 | CHDAL/TCDDAL | TETA/Piperidine | 35 | 3.5 h | 87 |
| 87 | 36 | 9 | 3.2 | 1.5 | TCDDAL | Piperidine | 400 | 142 h | 116-122 |
| 88 | 37 | 9 | 4.38 | 1.5 | CHDAL | TETA | 350 | 40 h | 110-132 |
| 89 | 38 | 9 | 7.23 | 1.5 | CHDAL | TETA | 400 | 156 h | 91-104 |
| 90 | 36/37 | 9 | 2.9/2.1 | 1/1 | CHDAL/TCDDAL | TETA/Piperidine | 400 | 72 h | 104 |
| 91 | 36 | 10:1 10:9 | 3.2 | 1.5 | TCDDAL | Piperidine | 6000 | 312 h | 99-87 |
| 92 | 37 | 10:1 10:9 | 4.38 | 1.5 | CHDAL | TETA | 5000 | 74 h | 113-104 |
| 93 | 38 | 10:1 10:9 | 7.23 | 1.5 | CHDAL | TETA | 6000 | 80 h | 115-110 |
| 94 | 36/37 | 10:1 10:9 | 2.9/2.1 | 1/1 | CHDAL/TCDDAL | TETA/Piperidine | 4000 | 180 h | 102-96 |

Examples 95-100: Balance Between Pot Life and Gel Point Using Control Cure Systems at 50° C.

Curable compositions were prepared by combining 10.0 grams of acetoacetylated polyester Example 9 with 125 micron catalyst system Examples 36, 37, 38, 39, 40 and 41 and solid 125 micron TPAL added as indicated such that the equivalent ratio of AcAc/CHO was about 1.0. The sample was prepared and run at 50° C. using DHR4 Method until the sample gelled, Table 13. It is useful to know the pot life of the composition at room temperature, but many applications require certain viscosities to meet equipment specifications, hence the composition may be stored at elevated temperature awaiting application for a shift or more. As described in Tables 12 and 13, the stability of the composition is measured from the initial viscosity of the composition to the time it reached a doubling of viscosity (pot life). In Table 13, this measurement was compared to time from the initial viscosity of the composition to the time it reached 800 poise. Multiple catalyst systems were evaluated. A broad range of stability was demonstrated at 50° C. using compositions that did not gel in the time frame of the experiment. Examples 97, 98, 99 and 100 were still not gelled after 14 hours.

TABLE 13

Balance between pot life at 50° C. and gel point using control cure systems

| Ex. | Catalyst System | Aldehyde in catalyst system | Amine in catalyst system (1.5 phr) | Catalyst system DSC Tm (° C.) | Initial viscosity at 50° C. (poise) | Time to 800 poise at 50° C. (hours) | Pot life at 50° C. (Time to 2x viscosity, hours) | Time to gel point at 50° C. (hours) |
|---|---|---|---|---|---|---|---|---|
| 95 | 36 | TCDDAL | Piperidine | 14 | 400 | 1.7 | 1.8 | 4 |
| 96 | 37 | CHDAL | TETA | 80 | 200 | 1.8 | 1.4 | 4.4 |
| 97 | 38 | CHDAL | TETA | 114 | 200 | 4 | 2.5 | >14 |
| 98 | 39 | TCDDAL | MPMDA | 49 | 3000 | −1 | 3.8 | >14 |
| 99 | 40 | CHDAL | MPMDA | 70 | 150 | 7 | 3.1 | >14 |
| 100 | 41 | CHDAL | Piperazine | 62 | 200 | 9 | 4.8 | >14 |

Examples 101-106: Demonstration of Compositions Using Control Cure Catalyst Systems Curable compositions were prepared by combining 2.5 g of acetoacetylated polyester Example 1 with an amount of <250 micron catalyst system Examples 36, 37, 38, 39, 40 and 41 such that all curing agent was provided by the catalyst system. As with Example 79, no separate Component (II) was added thus reducing the number of components needed. The samples were prepared and run at room temperature using DHR2 method until the samples gelled, Table 14. No separate Component (II) was added in Examples 101-106, unlike the similar compositions in Examples 46-51 that had TPAL added as Component (II). The compositions in Table 14 have the advantage of requiring the combination of only two components to create a curing systems. Not only do these compositions gel within a feasible time and temperature, but as seen in Example 79, they can achieve good bond strength. These Examples in Table 14 demonstrate the embodiment of the invention where the amine is first reacted with all of Component (II) wherein the reaction product is a combination of Components (II) and (III) and no additional amounts of Component (II) or Component (III) are reacted with said composition; or combinations of reaction products as described in Component (III), aspect (III)(d).

TABLE 14

Demonstration of compositions using control cure catalyst systems

| Ex. # | Change in viscosity(poise) at 35° C. over 20 min | Control Cure system < 250 micron | Amount of control cure used (g) | Gel point as determined by DHR2 Method(° C.) |
|---|---|---|---|---|
| 101 | 120 | 36 | 0.52 | 83 |
| 102 | <1 | 37 | 0.41 | 94 |
| 103 | <1 | 38 | 0.40 | 108 |
| 104 | <1 | 39 | 0.48 | 101 |
| 105 | <1 | 40 | 0.38 | 94 |
| 106 | <1 | 41 | 0.35 | 120 |

The invention has been described in detail with reference to the embodiments described herein, but it will be understood that variations and modifications can be effected within the scope of this invention.

What is claimed is:

1. A curable composition comprising:
   I. Component (I) comprising a resin having at least one functional group selected from the group consisting of β-ketoester and malonate functional groups, wherein the resin is either a polyester, a polyether, or a combination thereof;
   II. Component (II) comprising at least one curing agent having at least one aldehyde functional group;
   III. Component (III) comprising at least one amine, salts thereof, or combinations thereof; and, optionally
   IV. Component (IV) comprising at least one of the following: waxes; paraffins; rosins; rosin ester resins; tackifier resin; polyester resin; polyol resins; or acrylics, said acrylics having a number average molecular weight of from about 2,000 to 15,000 and a Tg of from 40° C. to 130° C.;
   wherein said at least one curing agent is selected from the group consisting of 1,3-cyclohexanedicarboxaldehyde; 1,4-cyclohexanedicarboxaldehyde; mixtures of 1,3-cyclohexanedicarboxaldehyde and 1,4-cyclohexanedicarboxaldehyde; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde; o-phthalaldehyde; terephthalaldehyde; isophthalaldehyde; cyclopentane-1,3-dicarbaldehyde; cyclopenta-3,5-diene-1,3-dicarbaldehyde; glutaraldehyde; benzenedipropanal; any isomers thereof; and any mixtures thereof.

2. The composition of claim 1, wherein the tackifier resin is selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, terpene resins, terpene phenolic resins, terpene styrene resins, rosin acid resins, esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof.

3. The composition of claim 1 wherein said at least one amine is primary amine, secondary amine or combinations thereof.

4. The composition of claim 3 wherein said primary amine or said secondary amine is selected from at least one of: piperidine; piperazine; morpholine, pyrrolidine; ethylenediamine; diethylenetriamine; triethylenetetramine; tetraethylenepentamine; 2,2,4-trimethylhexamethylenediamine; 1,2-diaminopropane; 1,3-diaminopropane; 1-ethyl-1,3-propanediamine; 2,2-dimethylpropylenediamine; 1,4-diaminobutane; 2-methylpentamethylenediamine; 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediamine; 2,6-toluenediamine; 3-dimethylaminopropylamine; 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane;1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine; 1,2,4-triazole; alanine; proline; 1,4,8,11-tetraazacyclotetradecane (cyclam); diphenylethylenediamine, 2,2,4,4-tetramethylcyclobutane-1,3-diamine, 2,2-dimethylpropane-1,3-diamine, 2,3-dimethylbutane-2,3-diamine, 1,2-diaminocyclopentane, 1,2,2-trimethylcyclopentane-1,3-diamine, trimethylbicyclo[2.2.1]heptane-2,3-diamine, dioctyl amine, diisopropylamine, and polyetheramines, or isomers thereof.

5. The composition of claim 1 wherein the equivalent ratio of the acetoacetate (AcAc) functional group of Component (I) to the aldehyde functional group is from about 4 to about 0.25.

6. The composition of claim 1 wherein the molar ratio for Component (II):Component (Ill) is from 10:1 to 0.1:10.

7. The composition of claim 1 when cured at room temperature for seven days, has less than 75% loss in 180-degree peel strength after aging at 80° C. for seven days.

8. The composition of claim 1 wherein the reactivity of said amine, or of said aldehyde, or of combinations thereof, or of said composition, is re-activated by applying thermal energy; microwave radiation, ultraviolet radiation, infrared radiation; ultrasonic waves; pressure; moisture; or combinations thereof; or re-activation provided by a chemical reaction.

9. The composition of claim 1 wherein said composition is an adhesive composition or a coating composition.

10. An article of manufacture comprising at least one substrate coated with at least one of the curable composition of claim 1.

* * * * *